US011963527B2

(12) United States Patent
Wu et al.

(10) Patent No.: US 11,963,527 B2
(45) Date of Patent: Apr. 23, 2024

(54) COMPOUNDS, COMPOSITIONS, AND METHODS FOR ALTERING INSECT AND ORGANISM BEHAVIOR

(71) Applicant: BASF Corporation, Florham Park, NJ (US)

(72) Inventors: Tai-Teh Wu, Chapel Hill, NC (US); Dick Rogers, Chapel Hill, NC (US); Jian Zhang, Durham, NC (US); Chi Yu Roy Chen, Raleigh, NC (US); Robert Croft, Durham, NC (US); Ronald Reichert, Cary, NC (US); William G. Hairston, Wake Forest, NC (US)

(73) Assignee: BASF Corporation, Florham Park, NJ (US)

(*) Notice: Subject to any disclaimer, the term of this patent is extended or adjusted under 35 U.S.C. 154(b) by 104 days.

(21) Appl. No.: 16/215,455

(22) Filed: Dec. 10, 2018

(65) Prior Publication Data
US 2019/0104732 A1    Apr. 11, 2019

Related U.S. Application Data

(63) Continuation of application No. 14/436,328, filed as application No. PCT/US2014/033829 on Apr. 11, 2014, now abandoned.

(60) Provisional application No. 61/791,474, filed on Mar. 15, 2013, provisional application No. 61/791,958, filed on Mar. 15, 2013, provisional application No. 61/791,177, filed on Mar. 15, 2013.

(51) Int. Cl.
A01N 35/02    (2006.01)
A01N 31/04    (2006.01)
A01N 31/16    (2006.01)
A01N 35/06    (2006.01)
A01N 49/00    (2006.01)
A01N 51/00    (2006.01)

(52) U.S. Cl.
CPC ............ *A01N 35/02* (2013.01); *A01N 31/04* (2013.01); *A01N 31/16* (2013.01); *A01N 35/06* (2013.01); *A01N 49/00* (2013.01); *A01N 51/00* (2013.01)

(58) Field of Classification Search
None
See application file for complete search history.

(56) References Cited

U.S. PATENT DOCUMENTS

| 3,361,622 | A | 1/1968 | Goodhue | |
| 5,885,600 | A * | 3/1999 | Blum | A01N 65/26 424/405 |
| 6,843,985 | B2 | 1/2005 | Erickson et al. | |
| 2004/0242699 | A1 | 12/2004 | Askham et al. | |
| 2007/0207927 | A1 | 9/2007 | Rosa et al. | |
| 2008/0131538 | A1 | 6/2008 | Glenn et al. | |
| 2011/0039694 | A1 | 2/2011 | Rosa et al. | |
| 2011/0229589 | A1 * | 9/2011 | Elraz | A01N 65/44 424/742 |
| 2014/0274684 | A1 * | 9/2014 | Wu | A01N 65/24 504/100 |
| 2015/0072857 | A1 | 3/2015 | Reichert et al. | |

FOREIGN PATENT DOCUMENTS

| EP | 0010630 A1 | 5/1980 | |
| EP | 1483965 A1 | 12/2004 | |
| WO | 9403058 A1 | 2/1994 | |
| WO | 02071840 A2 | 9/2002 | |
| WO | 2007103076 A1 | 9/2007 | |
| WO | 2009002485 A2 | 12/2008 | |
| WO | 2009036450 A1 | 3/2009 | |
| WO | 2012018250 A1 | 2/2012 | |
| WO | 2012143674 A2 | 10/2012 | |
| WO | 2012151556 A2 | 11/2012 | |
| WO | WO-2012151556 A2 * | 11/2012 | ............ A01N 35/10 |
| WO | 2013158284 A1 | 10/2013 | |

OTHER PUBLICATIONS

Mahavir Gupta, Olfactometric Evaluation of the Response of Apis florea F. to some repellent Ketones, 1989, Zool. Jb. Physiol, 93, p. 97-104 (Year: 1989).*
Queensland, Agricultural chemical users' manual, 2005, the state of Queensland, Department of primary industries and fisheries, p. 1-139 (Year: 2005).*
Dale Farnham, Corn Planting Guide, Sep. 2001, Iowa State University, Department of Agronomy, p. 1-8 (Year: 2001).*
Before Planting Your Sorghum, Apr. 30, 1998, Noble Research Institute (Year: 1998).*
International Search Report received from corresponding PCT/US2014/033829, dated Aug. 19, 2014.
Malerbo-Souza et al., "Efficiency of n-Octyl Acetate, 2-Heptanone and Citronellal in Repelling Bees from Basil (*Ocimum sellowii*— Labiatae)", vol. 47, n. 1 : pp. 121-125, Mar. 2004, Brazilian Archives of Biology and Technology.

(Continued)

*Primary Examiner* — Abigail Vanhorn
*Assistant Examiner* — Ali S Saeed
(74) *Attorney, Agent, or Firm* — Richa Dhindsa; BASF Global Intellectual Property

(57) ABSTRACT

The disclosure provides for methods of repelling, directing, altering the behavior, and controlling an insect by utilizing a compound or composition described herein. The disclosure also provides for methods of promoting the health of an insect by repelling a pest that preys on insect and/or by providing an antibiotic or nutritional supplement composition to an insect. The disclosure also provides for a composition including at least one repelling, controlling, or directing compound or composition described herein together with an insecticide, herbicide, fungicide, or miticide. Compounds, compositions, seeds, and plants useful in these methods are also described.

13 Claims, 50 Drawing Sheets
(37 of 50 Drawing Sheet(s) Filed in Color)

(56) References Cited

OTHER PUBLICATIONS

Innocent et al., "Repellency property of long chain aliphatic methyl ketones against Anopheles gambiae s.s", Tanzania Journal of Health Research (2008), vol. 10, No. 1, pp. 50-54.
W. Lwande et al., "Constituents of Commiphora Rostrata and Some of Their Analogues as Maize Weevil, Sitophilus Zeamais Repellents", Insect Sci. Applic. Vol. 13, No. 5, pp. 679-683, 1992.
Rieth, et al., "Repelling Honeybees from Insecticide-Treated Flowers with 2-Heptanone", Journal of Apicultural Research, 25(2): pp. 78-84 (1986).
Before Planting Your Grain Sorghum (1998).
Gupta, Zool. Jb. Physiol. (1989), vol. 93, pp. 97-104.
Agricultural chemical users' guide (2005), pp. 1-139.
Hildreth, STN online, file BIOSIS, Acc. No. 1946:11274 (Amer Bee Jour (1945), vol. 85, No. 6, p. 198), Abstract.
Mayer, D.F. et al., "Field evaluation of non-pesticide chemicals as honey bee repellents," Les Colloques—Institut National De La Recherche Agronomique, No. 98 (Hazards of Pesticides to Bees), 2001, pp. 159-168.
Gupta, M., "Olfacto-Gustatory Response of Apis florea F. to Some Repellent Ketones," Zool JB Physiol, vol. 93, 1989, pp. 105-111, XP9179500.
Daly et al., The Journal of Experimental Biology, vol. 204, pp. 3085-3095. (Year: 2001).

\* cited by examiner

2-Decanone with 50% Sucrose Solution

FIG. 3    50% Sucrose Solution

FIG. 26

| | 2D.5+20imid | 2D.5+10imid | 2D2+20imid | 2D2+10imid | Ros2+20imid | Ros2+10imid | 20imid | 10imid |
|---|---|---|---|---|---|---|---|---|
| 0H15 | 0 | 1 | 0 | 1 | 90 | 3 | 28 | 78 |
| 0H30 | 0 | 2 | 0 | 2 | 111 | 18 | 127 | 254 |
| 0H45 | 0 | 0 | 0 | 2 | 71 | 12 | 237 | 375 |
| 1H00 | 0 | 0 | 0 | 2 | 63 | 18 | 450 | 375 |
| 1H15 | 0 | 2 | 1 | 2 | 101 | 49 | 400 | 200 |
| 1H30 | 0 | 1 | 2 | 4 | 62 | 18 | 40 | 14 |
| 1H45 | 0 | 1 | 2 | 4 | 77 | 20 | 9 | 8 |
| 2H00 | 0 | 2 | 3 | 4 | 80 | 18 | 10 | 4 |
| 2H15 | 1 | 3 | 2 | 5 | 74 | 32 | 4 | 3 |
| 3H15 | 0 | 1 | 2 | 5 | 75 | 36 | 2 | 1 |
| 4H15 | 0 | 1 | 2 | 5 | 44 | 34 | 1 | 0 |

FIG. 28
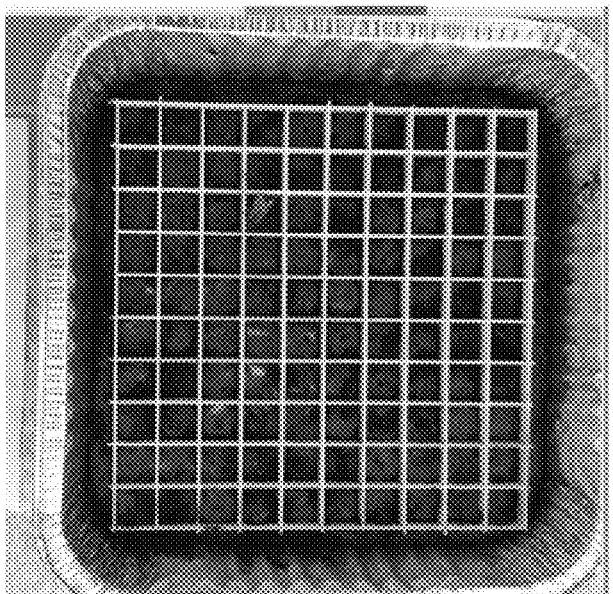
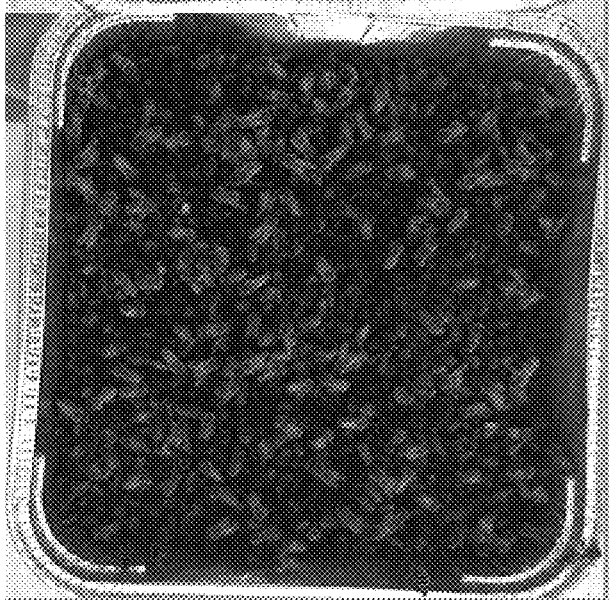

FIG. 37 A

| Time | TT.5 | ROSO1 | ROSP.25+CAMP.25 | ROSP2 | P0.5 | 2D.25+TT.25+ROSO.25 | 2D.25+ROSO.25 | 2D.25 | ROSO.5 |
|---|---|---|---|---|---|---|---|---|---|
| 0H15 | 0 | 0 | 6 | 0 | 0 | 0 | 1 | 2 | 0 |
| 0H30 | 0 | 0 | 13 | 0 | 0 | 0 | 3 | 9 | 1 |
| 0H45 | 0 | 0 | 8 | 0 | 3 | 0 | 2 | 3 | 1 |
| 1H00 | 0 | 0 | 4 | 0 | 2 | 0 | 2 | 2 | 2 |
| 1H15 | 0 | 0 | 10 | 2 | 2 | 1 | 2 | 0 | 1 |
| 1H30 | 0 | 0 | 8 | 0 | 1 | 1 | 1 | 5 | 1 |
| 1H45 | 0 | 0 | 9 | 0 | 1 | 0 | 1 | 2 | 1 |
| 2H00 | 0 | 0 | 4 | 0 | 3 | 0 | 2 | 1 | 4 |
| 2H15 | 0 | 0 | 1 | 0 | 4 | 1 | 3 | 1 | 1 |
| 2H30 | 0 | 0 | 5 | 3 | 13 | 0 | 3 | 3 | 3 |
| 2H45 | 0 | 0 | 6 | 1 | 4 | 0 | 1 | 2 | 2 |
| 3H00 | 0 | 0 | 2 | 1 | 4 | 1 | 5 | 0 | 4 |
| 3H15 | 0 | 1 | 2 | 0 | 12 | 1 | 3 | 0 | 3 |
| 5H15 | 0 | 1 | 2 | 0 | 9 | 4 | 1 | 1 | 6 |
| 6H45 | 2 | 2 | 2 | 2 | 4 | 4 | 1 | 1 | 7 |
| 24H | 11 | 10 | 5 | 2 | 4 | 6 | 4 | 2 | 13 |

FIG. 37 B

| Time | 2D.25+PO.25+ROSO.25 | 2D.25+TT.25 | 2D1 | ROSP.5 | 2D.25+CAMO.25 | CAMO.5 | CAMP.5 | FC | 2D.25+PO.25 | 2D.5 |
|---|---|---|---|---|---|---|---|---|---|---|
| 0H15 | 0 | 0 | 0 | 9 | 1 | 6 | 11 | 14 | 2 | 2 |
| 0H30 | 0 | 0 | 0 | 4 | 0 | 3 | 3 | 12 | 2 | 3 |
| 0H45 | 0 | 0 | 0 | 2 | 1 | 3 | 7 | 14 | 2 | 4 |
| 1H00 | 1 | 0 | 0 | 2 | 0 | 4 | 11 | 13 | 1 | 2 |
| 1H15 | 2 | 0 | 0 | 7 | 1 | 2 | 11 | 11 | 1 | 3 |
| 1H30 | 0 | 2 | 0 | 6 | 0 | 5 | 9 | 10 | 5 | 3 |
| 1H45 | 0 | 0 | 0 | 3 | 1 | 8 | 15 | 5 | 4 | 6 |
| 2H00 | 0 | 1 | 1 | 2 | 2 | 6 | 19 | 3 | 3 | 7 |
| 2H15 | 2 | 0 | 0 | 0 | 2 | 10 | 22 | 4 | 5 | 8 |
| 2H30 | 1 | 2 | 0 | 3 | 2 | 5 | 23 | 2 | 10 | 7 |
| 2H45 | 2 | 2 | 0 | 0 | 7 | 5 | 26 | 3 | 12 | 8 |
| 3H00 | 0 | 2 | 2 | 3 | 8 | 4 | 27 | 1 | 8 | 12 |
| 3H15 | 1 | 0 | 0 | 1 | 4 | 3 | 29 | 2 | 9 | 11 |
| 5H15 | 3 | 6 | 1 | 0 | 5 | 3 | 28 | 2 | 7 | 13 |
| 6H45 | 3 | 17 | 12 | 1 | 2 | 5 | 8 | 3 | 10 | 14 |
| 24H | 6 | 13 | 7 | 6 | 6 | 12 | 10 | 5 | 11 | 3 |

FIG. 39

| TT.5 | ROSO1 | ROSP2 | 2D.25+TT.25+ROSO.25 | 2D1 | FC | |
|---|---|---|---|---|---|---|
| 0H15 | 0 | 0 | 0 | 0 | 14 | 0H15 |
| 0H30 | 0 | 0 | 0 | 0 | 12 | 0H30 |
| 0H45 | 0 | 0 | 0 | 0 | 14 | 0H45 |
| 1H00 | 0 | 0 | 0 | 0 | 13 | 1H00 |
| 1H15 | 0 | 0 | 2 | 1 | 0 | 11 | 1H15 |
| 1H30 | 0 | 0 | 0 | 1 | 0 | 10 | 1H30 |
| 1H45 | 0 | 0 | 0 | 0 | 0 | 5 | 1H45 |
| 2H00 | 0 | 0 | 0 | 0 | 1 | 3 | 2H00 |
| 2H15 | 0 | 0 | 0 | 1 | 0 | 4 | 2H15 |
| 2H30 | 0 | 0 | 3 | 0 | 0 | 2 | 2H30 |
| 2H45 | 0 | 1 | 1 | 0 | 2 | 3 | 2H45 |
| 3H00 | 0 | 1 | 1 | 1 | 0 | 1 | 3H00 |
| 3H15 | 0 | 0 | 0 | 1 | 1 | 2 | 3H15 |
| 5H15 | 2 | 2 | 0 | 4 | 12 | 2 | 5H15 |
| 6H45 | 11 | 10 | 2 | 6 | 7 | 3 | 6H45 |
| 24H | | | | | | 5 | 24H |

FIG. 41

| | CS | FC | MSO | 3D1 | ROSP2 | 2DOD1 | CS+2D.5 | ROSP1 | ROSP1.5 |
|---|---|---|---|---|---|---|---|---|---|
| H0M15 | 10 | 84 | 18 | 1 | 2 | 2 | 0 | 2 | 5 |
| H0M30 | 26 | 300 | 36 | 1 | 7 | 85 | 6 | 15 | 34 |
| H0M45 | 92 | 600 | 57 | 3 | 9 | 5 | 6 | 53 | 104 |
| H1M00 | 85 | 700 | 53 | 2 | 5 | 1 | 2 | 106 | 163 |
| H1M15 | 113 | 800 | 38 | 1 | 5 | 2 | 4 | 143 | 198 |
| H1M30 | 102 | 800 | 32 | 4 | 16 | 3 | 2 | 199 | 248 |
| H1M45 | 86 | 800 | 32 | 5 | 6 | 3 | 2 | 246 | 255 |
| H2M00 | 64 | 800 | 28 | 15 | 18 | 2 | 4 | 289 | 284 |
| H2M15 | 51 | 800 | 32 | 25 | 21 | 3 | 4 | 300 | 350 |
| H2M30 | 78 | 750 | 28 | 55 | 27 | 10 | 3 | 350 | 400 |
| H2M45 | 61 | 750 | 28 | 49 | 47 | 12 | 6 | 350 | 350 |
| H3M00 | 82 | 750 | 20 | 56 | 76 | 4 | 2 | 350 | 300 |
| H3M15 | 88 | 750 | 20 | 86 | 152 | 1 | 3 | 300 | 300 |
| H5M15 | 0 | 225 | 0 | 20 | 85 | 0 | 0 | 175 | 175 |

COMPOUNDS, COMPOSITIONS, AND METHODS FOR ALTERING INSECT AND ORGANISM BEHAVIOR

CROSS REFERENCE TO RELATED APPLICATION

This application is a continuation of U.S. application Ser. No. 14/436,328, filed Apr. 16, 2015, which is a § 371 National Stage Application of PCT/US2014/033829, filed 11 Apr. 2014, which claims the benefit of U.S. Provisional Application Ser. No. 61/791,177, filed Mar. 15, 2013, U.S. Provisional Application Ser. No. 61/791,474, filed Mar. 15, 2013, and U.S. Provisional Application Ser. No. 61/791,958, filed Mar. 15, 2013.

BACKGROUND

Field of the Invention

The disclosure provides for methods of repelling, directing, altering the behavior of, and/or controlling an insect or other organism by utilizing a compound or composition described herein. The disclosure also provides for methods of promoting the health of an insect or other organism by repelling, directing, or controlling the insect or organism of interest to an area or place deemed beneficial to insect or organism, and/or by providing an antibiotic or nutritional supplement composition to the insect or organism of interest. The disclosure also provides for a composition including at least one repelling, controlling, or directing compound or composition described herein together with an insecticide, herbicide, fungicide, or other pesticide, as for example, a miticide. The disclosure also provides for methods of mitigating dust while selectively repelling, controlling, or directing an insect of interest. Compounds, compositions, seeds, and plants useful in these methods are also described.

There is a need to develop new methodology or approaches to selectively and effectively repel, control, or direct insects. One approach of the present invention is to control the behavior of all or a selected group/subset of organisms such as insects by controlling, directing or repelling them away from certain locations to other locations that are beneficial to their health. Another aspect of the present invention is to protect insects or other organisms of interest from pests, predators, or other agents that have, or are at least believed to have, an adverse influence on insect or organisms health.

Description of Related Art

Some selectively controlling, repelling or directing agents are known. But many of the known repellant agents that are believed to exhibit a directing, controlling and/or repelling influence on insects of interest lack sufficient controlling, directing or repellent efficacy and associated longevity. Additionally, many of these same repellent agents fail to exhibit a repelling efficacy for the time desired, for example, four hours or more. For example, Mayer et al. evaluated the repellency profile of 240 non-pesticide chemical compounds. *Hazards of Pesticides to Bees*, Avignon (France), Sep. 7-9, 1999 Ed. INRS, Paris, 2001 (Les Colloques, n 98), page 169. Of the 240 non-pesticide chemicals reviewed, Mayer et al. found that 11 compounds reduced the number of honeybee foragers at 1 hour of application. However, these same 11 compounds failed to confer repelling properties at 4 hours after application. Additionally, as described by Mayer et al., only a single compound was found to reduce the number of honey bee foragers after both 1 hour and 4 hours of application. These results highlight the importance of discovering additional compounds, compositions, or methodologies capable of better controlling or repelling insects over a longer period of time. To this end, the disclosed repelling, controlling, and directing compounds, compositions, and associated methods address this issue and have the ability to repel, control, and/or alter the behavior of insects over a longer period of time and with greater efficacy than previously recognized.

SUMMARY

In an aspect, the disclosure provides for a method of repelling, controlling, and/or directing an insect from a seed, plant part, or plant, or even a locus such as park or field or golf course, or a place, a structure or portions or combinations of portions of any of the foregoing, with at least one compound from Formula I-X as described herein.

In another aspect, the disclosure provides for a composition, seed, plant, or fertilizer composition with at least one compound from Formula I-X as described herein alone or in combination with an addition compound, composition, or active agent described herein.

In another aspect, the disclosure provides for a method of promoting the health of an insect by treating a seed, plant part, or plant with one or more of a compound or composition formulated to repel, control, or direct pests of an insect. In another, aspect, the disclosure provides for a method of promoting the health of an insect by providing a nutritional composition or an antibiotic composition to an insect.

In an aspect, the insect is a pollinating insect, such as a honeybee.

In another aspect, the repelling, controlling, or directing compound includes at least one $C_6$-$C_{15}$ ketone compound, an in one embodiment, preferably a $C_7$-$C_{12}$ ketone or $C_8$-$C_{15}$ ketone.

In another aspect, the $C_6$-$C_{15}$ ketone is selected from the group consisting of 3-heptanone, 4-heptanone, cycloheptanone, 2-octanone, 3-octanone, cyclooctanone, 2-nonanone, cyclononanone, 2-decanone, 3-decanone, 4-decanone, 5-decanone, 2-undecanone, 2-dodecanone, 2-trideconone, 2-tetradecanone, 2-pentadecanone, 2-hexadecanone, 2-heptadecanone, cyclodeconone, and sulfur (or thio) analogs of 2-decanone and associated oxidation states.

In an aspect, a composition described herein further includes an insecticide, herbicide, fungicide, or other pesticide, such as for example, a miticide. In yet another aspect, the composition further includes one or more insecticidal active agents selected from the group consisting of acetamiprid, clothianidin (available from Bayer CropScience LP of RTP, North Carolina, under the trademark "PONCHO"), dinotefuran, imidacloprid (available from Bayer CropScience LP under the trademark "GAUCHO"), nitenpyram, thiacloprid, thiamethoxam, ethiprole, fipronil, and a combination of clothianidin and a biologic product of *bacillus*. In another aspect, the *bacillus*-based compound is selected from the group consisting of *Bacillus firmus, Bacillus cereus, Bacillus pumilis, Bacillus amyloliquefaciens, Bacillus subtilis, Bacillus subtilis* strain GB03, *Bacillus subtilis* strain QST713. In another aspect, the miticide is selected from at least one compound selected from Formulas XIV-XVI, herein below.

In yet another aspect, the composition further includes an agent selected from the group consisting of one or more of camphor, camphor oil, camphor powder, tea tree oil, essential oils of tea tree, pine oil, rosemary powder, and rosemary oil which also operate to provide directing, controlling or repelling in an additive and/or synergistic manner in combination with the repellent compounds of the Formula I-XIII of the present invention.

In yet another aspect, the composition including at least one compound from Formula I-XII repels, directs, or controls a larger percentage of insects (in terms of the number of counted insects controlled of the same type or species, it does not refer to a larger percentage/number of species, though that may be possible as well) than an approximately equal percent by weight of a composition or compound selected from the group consisting of camphor oil, ajowan oil, camphor powder, and rosemary oil. In another aspect, a $C_7$-$C_{15}$ ketone describe herein repels a larger percentage of honeybees than an equal percent weight of a compound selected from the group consisting of camphor oil, ajowan oil, camphor powder, and rosemary oil.

In another aspect, the disclosure provides for at least one compound or composition capable of repelling at least 80% of the insects, for example a bee, for at least 8 hours. In an aspect, the repellant compound or composition of the present invention repels at least 95% of the insects for at least 24 hours.

In an aspect, the disclosure provides for a composition including:
  (a) at least one compound from Formula I-XIII; and
  (b) a compound or composition with insecticidal and/or nematicidal properties.

In an aspect, the disclosure provides for a seed, plant, or plant part treated or coated with a composition including:
  (a) at least one compound from Formula I-XIII; and
  (b) a compound or composition with insecticidal and/or nematicidal properties.

The disclosure also provides for a method of (i) repelling, controlling, and/or directing an insect and (ii) controlling insect or nematode infestation by treating a seed, plant part, or plant with a composition including:
  (a) at least one compound from Formula I-XIII; and
  (b) a compound or composition with insecticidal and nematicidal properties.

In an aspect, a compound or composition with insecticidal and/or nematicidal properties includes a neonicotinoid-based compound. In another aspect, a compound or composition with insecticidal and/or nematicidal properties includes clothianidin. In another aspect, a compound or composition with insecticidal and/or nematicidal properties includes clothianidin together with a *bacillus* compound or composition. In yet another aspect, a compound or composition with insecticidal and/or nematicidal properties includes clothianidin together with a biologic product of *bacillus*. In another aspect, the *bacillus*-based compound is selected from the group consisting of *Bacillus firmus, Bacillus cereus, Bacillus pumilis, Bacillus amyloliquefaciens, Bacillus subtilis, Bacillus subtilis* strain GB03, *Bacillus subtilis* strain QST713.

In yet another aspect, the composition may include an agent selected from the group consisting of camphor, camphor oil, camphor powder, tea tree oil, essential oils of tea tree, pine oil, rosemary powder, and rosemary oil. In an aspect, a compound or composition described herein is encapsulated. In another aspect, a compound of Formula I-XIII is encapsulated into a powder form, for example, a natural powder such as rosemary powder.

In another aspect, a seed, plant, or plant part described herein is corn, rice, sugarcane, cotton, sorghum, soybean, sugarbeet, canola, and rapeseed. In yet another aspect, compositions or methods described herein may be used to treat crop plants that are pollinated by pollinating insects, such as bees. In an aspect, the crop plant is selected from the group consisting of a fruit, citrus, okra, kiwifruit, strawberry, *papaya*, watermelon, tangerine, tangelos, orange, sweet orange, cantaloupe, melon, squash, lemon, lime, apple, mango, pear, passion fruit, apricot, cherry, peach, nectarine, almonds, avocado.

In an aspect, the disclosure provides for a dust reducing composition including:
  (a) one or more lubricant compositions described herein; and
  (b) one or more insect repelling, controlling, and/or directing compounds or compositions described herein.

In an aspect, the disclosure provides for a method of reducing dust by applying a lubricant composition to a seed. In another aspect, the disclosure provides for a method of reducing dust emission and repelling, controlling, or directing an insect by treating a seed with:
  (a) one or more lubricant compositions described herein; and
  (b) one or more insect repelling, controlling, and/or directing compounds or compositions described herein.

In another aspect, the disclosure provides for a seed including
  (a) one or more insecticidal, pesticidal, fungicidal, or herbicidal active agents; and
  (b) one or more organic lubricant compositions described herein; and
  (c) one or more insect repelling, controlling, and/or directing compounds or compositions described herein.

In another aspect, the disclosure provides for a seed coating including
  (a) one or more insecticidal, pesticidal, fungicidal, or herbicidal treating agent seed coating described herein; and
  (b) one or more organic lubricant compositions described herein; and
  (c) one or more insect repelling, controlling, and/or directing compounds or compositions described herein.

In another aspect, the disclosure provides for a composition including
  (a) talc, graphite, or combinations thereof; and
  (b) one or more insect repelling, controlling, and/or directing compounds or compositions described herein.

In yet another aspect, the disclosure provides for an article or structure comprising, consisting of, or consisting essentially of one or more insect repelling, controlling, and/or directing compounds or compositions described herein.

In an aspect, the lubricant is an organic lubricant. In another aspect, the organic lubricant described herein is a wax. In an aspect, the wax is a dust reducing compound or composition selected from the group consisting of polyethylene wax, carnuba wax, paraffin wax, polypropylene wax, oxidized polyethylene wax, montan wax, microcrystalline wax, Fischer-Tropsch wax, amide wax, ethylene-acrylic-acid wax, polyolefin wax, ethylene bis stearamide wax, bees wax, lanolin wax, and vegetable wax. In yet another aspect, the wax is a polyethylene wax, oxidized polyethylene wax, or powdered oxidized polyethylene wax.

In another aspect, the dust reducing lubricant is applied to a seed in an amount that is sufficient to reduce or mitigate dust. In another aspect, the dust reducing lubricant is applied to a seed at about 1.0-3.0 oz/cwt or about 0.5-4.0 oz/cwt·lubricant

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 26 sets forth the number of honeybees visiting feeding stations in numerical form with combinations of imidacloprid together with active agents over a specified time range.

FIG. 28 sets forth a visual representation of honeybee counts for a (A) a graphite (10 g) and fondant attractant (500 g) at 3.25 hours and (B) a graphite (10 g), 2-decanone (0.5%), and fondant attractant (500 g) at 3.25 hours.

FIGS. 37(A) and (B) describes the number of wasps visiting feeding stations for various active agents over specified time points.

FIG. 39 describes the number of wasps visiting feeding stations in numerical form for various active agents over specified time points.

FIG. 41 describes the effectiveness of various active agents in repelling honeybees using a fondant base over specified time points.

DETAILED DESCRIPTION OF A PREFERRED EMBODIMENT

Insect Repelling, Controlling, or Directing Compound

Figure 1:
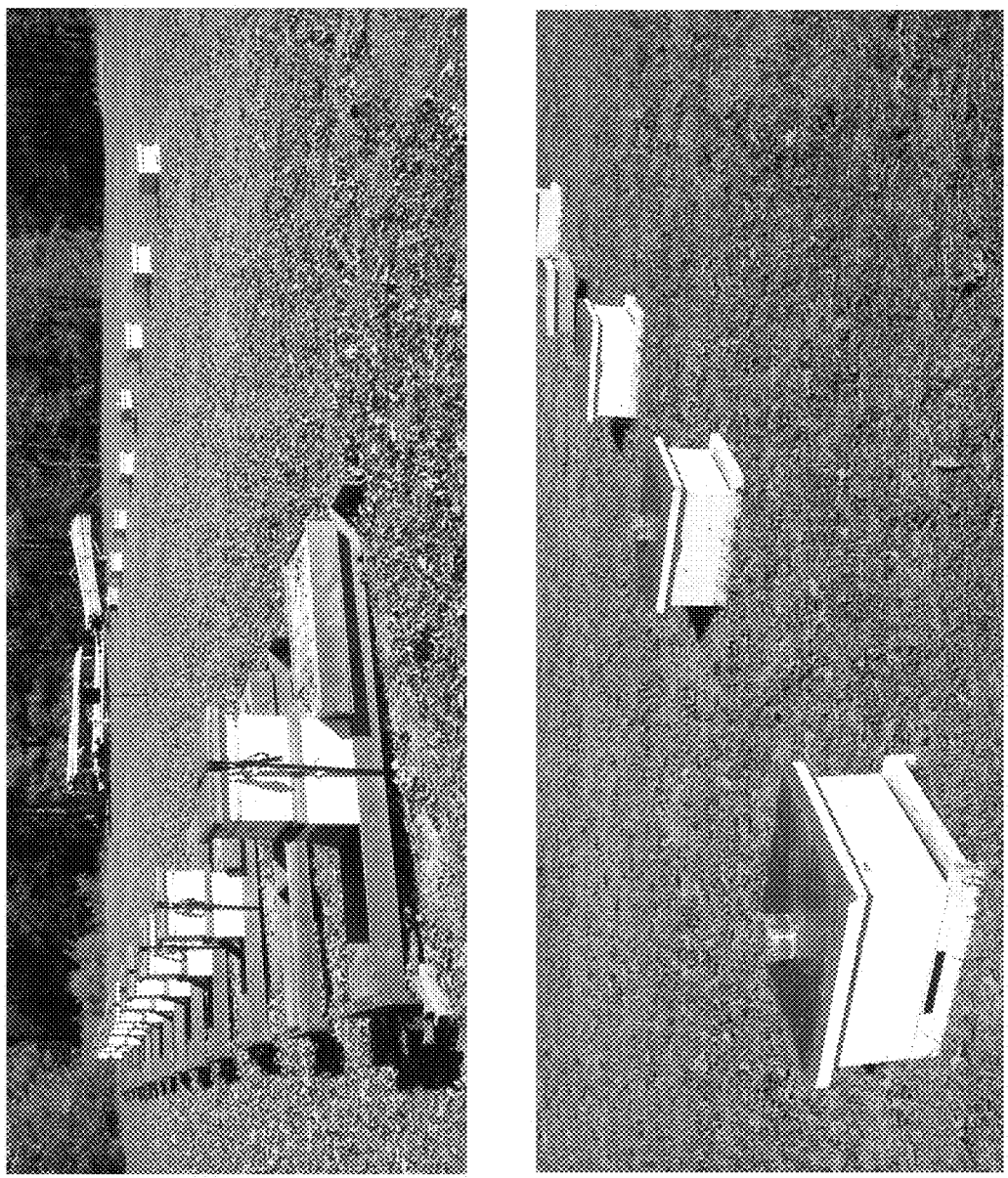
FIG. 1 sets forth the feeding station arrangement for the honeybee repulsion experiment of Example 1. Panel (A) sets forth the bee cage positions on the left portion of panel (A) with the randomized feeding station positions on the right portion of panel (A). Panel (B) sets forth an alignment of the randomized feeding station positions with a distance of two meters between feeding stations.
Figure 2:
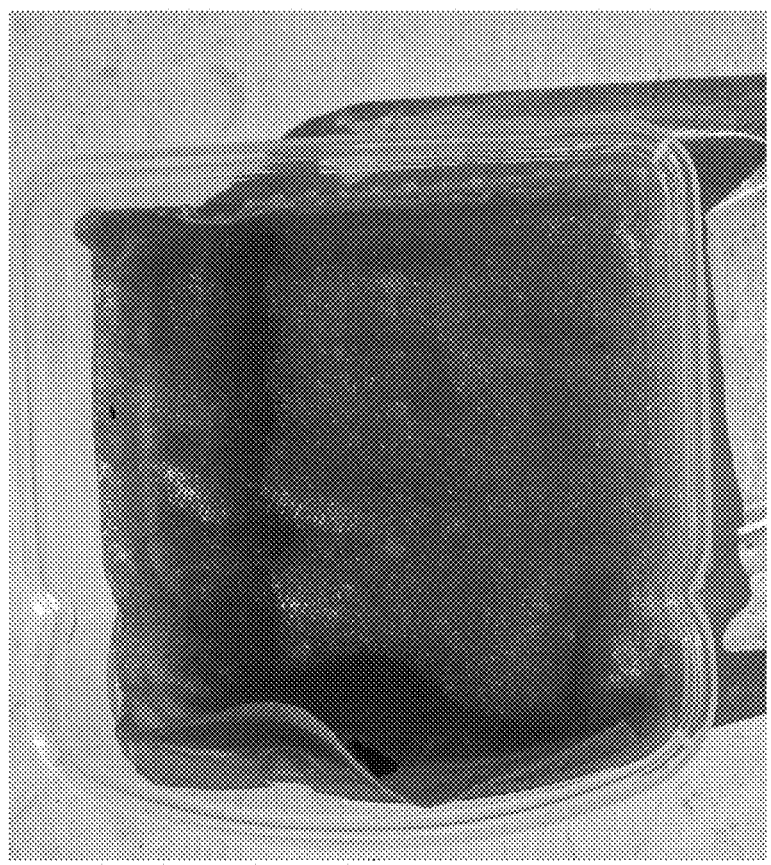
FIG. 2 sets forth a honeybee feeding station with a solution of 2-decanone with a 50% sucrose solution after 8 hours.
Figure 3:
FIG. 3 sets forth a honeybee feeding station with a 50% sucrose solution after 8 hours.
Figure 4:
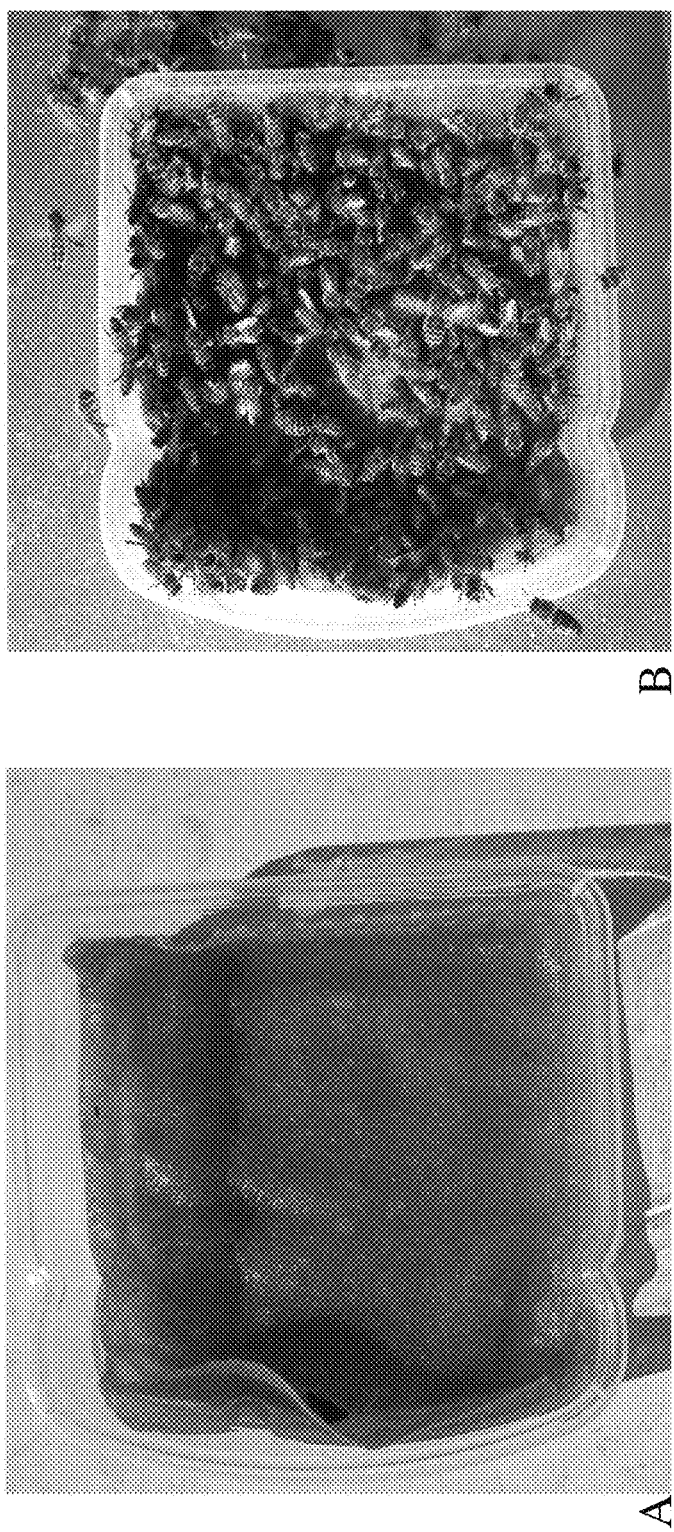
FIG. 4 sets forth a side by side comparison of the repulsion characteristics of (A) 2-decanone (left panel) with a 50% sucrose solution as compared to (B) a 50% sucrose control (right panel) on honeybees after a 8 hour period of time.

The disclosure provides for an insect repelling, controlling, and/or directing compound or composition. In another aspect, a repelling, controlling, and/or directing compound or composition described herein repels all or a broad range of insects. In another aspect, a repelling, controlling, and/or directing compound or composition described herein repels some but not all insects.

In an aspect, an insect repelling, controlling, or directing compound or composition described herein can control or alter the behavior of an insect, for example a pollinating insect, such as a bee. In another aspect, the disclosure provides for a repelling, controlling, or directing compound or composition of Formula I:

(I)

In an aspect, $R_1$ and $R_2$ are independently selected from an alkyl, aryl, phenyl, substituted phenyl, fused phenyl, heterocyclic ring, aryl alkyl, vinyl, acetyl, vinyl alky, propargyl, and ally group.

In another aspect, $R_1$ and $R_2$ are independently selected from methyl, ethyl, propyl, isopropyl, cyclopropyl, butyl, iso-butyl, tert-butyl, pentyl, hexyl, heptyl, octyl, nonyl, decyl, undecyl and substituted or non-substituted $C_2$-$C_{14}$-alkyl, substituted or non-substituted $C_2$-$C_{14}$ alkenyl, a substituted or non-substituted $C_2$-$C_{14}$-alkynyl.

In another aspect, $R_1$ is methyl or ethyl and $R_2$ is selected from the group consisting of methyl, ethyl, propyl, isopropyl, cyclopropyl, butyl, iso-butyl, tert-butyl, pentyl, hexyl, heptyl, octyl, nonyl, decyl, undecyl and substituted or non substituted $C_2$-$C_{14}$-alkyl, substituted or non substituted $C_2$-$C_{14}$ alkenyl, a substituted or non substituted $C_2$-$C_{14}$-alkynyl.

In a further aspect, $R_1$ is H and $R_2$ is an alkyl or aryl or $R_1$ is alkyl or aryl and $R_2$ is H. In another aspect, $R_1$ is H and $R_2$ is selected from any of the groups described herein. In yet another aspect, $R_1$ is H and $R_2$ is selected from the group consisting of methyl, ethyl, propyl, isopropyl, cyclopropyl, butyl, iso-butyl, tert-butyl, pentyl, hexyl, heptyl, octyl, nonyl, decyl, undecyl and substituted or non substituted $C_2$-$C_{14}$-alkyl, substituted or non substituted $C_2$-$C_{14}$ alkenyl, a substituted or non substituted $C_2$-$C_{14}$-alkynyl.

In another aspect, an alkyl group is a straight chain, branched, cyclic, cyclic alkyl optionally substituted with halogen, such as F, Cl, Br, I, oxygen, hydroxyl, alkoxy, cyano, aryloxy, C═C, C≡C; nitrogen, NH2, alkyl amino, dialkyl amine trialkylamino; SH, alkylthio and oxidation states, arylthio and oxidation states; amido, monoalkylamino, dialkylamino, and ureido.

In yet another aspect, $R_1$ and $R_2$ can form a ring, such as a cycloalkyl ring, for example, a cyclohexyl, cycloheptyl, cyclopentyl, cyclopropyl, cyclobutyl, cyclooctyl, fused alkyl ring, such as camphor. In another aspect, the $R_1$ and $R_2$ ring is a phenyl ring optionally substituted with one or more of halogen, OH, alkoxy, cyano, amino alkylamino, dialkylamino, SH, alkylthio and oxidation states, phenoxy, formyl, alkylcarbonyl, alkoxycarbonyl, haloalkyl, haloalkoxy, polyhaloalkyl, polyhaloalkoxy, perhaloalkyl, perhaloalkoxy, amido, alkylamino, amino, dialkylamino, hydroxycarbonyl, alkyl carbonyl, aryl carbonyl, and alkoxycarbonyl groups.

In another aspect, $R_1$ and $R_2$ are linked together to form a substituted or unsubstituted $(CH_2)_3$, $(CH_2)_4$, $(CH_2)_5$, $(CH_2)_6$, $(CH_2)_7$, $(CH_2)_8$, $(CH_2)_9$, $(CH_2)_{10}$, $(CH_2)_{11}$, $(CH_2)_{12}$, and a $(CH_2)_{13}$ ring structure.

In yet another aspect $R_1$ methyl or ethyl and $R_2$ is selected from the group consisting of methyl, ethyl, propyl, isopropyl, cyclopropyl, butyl, iso-butyl, tert-butyl, pentyl, hexyl, heptyl, octyl, nonyl, decyl, undecyl and substituted or non substituted $C_2$-$C_{14}$-alkyl, substituted or non substituted $C_2$-$C_{14}$ alkenyl, a substituted or non substituted $C_2$-$C_{14}$-alkynyl.

In another aspect, $R_1$ is methyl or ethyl and $R_2$ is selected from the group consisting of methyl, ethyl, propyl, isopropyl, cyclopropyl, butyl, iso-butyl, tert-butyl, pentyl, hexyl, heptyl, octyl, nonyl, decyl, undecyl and substituted or non substituted $C_2$-$C_{14}$-alkyl, substituted or non substituted $C_2$-$C_{14}$ alkenyl, a substituted or non substituted $C_2$-$C_{14}$-alkynyl.

In an aspect, the repelling, controlling, or directing compound is represented by Formula II, where $R_1$ and $R_2$ are defined above:

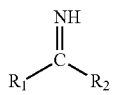

(II)

In an aspect, the repelling, controlling, or directing compound is represented by Formula III, where $R_1$ and $R_2$ are defined above:

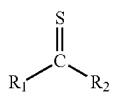

(III)

In an aspect, the repelling, controlling, or directing compound is represented by Formula IV, where $R_1$ and $R_2$ are defined above:

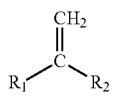

(IV)

In an aspect, the repelling, controlling, or directing compound is represented by Formula V, where $R_1$ and $R_2$ are defined above:

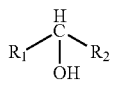

(V)

In an aspect, the repelling, controlling, or directing compound is represented by Formula VI, where $R_1$ and $R_2$ are defined above:

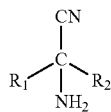

(VI)

In an aspect, the repelling, controlling, or directing compound is represented by Formula VII, where $R_1$ and $R_2$ are defined above:

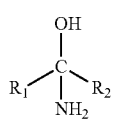

(VII)

In an aspect, the repelling, controlling, or directing compound is represented by Formula VIII, where $R_1$ and $R_2$ are defined above and wherein $R_3$ and $R_4$ are individually selected from H, alkyl, methyl, ethyl, propyl, or butyl. In another aspect $R_3$ and $R_4$ can be any of the above referenced alkyl groups.

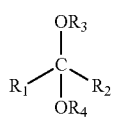

(VIII)

In an aspect, the repelling, controlling, or directing compound is represented by Formula IX, where $R_1$ and $R_2$ are defined above:

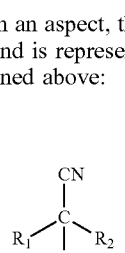

(IX)

In an aspect, the repelling, controlling, or directing compound is represented by Formula X, where $R_1$ and $R_2$ are defined above and n is 0, 1, or 2:

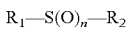

$$R_1-S(O)_n-R_2 \qquad (X)$$

In an aspect, the repelling, controlling, or directing compound is represented by Formula XI and conjugates and isomers thereof, where $R_1$ and $R_2$ are defined above:

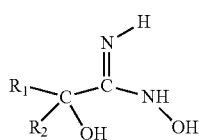

(XI)

In an aspect, the repelling, controlling, or directing compound is represented by Formula XII and conjugates and isomers thereof, where $R_1$ and $R_2$ are defined above:

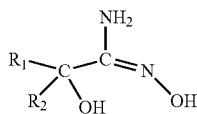
(XII)

In an aspect, the repelling, controlling, or directing compound is represented by Formula XIII and conjugates and isomers thereof:

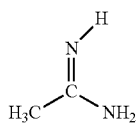
(XIII)

In yet another aspect, the disclosure provides for a compound of Formula I-XII, wherein $R_1$ and $R_2$ are independently selected from methyl, ethyl, propyl, isopropyl, cyclopropyl, butyl, iso-butyl, tert-butyl, pentyl, hexyl, heptyl, octyl, nonyl, decyl, undecyl and substituted or non substituted $C_2$-$C_{14}$-alkyl, substituted or non substituted $C_2$-$C_{14}$ alkenyl, a substituted or non substituted $C_2$-$C_{14}$-alkynyl, alkyl substituted with halogen, F, Cl, Br, I, oxygen, hydroxyl, alkoxy, cyano, aryl, aryloxy, arylalkyl, C=C, C≡C; nitrogen, NH2, alkyl amino, dialkyl amine trialkylamino; SH, alkylthio or where $R^1$ and $R^2$ are linked together to form a substituted or unsubstituted $(CH_2)_3$, $(CH_2)_4$, $(CH_2)_5$, $(CH_2)_6$, $(CH_2)_7$, $(CH_2)_8$, $(CH_2)_9$, $(CH_2)_{10}$, $(CH_2)_{11}$, $(CH_2)_{12}$, $(CH_2)_{13}$ ring structure, phenyl, substituted phenyl, phenyl optionally substituted with one or more of halogen, alkyl, nitro, cyano, alkoxy, alkyl thio and oxidation states, amido, amino, alkylcarbonyl, alkoxycarbonyl, hydroxycarbonyl, and hydroxy.

In another aspect, the disclosure provides for a compound of Formula I-X, wherein $R_1$ and $R_2$ are independently selected from phenyl, substituted phenyl, phenyl optionally substituted with one or more of halogen, alkyl, nitro, cyano, alkoxy, alkyl thio and oxidation states, amido, amino, alkylcarbonyl, alkoxycarbonyl, hydroxycarbonyl, and hydroxy.

In another aspect, the disclosure provides for optically active and/or geometric isomers and/or salts thereof of compounds of Formula I-XIII. In yet another aspect, the disclosure provides for metabolites, analogues, homologues, isomers, diastereomers, conjugate isomers, oxidation states, tautomers, and salts thereof of compounds of Formula I-XIII. In another aspect, the methodology described herein can be practiced with one or more compounds represented by Formula I-XIII In an aspect, the insect repelling, controlling, or directing compound or composition is selected from the group consisting of a ketone, such as a $C_5$-$C_7$ ketone, $C_6$-$C_9$ ketone, $C_7$-$C_{10}$ ketone, a $C_8$-$C_{12}$ ketone, $C_{10}$-$C_{12}$ ketone, a $C_7$-$C_{15}$ ketone, or a methyl ketone. In another aspect, the insect repelling, controlling, or directing compound is selected from one or more of 2-pentanone, cyclopentanone, 2-pentanimine, 2-hexanone, 3-hexanone, cyclohexanone, 2-methylcyclohexanone, 3-methylcyclohexanone, 4-methylcyclohexanone, 2-heptanone, 3-heptanone, 4-heptanone, heptyl, 1-acetyl, cycloheptanone, 2-octanone, 3-octanone, cyclooctanone, 2-nonanone, cyclononanone, 2-decanone (methyl-n-octyl ketone), 2-undecanone (methyl-n-nonylketone), 2-dodecanone, 1,3-dioxolane, 2-methyl-2-octyl, 2-trideconone, 2-tetradecanone, 2-pentadecanone, 2-hexadecanone, 2-heptadecanone, 2-nonanethione, cyclodeconone, decane, 2,2-dimethoxy, sulfur analog of 2-decanone, 2-decanimine, (+)-2-decanol, 2-decanol, 2,9-decanedione, 2,11-dodecanedione, 2,5-dodecanedione, 2,2-decanediol, 1-undecen-2-ol, 3-decanone, 4-decanone, 5-decanone, 9-methyl, decanal, ethanone, 1-[3-methyl-4-(trifluoromethyl) phenyl], ethanone, 2,2,2-trifluoro-1-phenyl, 5,9-undecadien-2-one, 6,10-dimethyl-, (5E)-, 2-pentadecanone, 4-methylcyclohexanone, p-methylacetophenone, propionphenone, 2-Hydroxyacetophenone, 2,9-decanedione, 2,11-dodecanedione, 2,5-dodecanedione, and 2-hydroxy acetophenone.

In an aspect, the insect repelling, controlling, or directing compound or composition is selected from the group consisting of a compound from 3-heptanone, 4-heptanone, cycloheptanone, 2-octanone, 3-octanone, cyclooctanone, 2-nonanone, cyclononanone, 2-decanone, 3-decanone, 4-decanone, 5-decanone, 2-undecanone, 2-dodecanone, 2-trideconone, 2-tetradecanone, 2-pentadecanone, 2-hexadecanone, 2-heptadecanone, cyclodeconone, and sulfur (or thio) analogs of 2-decanone and associated oxidation states.

In another aspect, a repelling, controlling, or directing compound or composition is selected from the group consisting of Table 1:

TABLE 1

| Structure | Name |
|---|---|
| | Compound 1 |
| | Compound 2 |
| | Compound 3 |
| | Compound 4 |
| | Compound 5 |
| | Compound 6 |
| | Compound 7 |
| | Compound 8 |

TABLE 1-continued

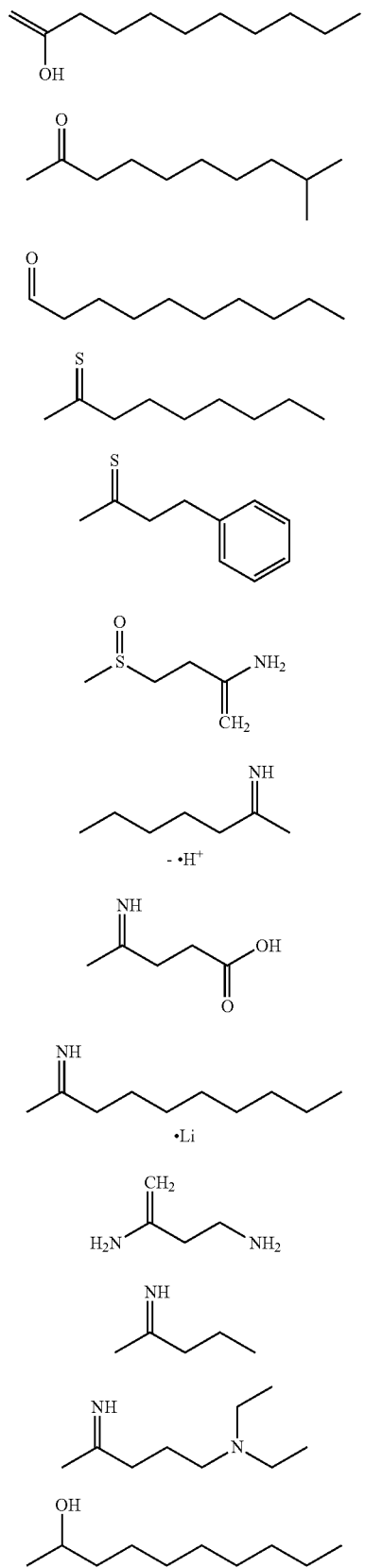

Compound 9
Compound 10
Compound 11
Compound 12
Compound 13
Compound 14
Compound 15
Compound 16
Compound 17
Compound 18
Compound 19
Compound 20
Compound 21

TABLE 1-continued

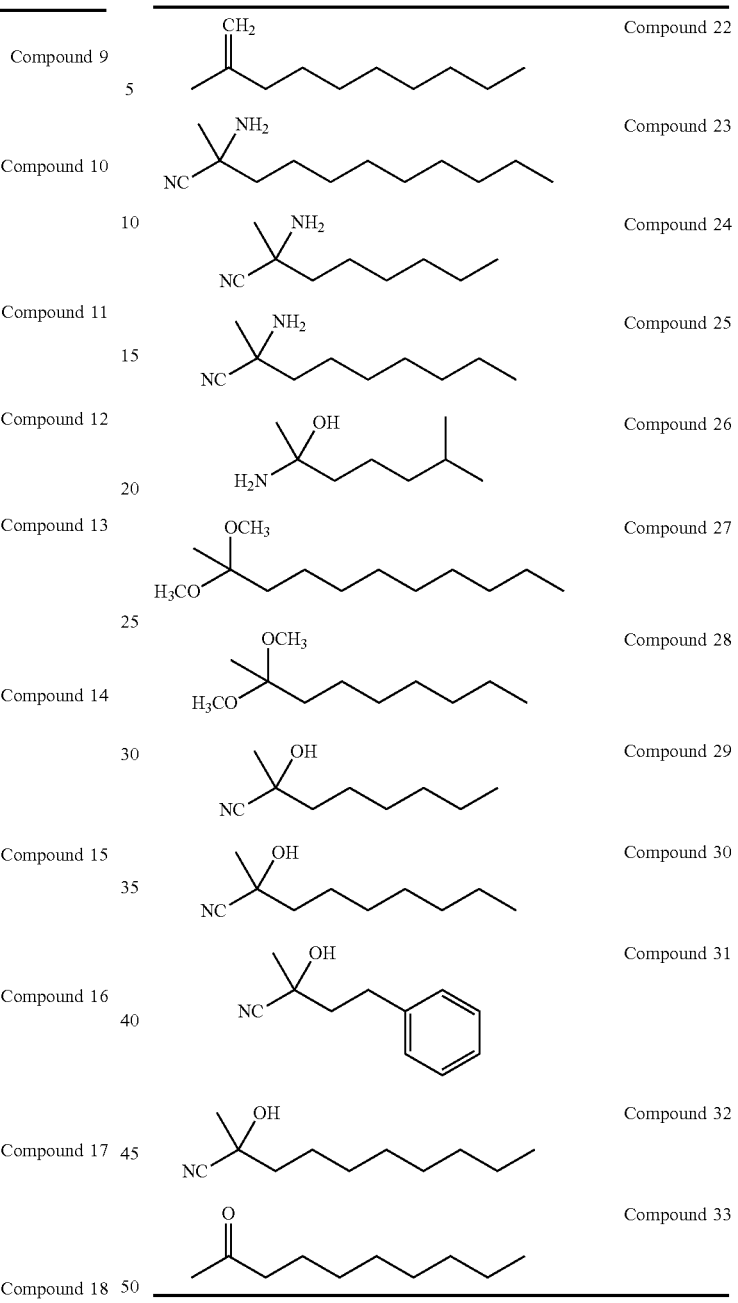

Compound 22
Compound 23
Compound 24
Compound 25
Compound 26
Compound 27
Compound 28
Compound 29
Compound 30
Compound 31
Compound 32
Compound 33

In another aspect, the disclosure provides for a composition comprising, consisting of, or consisting essentially of a compound selected from one or more of $CH_3S(O)(CH_2)_7CH_3$, $CH_3S(O)_2(CH_2)_7CH_3$, $CH_3S(O)(CH_2)_8CH_3$, $CH_3S(O)_2(CH_2)_8CH_3$, $CH_3S(O)(CH_2)_7S(O)CH_3$, $CH_3S(O)(CH_2)_6S(O)CH_3$, $CH_3CH_2S(O)(CH_2)_6CH_3$, $CH_3S(O)(CH_2)_6CH_3$, $CH_3S(O)Ph$, $CH_3S(O)CH_2Ph$, $CH_3S(O)(CH_2)_4CH_3$, $CH_3S(O)(CH_2)_5CH_3$, $CH_3S(O)(CH_2)_3CH_3$, $CH_3S(O)_2(CH_2)_3CH_3$, $CH_3S(O)(CH_2)_6C(O)CH_3$, and $CH_3S(O)_2(CH_2)_6C(O)CH_3$. In another aspect, one or more of the above compounds are used in combination with any of the methods or compositions described herein.

In an aspect, methyl ketones of $C_5$-$C_7$ have a lower repellent activity than those with $C_8$-$C_{12}$. In an aspect, by "lower" it is meant that the methyl ketones of $C_5$-$C_7$ repel, control, or direct a lower percentage of insects of interest relative to $C_8$-$C_{12}$ ketones. In another aspect, by "lower" it is meant that the methyl ketones of $C_5$-$C_7$ repel, control, or direct an insect for a shorter period of time, less insects of interest, or combinations of interest relative to $C_8$-$C_{12}$ ketones. In another aspect, the volatility of methyl ketones of $C_5$-$C_7$ is higher than that of methyl ketones of $C_5$-$C_{12}$.

In another aspect, methyl ketones of $C_5$-$C_7$ have a lower repellent activity than those with $C_8$-$C_{15}$. In another aspect, the volatility of methyl ketones of $C_5$-$C_7$ is higher than that of methyl ketones of $C_8$-$C_{15}$.

In yet another aspect, the disclosure provides for one or more of an insect repelling, controlling, or directing compound or composition selected from the group consisting of pine oil, tea tree oil, essential oil of tea tree, densifolia leaf essential oil, essential oil of *ocimum* santum, systox, phenol, alkaloids, *carum* copticum oil, propionic anhydride, butyric anhydride, methyl salicylate, 6-hexatriacontene, stenpcereol, 27,28,29-trisnor-13-15-17-meratriene, samaderine E, phenylacetaldehyde, benzaldehyde, *Swertia densifolia* leaf essential oil, linalool, ambrette seed oil, cascarilla bark oil, leaf oil, cascarilla bark oil, rue oil, rue flower oil, terpineol, stearic acid, hydroquinone and octadecanal, methyl anthranilate, methyl anthranilate, creosote, acetic acidand propionic acid, N,N-diethyltoluamide, dimethyl phthalate, and isopropyl cinnamate. The disclosure also provides for one or more of an insect repelling, controlling, or directing compound or compound combinations selected from the group consisting of citronella (for example, *Cymbopogon* spp, *Cymbopogon nardus*, *Cymbopogon winterianus* and *Cymbopogon citratus*), eucalyptus (*Eucalyptus* spp.), lemon eucalyptus (*Corymbia citriodora*), cinnamon (*Cinnamomum verum*), castor (*Ricinus communis*), rosemary (*Rosmarinus officinalis*), cedar (*Cedrus* spp.), peppermint (*Mentha piperita*), clove (*Syzygium aromaticum*), geranium (*Pelargonium graveolens*), verbena (*Verbena* spp., *Verbena officinalis*), pennyroyal (*Mentha pulegium*), lavender (*Lavandula* spp.), pine (*Pinus* spp.), cajeput (*Melaleuca* spp.; *Melaleuca leucadendra*), basil (*Ocimum basilicum*), thyme (*Thymus vulgaris*), pandan (*Pandanus amaryllifolius*), allspice (*Pimenta dioica*), soybean (*Glycine max*), garlic (*Allium sativum*), DEET, Picaridin, p-Mentane-3,8-diol, Permethrin, Allethrin, Metofluthrin, Geraniol, Eugenol, Cinnamaldehyde, Alkaloids, p-cymene, linalool, α-pinene, β-pinene, sabinene, myrcene, α-phellandrene, α-terpinene, α-terpineol (a component of tea tree oil and pine oil), α-ter, limonene, 1,8-cineole, γ-terpinene, terpinolene, terpinen-4-ol and α-terpineol, copticum, and Ptychotis oil.

In an aspect, the compounds and compositions described herein exhibit a synergistic influence when combined. In another aspect, compounds of Formula I-XIII exhibit a synergistic influence when combined. In another aspect, compounds 1-33 in Table 1 exhibit a synergistic influence when combined. In yet another aspect, these compounds produce an additive effect.

In an aspect, the disclosure provides for a method described herein wherein 2-decanone at 0.5 weight percent exhibits greater repellency than 2-decanone at 1.0 weight percent and/or 2-decanone at 2.0 weight percent. In another aspect, the disclosure provides for a method described herein wherein 2-decanone at 1.0 weight percent exhibits greater repellency than 2-decanone at 2.0 weight percent.

In an aspect, the insect repelling, controlling, or directing compound or compositions comprises, consists of, or consists essentially of any of the repelling, controlling, or directing compound or compositions described herein.

In another aspect, the disclosure provides for a composition comprising, consisting essentially of, or consisting of 2-decanone and rosemary oil. In another aspect, the disclosure provides for a composition comprising, consisting essentially of, or consisting of 2-decanone and camphor. In yet another aspect, the disclosure provides for a composition comprising, consisting essentially of, or consisting of 2-decanone, rosemary oil, and camphor. In an aspect, these compounds produce a synergistically effect. In yet another aspect, these compounds produce an additive effect.

In another aspect, the insect repelling, controlling, or directing compound or composition described herein works by influencing or altering the senses of an insect. In another aspect, the compound or composition alters the olfactory senses, taste, sight, tactile (e.g. burning or itch) or other physical characteristics of an insect, or in another aspect of the invention, the repelling, controlling or directing compound of the present invention can be combined with one or more compounds that act on one or more senses in a synergistic or additive manner, to affect and thereby control, direct or repel the insect across more than one sense.

In another aspect, the insect repelling, controlling, or directing compound, compound combination, or composition does not include heptanone, 2-heptanone, compounds that mimic the activity of 2-heptonone, 2-undecanone, 2-dodecanone, 2-trideconone, N,N-diethyl-m-toluamide ("DEET"), benzaldehyde, phenol, or any combination thereof.

In an aspect, the insect repelling, controlling, or directing composition includes 2-decanone and not 2-heptanone. In an aspect, the composition includes 2-decanone and not 2-undecanone. In another aspect, the composition includes 2-decanone and not 2-dodecanone. In yet another aspect, the composition includes 2-decanone and not 2-trideconone. Yet in another aspect, the composition includes 2-decanone and not 2-heptanone, 2-undecanone, 2-dodecanone, or 2-trideconone.

In an aspect, the composition does not contain a neem plant, neem part thereof, neem oil, or neem extract.

Methods of Repelling, Controlling, or Directing an Insect

In an aspect, the disclosure provides for a method of repelling, controlling, or directing an insect by utilizing a compound or composition described herein. In another aspect, the disclosure provides for a method of repelling, controlling, or directing an insect, or an insect of interest, for example a bee, by treating a seed, plant part, or plant with a compound or composition described herein.

In an aspect, a compound or composition described herein repels, controls, or directs all or a broad range of an insect of interest, for instance a bee. In another aspect, a compound or composition described herein repels, controls, or directs on a selective basis. In yet another aspect, the insect may be directed by coming into contact with a compound or composition described herein. In another aspect, an insect of interest, such as a bee, in a manner such that the insect is not in direct contact with a substance treated with the repellent, controlling, or directing compound or composition. In another aspect, a compound or composition described herein repels, controls, or directs an insect of interest, such as a bee, in a manner such that the insect has only minimal contact with a treated substance.

In an aspect, a compound or composition described herein repels, controls, or directs all or a broad range of an insect of interest, for instance a bee. In another aspect, a compound or composition described herein repels, controls, or directs on a selective basis. In yet another aspect, the insect may be directed by coming into contact with a compound or composition described herein. In another aspect, an insect of interest, such as a bee, in a manner such that the insect is not in direct contact with a substance treated with the repellent, controlling, or directing compound or composition. In another aspect, a compound or composition described herein repels, controls, or directs an insect of interest, such as a bee, in a manner such that the insect has only minimal contact with a treated substance.

In another aspect, the disclosure provides for a method of repelling, controlling, or directing an insect from a location or structure treated with a compound or composition described herein. In another aspect, the disclosure provides for a method of repelling, controlling, or directing an insect in connection with foraging and/or collecting nectar from a flower of a plant treated with a repelling, controlling, or directing compound or composition described herein. In another aspect, the disclosure provides for a method of treating any seed that may germinate into an attracting flower for an insect.

In another aspect, the disclosure provides for a method of directing an insect, for example a bee, away from a seed, plant part, plant, location, or structure treated with a chemical, insecticide, herbicide, or fungicide.

In yet another aspect, the disclosure provides for a method of repelling, controlling, or directing an insect from an area, substrate or substance while at the same time attracting an insect to a different area, substrate or substance. The disclosure provides for a method of treating an area, substrate, or substance with a repelling, controlling, or directing compound or composition described herein and at the same or different time treating a distinct area, substrate or substance with an insect attractant compound that is strategically placed at an optimized distance. In an aspect, such a methodology can help to increase repelling, controlling, or directing efficacy by repelling an insect from an area to be avoided while attracting the same insect to an area of interest. The following provides a non-limiting example of such a methodology:

(1) a seed, plant part, plant, area, location, or substance is treated with one or more repelling, controlling, or directing compounds or compositions described herein at "location 1" or "area 1" or portion thereof; and (2) a bait station, other substance, location, or area is treated with one or more attractant compounds or compositions at "location 2" or "area 2" or portion thereof which is a predetermined or optimized distance from "location 1" or "area 1" or portion thereof.

In another aspect, a seed, plant part, plant, area, or substance is treated with one or more repelling, controlling, or directing compounds or compositions described herein at "area 1" or "location 1" or portion thereof and a seed, plant part, plant, area, or substance is treated with one or more attractant compounds or compositions at "area 2" or "location 2" or portion which is a predetermined or optimized distance away from "area 1" or "location 1" or portion.

In another aspect, a seed, plant part, plant, area, or substance is treated with at least one repelling, controlling, or directing compounds or compositions described herein at "field 1" or "structure 1" or portion thereof and a seed, plant part, plant, area, or substance is treated with an attractant compound at "field 2" or "structure 2" or portion thereof which is a predetermined or optimized distance away from "field 1" or "structure 1" or portion thereof.

In yet another aspect, "area 1," "location 1," "field 1," or "structure 1" or portion thereof are a distance of about 0.1 meters, about 0.5 meters, about 1 meter, about 3 meters, about 5 meters, about 10 meters, about 25 meters, about 50 meters, about 100 meters, about 200 meters, or about 300 meters away from "area 2," "location 2," "field 2," "structure 2," or portion thereof. In another aspect, "area 1," "location 1," "field 1," or "structure 1" or portion thereof are a distance apart that is sufficient to repel, direct, or control an insect from "area 1," "location 1," "field 1," or "structure 1" or portion thereof and attract the insect to "area 2," "location 2," "field 2," or "structure 2" or portion thereof.

In another aspect, one or more, two or more, three or more, or four or more "locations," "areas," "fields," or "structures" or portions thereof can be treated with one or more repelling, controlling, or directing compounds or compositions or one or more attractant compounds or compositions.

In an aspect, an "area" or "location" is a field, including but not limited to woodland fields, and/or athletic "fields" such as football, soccer, baseball or similar fields, or larger "fields" such as golf courses and the like, crop site, bush, tree, lawn, waste area, and/or trash container. In an aspect, a "structure" is a bait, bait mechanism or holder, container, container designed to hold an insect, building, house, trap, trap designed to hold an insect, and/or interior or exterior of a residential or commercial building.

In yet another aspect, a compound or composition described herein is applied to a border or outer edge of a field, location, structure or dwelling or portions thereof. In another aspect, a compound or composition described herein is applied to the border or outer edge of a field or area or portion thereof prior to the application of seed to a field, at the time of seed planting, after seed planting, or combinations thereof. In another aspect, the seed is applied to a field or area by a mechanized planter, such as a tractor. In yet another aspect, a compound or composition described herein, such as a repelling, controlling, or directing compound or composition is dispersed via a tractor at the same time seed is planted, before seed is planted, after seed is planted, or combinations thereof. In another aspect, the field or area is not been tilled prior to seed application. In yet another aspect, the field has not been tilled for about 10 minutes to about 24 hours, about 1 hour to about 8 hours, about 24 hours to about 48 hours, about 24 hours to about one month, or about one month or more prior to application of a compound or composition described herein. The field or area may also contain vegetation, such a weeds, crops, or dandelions, prior to application of a compound or composition described herein. By applying a compound or composition described herein, such as a repelling, directing, or controlling compound, to a boarder or outer edge of a field or area, a zone or buffer can be created to keep an insect of interest, such as a bee, from penetrating the zone or buffer.

In another aspect, a compound or composition described herein is applied to the interior portion of an area or field. In another aspect, the field or area is cleared, for example by application of an herbicide, prior to seed planting. In yet another aspect, the field or area is treated with a herbicide for about 10 minutes to about 24 hours, about 1 hour to about 8 hours, about 24 hours to about 48 hours, about 72 hours to about one month, or about one month or more prior to application of a compound or composition described herein.

In an aspect, the percent of the compound on any composition or formulation is determined by the interplay of the effectiveness in the compound repellency, the medium or other components in which the compound is carried, the methods of application and the area that is being treated, when in terms of surface area or volume. For example, where the surface is a flat plate or wall, surface area may be used, and where the area is a room or other space, volume may be used to determine rates of applications.

Methods of Promoting Insect Health

The disclosure also provides for a method of promoting the health of an insect, for example a bee, by utilizing a compound or composition described herein. In another aspect, the disclosure provides for a method of promoting the health of an insect, for example a bee, by treating a seed, plant part, or plant with a compound or composition described herein. In an aspect, a compound or composition described herein is applied, incorporated, or coated on a seed, plant part, or plant thereof.

In an aspect, the disclosure provides for a method of promoting the health of an insect, for example a bee, by repelling a predator and/or a pest that preys on insects or bees. In another aspect, a seed, plant part, or plant is treated with a compound or composition capable of repelling a predator and/or a pest that preys on insects, an insect, or bees. In yet another aspect, a seed, plant part, or plant is treated with:
(1) a first repelling, controlling, or directing compound or composition designed to repel, control, or direct an insect, such as a bee, and
(2) a second compound or composition designed to repel, control, direct or kill a predator or a pest of an insect, such as a bee.

In an aspect, the first repelling, controlling, or directing compound or composition designed to repel, control, or direct an insect, for example, a bee and the second compound or composition designed to repel a predator or a pest of a bee are applied to a seed, plant part, or plant at the same time or at different times. In another aspect, the first repelling, controlling, or directing compound or composition designed to repel, control, or direct a bee and the second compound or composition designed to repel, control, direct, or kill a predator or a pest of a bee are applied to a seed, plant part, or plant in the same coating or in two, three, four, or five or more different coating steps. In another aspect, a pest is a mite, such as a *Varroa* mite or parasitic mite, as described herein. In another aspect, a pest is an ant, for example a wax ant. In another aspect, a pest is a dragonfly, or a bird, such as a kingbird or mockingbirds.

The disclosure also provides for a method of reducing infection or virus in an insect, for example a bee, by utilizing a compound or composition described herein. In another aspect, the disclosure provides for a method of reducing infection or virus in an insect, for example a bee, by treating a seed, plant part, or plant with a compound or composition described herein. In an aspect, the health of an insect is promoted in that a virus or infection is reduced or eliminated as the result of exposure to an antibiotic or nutritional compound or composition.

The disclosure also provides for a method of promoting the health of an insect, for example a bee, by delivering an antibiotic to promote the health of an insect or bee. In an aspect, the disclosure provides for a method of:
(1) treating a seed, plant part, or plant with a first attractant compound or composition designed to attract or control an insect, for example a bee, and
(2) an antibiotic or treatment compound or composition designed to promote the health of an insect, for example a bee.

In an aspect, the disclosure provides for a method of promoting the health of a bee hive by repelling a predator and/or a pest that preys on an insect, for example a bee. In another aspect, a seed, plant part, or plant is treated with a compound or composition capable of repelling a predator and/or a pest that prey on an insect, such as a bee. In yet another aspect, a seed, plant part, or plant is treated with:
(1) a first repelling, controlling, or directing a compound or composition designed to repel or control an insect, for example a bee, and
(2) a second compound or composition designed to repel, control, or direct a predator or a pest of an insect, for example a bee.

The disclosure also provides for a method of promoting the health of an insect, for example a bee, by repelling, controlling, or directing a mite. In an aspect, the disclosure provides for a method of:
(1) treating a seed, plant part, or plant with a first repelling, controlling, directing, or treating compound or composition designed to repel, control, direct, treat, attract or control a pest of an insect, for example a mite; and
(2) treat a seed, plant part, or plant with an antibiotic or treatment compound or composition designed to promote the health of an insect, for example a bee.

In an aspect, the first repelling, controlling, or directing compound or composition designed to repel, control, or control an insect, for example a bee and the second compound or composition designed to repel a predator or a pest of an insect, for example a bee are applied to a seed, plant part, or plant at the same time or at different times. In another aspect, the first repelling, controlling, or directing compound or composition designed to repel or control an insect, for example a bee, and the second compound or composition designed to repel, control, or direct a predator or a pest of an insect, for example a bee, are applied to a seed, plant part, or plant in the same coating or in two or more different coatings. In another aspect, a pest is a mite as described herein. In yet another aspect, the pest to be repelled, controlled, or directed is one detailed in U.S. Publication No. 20110171324 or U.S. Publication No. 20120157512, the contents of both which are incorporated by reference in their entirety. In another aspect, the pathogen or virus associated with the pest is reduced or eliminated from a bee or bee hive by repelling or controlling a predator or a pest of a bee.

The disclosure also provides for a method of promoting the health of an insect hive, for example a bee hive, by delivering an antibiotic or nutrition supplement to promote the health of an insect or bee. In an aspect, the disclosure provides for a method of:
(1) treating a seed, plant part, or plant with first attractant compound or composition designed to attract or control an insect, for example a bee, and
(2) an antibiotic or nutrition supplement or treatment compound or composition designed to promote the health of an insect, for example a bee.

In an aspect, the nutrition supplement is one detailed in U.S. Publication No. 20090162482, the contents of which are incorporated by reference in its entirety.

In another aspect, the disclosure provides for a method of promoting the health of an insect hive, for example a bee hive, wherein an insect makes contact with a composition containing an antibiotic or nutrition supplement and transfers the antibiotic or nutrition supplement to the hive. In another aspect, the insect makes contact with a composition containing an insect attractant and an antibiotic or nutrition supplement.

In another aspect, the compounds or compositions described herein can be used in conjunction with methods and compositions of treating insect diseases via plant transcribed molecules, for example, those described in U.S. Patent Application No. 2012/0157512, which is herein incorporated by reference in its entirety.

In an aspect, an attractant described herein is a corresponding oxime of a ketone described herein, for example, 2-hexanone oxime, 2-heptanone oxime. 3-heptanone oxime, 4-heptanone oxime, cycloheptanone oxime, 2-octanone oxime, 3-octanone oxime, cyclooctanone oxime, 2-nonanone oxime, cyclononanone oxime, 2-decanone oxime, 3-decanone oxime, 4-decanone oxime, 5-decanone oxime, 2-undecanone oxime, 2-dodecanone oxime, 2-trideconone oxime, 2-tetradecanone oxime, 2-pentadecanone oxime, 2-hexadecanone oxime 2-heptadecanone oxime.

Repelling, Controlling, or Directing an Insect

In an aspect, a compound or composition described herein repels, controls, or directs an insect of interest such that the insect is not in direct contact with a seed, plant part, plant, area, or other substance treated with a compound or composition described herein. In another aspect, a compound or composition described herein repels an insect of interest such that the insect is not in direct contact with pollen. In yet another aspect, a compound or composition described herein repels, controls, or directs an insect of interest such that the insect does not land and collect nectar.

In another aspect, a compound or composition described herein repels, controls, or directs an insect of interest such that the insect is not in direct contact with a treated substance for at least about 10 minutes, about 30 minutes, about 1 hour, about 4 hours, about 8 hours, about 12 hours, about 24 hours, about 2 days, about 3 days, about 7 days, about 14 days, about 21 days, about 1 month, about 2 months, or about 3 months or more. In yet another aspect, a compound or composition described herein repels, controls, or directs an insect of interest such that the insect is not in direct contact with a treated substance for a desired period of time, for example, a planting, growing, or harvesting season.

In another aspect, a compound or composition described herein repels, controls, or directs an insect of interest such that the insect is at least about 1 cm, at least about 5 cm, at least about 10 cm, at least about 100 cm, at least about 0.2 meters, at least about 0.5 meters, at least about 1 meter, at least about 2 meters, at least about 5 meters, at least about 10 meters, at least about 25 meters, at least about 50 meters, at least about 100 meters, at least about 200 meters, or at least about 300 meters or more away from a seed, plant part, plant, area, or other substance treated with a repelling, controlling, or directing compound or composition described herein. In yet another aspect, a compound or composition described herein repels an insect of interest such that the insect is at least about 1 cm, at least about 5 cm, at least about 10 cm, at least about 100 cm, at least about 0.2 meters, at least about 0.5 meters, at least about 1 meter, at least about 2 meters, at least about 5 meters, at least about 10 meters, at least about 25 meters, at least about 50 meters, at least about 100 meters, at least about 200 meters, or at least about 300 meters or more away from a seed, plant part, plant, area, or other substance treated with the repelling, controlling, or directing compound or composition described herein for at least about 10 minutes, about 30 minutes, about 1 hour, about 4 hours, about 8 hours, about 12 hours, about 24 hours, about 2 days, about 3 days, about 7 days, about 14 days, about 21 days, about 1 month, about 2 months, or about 3 months or more, or desired period of time, for example, a planting, growing, or harvesting season.

In another aspect, a compound or composition described herein repels, controls, or directs an insect of interest such that the insect is at least about 1 cm to about 10 cm, about 10 cm to about 100 cm, about 100 cm to about 500 cm, about 1 meter to about 5 meters, about 5 meters to about 10 meters, about 10 meters to about 50 meters, about 50 meters to about 100 meters, about 100 meters to about 250 meters, and about 250 meters to about 500 meters or more away from a seed, plant part, plant, area, or other substance treated with a compound or composition described herein. In yet another aspect, a compound or composition described herein repels an insect of interest in a manner such that the insect is at least about 1 cm to about 10 cm, about 10 cm to about 100 cm, about 100 cm to about 500 cm, about 1 meter to about 5 meters, about 5 meters to about 10 meters, about 10 meters to about 50 meters, about 50 meters to about 100 meters, about 100 meters to about 250 meters, and about 250 meters to about 500 meters or more away from a seed, plant part, plant, area, or other substance treated with a compound or composition described herein for at least about 10 minutes, about 30 minutes, about 1 hour, about 4 hours, about 8 hours, about 12 hours, about 24 hours, about 2 days, about 3 days, about 7 days, about 14 days, about 21 days, about 1 month, about 2 months, or about 3 months or more, or desired period of time, for example, a planting, growing, or harvesting season.

In another aspect, a compound or composition described herein controls or directs an insect of interest, such as a bee, for at least about 10 minutes, about 30 minutes, about 1 hour, about 4 hours, about 8 hours, about 12 hours, about 24 hours, about 2 days, about 3 days, about 7 days, about 14 days, about 21 days, about 1 month, about 2 months, about 3 months or more, or designated a planting, growing, or harvesting season.

In another aspect, one or more additional repellent, controlling, or directing compounds or compositions can be added to a repellency composition described herein in a manner that modifies or increases repellency via additive efforts, synergistic efforts, and combinations thereof. A compound or composition described herein can also be formulated in a delayed release formulation or controlled release formulation which can delay or control the release of the repelling compound or composition. In another aspect, a compound or composition described herein can also be formulated in a rapid release formulation which can expedite the release of the repelling, controlling, or directing compound or composition.

In an aspect, a method of "repelling" refers to the ability of a compound or composition described herein to influence or alter the behavior of an insect, for example, a bee, away from an area, location, structure, seed, plant, plant part, or substance of interest. In order to be classified as "repelling" according to an aspect of the disclosure, it is not necessary that 100% of the insects, pollinating insects, pests, or mites be directed away from an area, location, structure, seed, plant, plant part, or substance of interest. In yet another aspect, an insect is "repelled" if at least 50%, at least 75%, at least 90%, at least 95%, or at least 98% of the insects are directed away from an area, location, structure, seed, plant, plant part, or substance of interest.

In another aspect, a method of "directing" refers to the ability of a compound or composition described herein to influence the behavior or movement of an insect, for example a bee, in a given direction. In order to be classified as "directing" according to an aspect of the disclosure, it is not necessary that 100% of the insects, pests, or other animals be directed away from an area, location, structure, seed, plant, plant part, or substance of interest. In yet another aspect, an insect is "directed away" if at least 50%, at least 75%, at least 90%, at least 95%, or at least 98% of the insects are directed away from an area, location, structure, seed, plant, plant part, or substance of interest.

In an aspect, a method of "controlling" refers to the ability of a compound or composition described herein to control or alter the behavior of an insect, for example a bee. In order to be classified as "controlling" according to an aspect of the disclosure, it is not necessary that 100% of the insects, pests, or other animals be controlled away from an area, location, structure, seed, plant, or substance of interest. In yet another aspect, an insect is "controlled" if at least 50%, at least 75%, at least 90%, at least 95%, or at least 98% of the insect behavior is altered or controlled relative to an area, location, structure, seed, plant, or substance of interest.

In an aspect, a compound or composition described herein is applied, incorporated, or coated on a seed, plant part, or plant thereof.

Treatment of a Seed, Plant Part, or Plant

In an aspect, a compound or composition described herein is applied to a plant, crop, seed, or plant part thereof in a single application step. In another aspect, a composition described herein is applied to a plant, crop, seed, or plant part thereof in multiple application steps, for example, two, three, four, five or more application steps. In another aspect, the second, third, fourth, or fifth or more application steps may be with the same or different compositions. The methods described herein also provide for an aspect where multiple application steps are excluded.

In another aspect, a compound or composition described herein is applied to a plant, crop, seed, or plant part thereof at the time of planting to about 30 minutes, about 30 minutes to about 1 hour, about 1 hour to about 4 hours, about 4 hours to about 12 hours, about 1 hour to about 1 day, about 1 day to about 5 days, about 5 days to about 10 days, about 10 days to about 20 days, about 15 days to about 30 days, about 30 to about 100 days, or any combination thereof. In yet another aspect, a compound or composition described herein is applied to a plant, crop, seed, or plant part thereof in one or more application intervals of about 30 minutes, about 1 hour, about 2 hours, about 6 hours, about 8 hours, about 12 hours, about 1 day, about 5 days, about 7 days, about 10 days, about 12 days, about 14 days, about 21 days, or about 28 days.

In an aspect, a compound or composition described herein is applied to a plant, crop, seed, or plant part thereof one or more times during a planting, growing, or harvesting season. In another aspect, a compound or composition described herein is applied to a plant, crop, seed, or plant part thereof in one, two, three, four, or five or more times during a planting, growing, or harvesting season. In another aspect, a compound or composition described herein is applied to a plant, crop, seed, or plant part thereof only one time, no more than two times, or no more than three times during a planting, growing, or harvesting season. In yet another aspect, a compound or composition is applied in a single step to a seed. In yet another aspect, a seed described herein is planted in a one-pass application step.

In yet another aspect, a compound or composition described herein is applied to a plant, crop, seed, or plant part thereof prior to planting, at planting, after planting or combinations thereof. In another aspect, a compound or composition described herein is applied to a plant, crop, seed, or plant part thereof when an insect described herein is likely to be foraging or harvesting nectar or pollen from a flower or plant.

In an aspect, a compound or composition described herein is applied to a seed only prior to planting. In another aspect, a compound or composition described herein is applied to a seed during the planting process. In yet another aspect, a compound or composition described herein is applied in an in furrow process. In another aspect, a compound or composition described herein can be applied during bloom, for example, in orchards.

In another aspect, a compound or composition described herein is applied to a plant, crop, seed, or plant part thereof in an application regimen at about 1 hour to about 3 hours after the first application and followed by a second application at about 3 hours to about 6 hours; at about 1 hour to about 3 hours after the first application and followed by a second application at about 12 hours to about 24 hours about 1 to about 7 days after the first application and followed by a second application at about 10 to about 14 days.

In another aspect, the disclosure provides for pre-plant, pre-emergent, post-emergent, application steps or combinations thereof. In another aspect, a compound or composition described herein is first applied in a pre-plant step and followed by one or more pre-emergent or post-emergent steps. In yet another aspect, the disclosure provides for only a pre-plant step.

In another aspect, a compound or composition described herein is applied to a plant, crop, seed, or plant part thereof during the daytime hours. In another aspect, a compound or composition described herein is not applied to a structure plant, crop, seed, or plant part thereof at night. In yet another aspect, the application of a compound or composition described herein is optimized based on when an insect, for example a bee, would most likely forage on a plant or crop. In another aspect, the application of a compound or composition described herein is optimized based on when an insect, for example a bee, would most likely be exposed to a harmful substance or to a pest. In another aspect, a compound or composition described herein can be applied during non-planting timing.

In another aspect, a compound or composition described herein is applied to a plant, crop, seed, or plant part thereof in a manner that is sufficient to repel an insect, for example a bee.

Seeds, plant parts, or plants which can be treated by the methods described herein include, for example, seeds, plant parts, or plants that are treated with insecticides, pesticides, or fungicides that are harmful to pests or insects, for example, bees. In an aspect, a seed is selected from the group consisting of a corn, cotton, sorghum, potato, oat, rye, barley, wheat, soybean, sugarbeet, potato, or vegetable. In an aspect, the seed is corn seed. Examples of corn seeds capable of being used in the methods described herein include, for instance, sweet corn (for example, *Zea mays* convar. *saccharata* var. *Rugosa*), silver queen corn, golden bantam, early sunglow, indian corn, sugar corn, pole corn, field corn, dent corn, flint corn, flour corn, blue corn (for example, *Zea mays amylacea*), pop corn, and waxy corn. In another aspect, a plant part or plant is selected from the above plant part or plant varieties.

In another aspect, compositions or methods described herein may be used to treat crop plants that are pollinated by pollinating insects, such as bees. In an aspect, the crop plant is selected from the group consisting of a fruit, citrus, okra, kiwifruit, strawberry, *papaya*, watermelon, tangerine, tangelos, orange, sweet orange, cantaloupe, melon, squash, lemon, lime, apple, mango, pear, passion fruit, apricot, cherry, peach, nectarine, almonds, avocado. In an aspect, the seed is corn seed. Examples of citrus capable of being used in the compositions and methods described herein include, for instance, *citrus aurantiifolia* (key lime), *citrus maxima* (pomelo), *citrus medica* (citron), *citrus reticulata* (mandarin orange), *citrus aurantium* (bitter orange), *citrus latifolia* (persian lime), *citrus limon* (lemon), *citrus limonia*

(rangpur), *citrus paradisi* (grapefruit), *Citrus sinensis* (sweet orange), and *citrus tangerina* (tangerine).

Method described herein can be used in the treatment of genetically modified organisms (GMOs), e.g. plants or seeds. Genetically modified plants (or transgenic plants) are plants of which a heterologous gene has been stably integrated into genome. The expression "heterologous gene" essentially means a gene which is provided or assembled outside the plant and when introduced in the nuclear, chloroplastic or mitochondrial genome gives the transformed plant new or improved agronomic or other properties by expressing a protein or polypeptide of interest or by down-regulating or silencing other gene(s) which are present in the plant (using for example, antisense technology, cosuppression technology or RNA interference—RNAi—technology). A heterologous gene that is located in the genome is also called a transgene. A transgene that is defined by its particular location in the plant genome is called a transformation or transgenic event.

In an aspect, plants can be obtained by traditional breeding and optimization methods or by biotechnological and recombinant methods, or combinations of these methods, including the transgenic plants and including the plant varieties which are capable or not capable of being protected by Plant Breeders' Rights.

In another aspect, plant species and plant varieties which are found in the wild or which are obtained by traditional biological breeding methods, such as hybridization or protoplast fusion, and parts of these species and varieties are treated. In a further preferred embodiment, transgenic plants and plant varieties which were obtained by recombinant methods, if appropriate in combination with traditional methods (genetically modified organisms) and their parts are treated.

Plant parts should be understood as meaning all above ground and subsoil parts and organs of plants, such as shoot, leaf, flower, root, leaves, needles, stalks, stems, fruiting bodies, fruits and seeds, tubers and rhizomes. Plant parts also include harvested crops, and also vegetative and generative propagation material, for example cuttings, tubers, rhizomes, slips and seeds.

Seeds, plant parts, and plants may be treated with the described compounds or compositions by applying the compounds or compositions directly to the seed, plant part, or plant. In another aspect, the seed, plant part, or plant may be treated indirectly, for example by treating the environment or habitat in which the seed, plant part, or plant is exposed to. Conventional treatment methods may be used to treat the environment or habitat including dipping, spraying, fumigating, chemigating, fogging, scattering, brushing on, shanking or injecting. In another aspect, the seed, plant part, or plant may be treated by a soil application, such as a drench application or granular spray application.

In an aspect, a compound, composition, or compound combination described herein is applied to a seed at a rate of about 0.1-8.0 oz/cwt (ounces/hundredweight), about 2-7.0 oz/cwt, about 4-6.5 oz/cwt, about 5-6.5 oz/cwt, about 0.5-4.0 oz/cwt, about 1.0-3.5 oz/cwt, about 1.5-3.0 oz/cwt, about 2.0-3.0 oz/cwt, about 2.0-2.5 oz/cwt, or about 0.2 oz/cwt, about 0.5 oz/cwt, about 0.75 oz/cwt, about 1.0 oz/cwt, about 1.5 oz/cwt, about 2.0 oz/cwt, about 2.5 oz/cwt, about 3.0 oz/cwt, about 3.5 oz/cwt, about 4.0 oz/cwt, about 4.5 oz/cwt, about 5.0 oz/cwt, or about 0.2 oz/cwt or more, about 0.5 oz/cwt or more, about 0.75 oz/cwt or more, about 1.0 oz/cwt or more, about 1.5 oz/cwt or more, about 2.0 oz/cwt or more, about 2.5 oz/cwt or more, about 3.0 oz/cwt or more, about 3.5 oz/cwt or more, about 4.0 oz/cwt or more, about 4.5 oz/cwt or more, about 5.0 oz/cwt, about 6.0 oz/cwt, or about 7.0 oz/cwt or more. In yet another aspect, a composition described herein is applied to a seed in a manner sufficient to convey the desired property, for example, repellency.

Repelling, Controlling, and Directing Compound and Composition Properties

In an aspect, a repelling, controlling, or directing compound or composition described herein is capable of repelling, controlling, or directing an insect, for example a bee, described herein for at least about 30 minutes, about 1 hour, about 2 hours, 3 about hours, about 4 hours, about 5 hours, about 8 hours, about 10 hours, about 15 hours, about 20 hours, about 24 hours, about 48 hours, about 72 hours, about 7 days, about two weeks, about one month, about two months, or about three months or more. In another aspect, a repelling, controlling, or directing compound or composition described herein is capable of repelling, controlling, or directing an insect during a complete or partial growing, planting, or harvesting season. In another aspect, a repelling, controlling, or directing compound or composition described herein repels, controls, or directs an insect, for example a bee, by at least about 20% or more, about 30% or more, about 40% or more, about 50% or more, about 60% or more, about 75% or more, about 90% or more, about 95% or more, about 98% or more, or about 99% or more relative to a compound or composition that does not contain an effective amount of a repelling, controlling, or directing compound or composition described herein. In another aspect, a repelling, controlling, or directing compound or composition described herein repels or controls an insect, for example a bee, by at least about 20% or more, about 30% or more, about 40% or more, about 50% or more, about 60% or more, about 75% or more, about 90% or more, about 95% or more, about 98% or more, or about 99% or more for at least about 30 minutes, about 1 hour, about 2 hours, about 3, hours, about 4 hours, about 5 hours, about 8 hours, about 10 hours, about 15 hours, about 20 hours, about 24 hours, about 48 hours, about 72 hours, about 7 days, about two weeks, about one month, about two months, about three months or more, or during a complete or partial growing, planting, or harvesting season relative to a compound or composition that does not contain an effective amount of a repelling, controlling, or directing compound or composition described herein. In yet another aspect, a repelling or controlling compound or composition described herein repels or controls an insect, for example a bee, by at least 95% or more, 96% or more, 97% or more, 98% or more, 99% or more, or 100% for at least about 30 minutes, about 1 hour, about 2 hours, about 3, hours, about 4 hours, about 5 hours, about 8 hours, about 10 hours, about 15 hours, about 20 hours, about 24 hours, about 48 hours, about 72 hours, about 7 days, about two weeks, about one month, about two months, about three months or more, or during a complete or partial growing, planting, or harvesting season relative to a compound or composition that does not contain an effective amount of a repelling, controlling, or directing compound or composition described herein.

In yet another aspect, a repelling, controlling, or directing compound or composition described herein repels, controls, or directs an insect by about 10% to about 100%, about 20% to about 100%, about 30% to about 100%, about 40% to about 100%, about 50% to about 100%, about 60% to about 100%, about 70% to about 100%, about 80% to about 100%, about 10% to about 90%, about 20% to about 90%, about 30% to about 90%, about 40% to about 90%, about 50% to about 90%, about 60% to about 90%, about 70% to about 90%, about 10% to about 80%, about 20% to about 80%, about 30% to about 80%, about 40% to about 80%, about 50% to about 80%, or about 60% to about 80%, about 10% to about 70%, about 20% to about 70%, about 30% to about 70%, about 40% to about 70%, or about 50% to about 70%, relative to a compound or composition that does not contain an effective amount of a repelling, controlling, or directing compound or composition described herein.

In an aspect, a repelling, controlling, or directing compound or composition disclosed herein reduces insect interaction with a mammal, pest, predator, plant, structure, and/or location. In an aspect, a repelling, controlling, or directing compound or composition described herein is capable of reducing the interaction of an insect, for example a bee, with a mammal, pest, predator, plant, structure, and/or location for at least 30 minutes, 1 hour, 2 hours, 3, hours, 4 hours, 5 hours, 8 hours, 10 hours, 15 hours, 20 hours, 24 hours, 48 hours, 72 hours, 7 days, two weeks, one month, two months, three months or more or a planting, growing, or harvesting season. In another aspect, a repelling, controlling, or directing compound or composition described herein is capable of reducing the interaction of an insect, for example a bee, with a mammal, pest, predator, plant, structure, and/or location by at least about 20% or more, about 30% or more, about 40% or more, about 50% or more, about 60% or more, about 75% or more, about 90% or more, about 95% or more, about 98% or more, or about 99% or more relative to a compound or composition that does not contain an effective amount of a repelling, controlling, or directing compound or composition described herein. In another aspect, a repelling, controlling, or directing compound or composition described herein reduces the interaction of an insect, for example a bee, with a mammal, pest, predator, plant, structure, and/or location by at least about 20% or more, about 30% or more, about 40% or more, about 50% or more, about 60% or more, about 75% or more, about 90% or more, about 95% or more, about 98% or more, or about 99% or more for at least 30 minutes, 1 hour, 2 hours, 3, hours, 4 hours, 5 hours, 10 hours, 15 hours, 20 hours, 24 hours, 48 hours, 72 hours, 7 days, two weeks, one month, two months, three months or more a planting, growing, or harvesting season relative to a compound or composition that does not contain an effective amount of a repelling, controlling, or directing compound or composition described herein. In yet another aspect, a repelling, controlling, or directing compound or composition described herein reduces the interaction of an insect with a mammal, pest, predator, plant, structure, and/or location by at least 95% or more, 96% or more, 97% or more, 98% or more, 99% or more, or 100% for at least about 30 minutes, about 1 hour, about 2 hours, about 3 hours, about 4 hours, about 5 hours, about 8 hours, about 10 hours, about 15 hours, about 20 hours, about 24 hours, about 48 hours, about 72 hours, about 7 days, about two weeks, about one month, about two months, about three months or more or a planting, growing, or harvesting season relative to a compound or composition that does not contain an effective amount of a repelling, controlling, or directing compound or composition described herein.

In another aspect, a repelling, controlling, or directing compound or composition described herein reduces an ability of an insect to obtain a meal and/or nectar from a plant. In an aspect, a repelling compound or composition reduces an ability of an insect, for example a bee, to obtain a meal and/or nectar from a plant for at least about 30 minutes, about 1 hour, about 2 hours, about 3 hours, about 4 hours, about 5 hours, about 8 hours, about 10 hours, about 15 hours, about 20 hours, about 24 hours, about 48 hours, about 72 hours, about 7 days, about two weeks, about one month, about two months, about three months or more or a planting, growing, or harvesting season. In another aspect, a repelling, controlling, or directing compound or composition reduces an ability of an insect, for example a bee, to obtain a meal and/or nectar from a plant for at least about 20% or more, about 30% or more, about 40% or more, about 50% or more, about 60% or more, about 75% or more, about 90% or more, about 95% or more, about 98% or more, or about 99% or more relative to a compound or composition that does not contain an effective amount of a repelling, controlling, or directing compound or composition described herein. In another aspect, a repelling, controlling, or directing compound or composition reduces an ability of an insect, for example a bee, to obtain a meal and/or nectar from a plant for at least about 20% or more, about 30% or more, about 40% or more, about 50% or more, about 60% or more, about 75% or more, about 90% or more, about 95% or more, about 98% or more, or about 99% or more for at least about 30 minutes, about 1 hour, about 2 hours, about 3 hours, about 4 hours, about 5 hours, about 8 hours, about 10 hours, about 15 hours, about 20 hours, about 24 hours, about 48 hours, about 72 hours, about 7 days, about two weeks, about one month, about two months, about three months or more or a planting, growing, or harvesting season relative to a compound or composition that does not contain an effective amount of a repelling, controlling, or directing compound or composition described herein. In yet another aspect, a repelling, controlling, or directing compound or composition reduces an ability of an insect to obtain a meal and/or nectar from a plant for at least 95% or more, 96% or more, 97% or more, 98% or more, 99% or more, or 100% for at least about 30 minutes, about 1 hour, about 2 hours, about 3 hours, about 4 hours, about 5 hours, about 8 hours, about 10 hours, about 15 hours, about 20 hours, about 24 hours, about 48 hours, about 72 hours, about 7 days, about two weeks, about one month, about two months, about three months or more or a growing, planting, or harvesting season relative to a compound or composition that does not contain an effective amount of a repelling, controlling, or directing compound or composition described herein.

In an aspect, a repelling, controlling, or directing compound or composition disclosed herein exhibits a larger repelling influence relative to one or more of the following: camphor oil, ajowan oil, camphor powder, or rosemary oil. In yet another aspect, 2-decanone, a repelling compound or composition disclosed herein exhibits a larger repelling effect relative to one or more of the following: camphor oil, ajowan oil, camphor powder, or rosemary oil in a manner that is consistent with the examples and FIGS. 5-6.

In yet another aspect, a repelling, controlling, or directing compound or composition disclosed herein exhibits a larger repelling, controlling, or directing influence relative to one or more of the following: camphor oil, ajowan oil, camphor powder, or rosemary oil for at least about 30 minutes, about 1 hour, about 2 hours, about 3 hours, about 4 hours, about 5 hours, about 8 hours, about 10 hours, about 15 hours, about 20 hours, about 24 hours, about 48 hours, about 72 hours, about 7 days, about two weeks, about one month, about two months, about three months or more. In another aspect, a repelling, controlling, or directing compound or composition disclosed herein exhibits increased repellency, controlling, or directing efficacy for at least about 20% or more, about 30% or more, about 40% or more, about 50% or more, about 60% or more, about 75% or more, about 90% or more, about 95% or more, about 98% or more, or about 99% or more relative to one or more of the following: camphor oil, ajowan oil, camphor powder, or rosemary oil. In another aspect, a repelling, controlling, or directing compound or composition disclosed herein exhibits increased repellency, controlling, or directing efficacy for at least about 20% or more, about 30% or more, about 40% or more, about 50% or more, about 60% or more, about 75% or more, about 90% or more, about 95% or more, about 98% or more, or about 99% or more for at least about 30 minutes, about 1 hour, about 2 hours, about 3 hours, about 4 hours, about 5 hours, about 8 hours, about 10 hours, about 15 hours, about 20 hours, about 24 hours, about 48 hours, about 72 hours, about 7 days, about two weeks, about one month, about two months, about three months or more relative to one or more of the following: camphor oil, ajowan oil, camphor powder, or rosemary oil. In yet another aspect, a repelling, controlling, or directing compound or composition reduces an ability of an insect, for example a bee, to obtain a meal and/or nectar from a plant for at least 95% or more, 96% or more, 97% or more, 98% or more, 99% or more, or 100% for at about 30 minutes, about 1 hour, about 2 hours, about 3 hours, about 4 hours, about 5 hours, about 8 hours, about 10 hours, about 15 hours, about 20 hours, about 24 hours, about 48 hours, about 72 hours, about 7 days, about two weeks, about one month, about two months, about three months or more relative to a compound or composition that does not contain an effective amount of a repelling, controlling, or directing compound or composition described herein.

In an aspect, a repelling, controlling, or directing compound or composition disclosed herein may be more stable (and/or less volatile) than a $C_6$-$C_9$ ketone, $C_7$-$C_{10}$ ketone, a $C_8$-$C_{12}$ ketone, 2-heptanone, 2-undecanone, 2-dodecanone, or 2-trideconone.

In another aspect, sulfur analogs of 2-decanone are more stable (and/or less volatile) than one or more of $C_6$-$C_9$ ketone, $C_7$-$C_{10}$ ketone, a $C_8$-$C_{12}$ ketone, 2-heptanone, 2-undecanone, 2-dodecanone, or 2-trideconone. In yet another aspect, sulfur analogs of 2-decanone are more stable (and/or less volatile) than 2-decanone.

In another aspect, a repelling, controlling, or directing compound or composition described herein has a half-life of about 4 hours, about 8 hours, about 12 hours, at least one day, at least three days, at least five days, at least one week, at least two weeks, at least three weeks, at least one month, at least two months, or at least three months. In yet another aspect, a repelling, controlling, or directing compound or composition described herein has a half-life of about 4 hours, about 8 hours, about 12 hours, to one day, about one day to about seven days, about three days to about seven days, about five days to about seven days, about one week to about four weeks, about two weeks to about four weeks, about three weeks to about four weeks, about one month to about four months, about two months to about four months, or about three months to about four months.

Insects

In an aspect, the insect can be a pollinating insect. In another aspect, the insect is a repelled, controlled, or directed non-pollinating insect.

In another aspect, the insect can be an insect capable of being influenced by the presence of a pesticide, fungicide, herbicidal, or insecticide. In another aspect, the insect can be an insect capable of being influenced by the presence of a pesticide, fungicide, herbicidal, or insecticide dust.

In an aspect, the insect is of the Order Hymenoptera. In yet another aspect, the insect is a bee. In another aspect, the bee is a honey bee (*Apis*). In another aspect, the bee is a European honey bee (*Apis mellifera*) or Africanized honey bee. Examples of common bees are bumble bees (*Bomzbus*), small carpenter bees (*Ceratina*), large carpenter bees (*Xylocopa*), paper wasps (*Polistes*), yellow jackets (*Vespula*), and baldfaced hornets (*Vespula*). As used herein, the term "honey bee" can refer to any member of the Order Hymenoptera, Family Apidae, and includes, without limitation, *Apis andreniformis, Apis cerana, Apis dorsata, Apis florae, Apis mellifera, Apis koschevnikovi, Apis laboriosa, Apis nigrocincta, Apis rorea*, subspecies thereof, and strains, varieties, and hybrids thereof.

In yet another aspect, the insect is a butterfly. Butterflies are insects of the Order Lepidoptera. In an aspect, a butterfly is a true butterfly (superfamily Papilionoidea), a skipper (superfamily Hesperioidea), or a moth-butterflies (superfamily Hedyloidea). Examples of common butterflies are Swallowtails and Birdwings (Family Papilionidae) such as Common Yellow Swallowtail (*Papilio machaon*), Spicebush Swallowtail (*Papilio Troilus*), Lime Butterfly (*Papilio demoleus*), the *Ornithoptera* genus, the Whites and Yellows (Family Pieridae), such as Small White (*Pieris rapae*), Green-veined White (*Pieris napi*), Common Jezebel (*Delias eucharis*), the Blues and Coppers or Gossamer-Winged Butterflies (Family Lycaenidae) such as Red Pierrot (*Talicada nyseus*), Metalmark butterflies (Family Riodinidae) such as Duke of Burgundy (*Hamearis lucina*), Plum Judy, (*Abisara echerius*), the Brush-footed butterflies (Family Nymphalidae) such as Painted Lady, or Cosmopolitan (*Vanessa cardui*), Monarch butterfly (*Danaus plexippus*), Morpho genus, Speckled Wood (*Pararge aegeria*), Skippers (Family Hesperiidae) such as Mallow Skipper (*Carcharodus alceae*), and Zabulon Skipper (*Poanes zabulon*).

In another aspect, an insect described herein is an ant. In yet another aspect, the ant is a carpenter ant, a fire ant, a pharaoh ant, a ghost ant, and a black ant.

The disclosure refers to "insects" for simplicity of discussion, but it is to be understood that the present is not so limited. The present disclosure may be utilized to selectively direct, repel and/or control any organism that responds to the compounds or compositions of the present invention, and to any analogues or similar compounds and/or composition thereof that may be expected to have a similar influence on the insect or other organism. Also, the discussion in many cases hereinafter will refer to an "insect of interest" and, unless otherwise clear from the context of its use elsewhere herein, the phrase will be used to refer to the aspect of the present invention that allows for selective controlling, directing or repelling a particular subset of insects or other organisms. In other words, where the user of the present invention desires to control, direct or repel a subset of organisms such as insects, while not directing, controlling or repelling others, the subset of insects being controlled, directed and/or repelled becomes and is referred to as the "insect(s) of interest."

In another aspect, a compound or composition described herein selectively repels, directs, controls, or alters the behavior of an insect, for example a bee. In yet another aspect, a compound or composition described herein selectively repels, directs, or controls, or alters the behavior of a honey bee, for example, any member of the Order Hymenoptera, Family Apidae, and includes, without limitation, *Apis andreniformis, Apis cerana, Apis dorsata, Apis florae, Apis mellifera, Apis koschevnikovi, Apis laboriosa, Apis nigrocincta, Apis rorea*, subspecies thereof, and strains, varieties, and hybrids thereof.

In another aspect, a compound or composition described herein selectively repels, directs, controls, or alters the behavior of one type or subset of insects, for example a bee, while not affecting other insects. For instance, in one embodiment, a repelling, controlling, or directing compound or composition is associated with an insecticidal composition, for example, by a combination of the repelling, controlling, or directing compound or composition together with an insecticidal composition. In another aspect, a repelling, controlling, or directing compound or composition is sequentially applied at the same time, prior to, or after an insecticidal composition to, for example, an area, seed, plant part, or plant. In yet another aspect, an attractant compound or composition is applied to a different area or substance aimed at attracting an insect of interest.

As a non-limiting example, (1) 2-decanone as the repelling, controlling, or directing compound is used to treat field, yard, or structure, (2) clothianidin as the insecticidal compound, and (3) sucrose as the attractant compound or composition are used to treat a field, yard, or structure. As an example, all or a first portion of a field, yard, or structure is treated with (1) 2-decanone and (2) clothianidin, while the remaining section of the field, yard, or structure or a second or more portion of a field, yard, or structure is treated with an attractant compound or composition, such as (3) sucrose. Under such a scenario, an insect that is targeted for repelling, controlling, or directing, such as a honeybee, would be selectively repelled, controlled, or directed by the repelling, controlling, or directing compound, in this case the (1) 2-decanone and (2) clothianidin composition/combination, while being simultaneously attracted or drawn to the attractant compound or composition, in this case (3) sucrose. Such a procedure would allow for the selective repulsion or control of an insect of interest, for example a honeybee, while at the same time allowing for the insecticide, in this case clothianidin, to treat any unwanted insects or pests. As such, the honeybee would be selectively repelled, controlled, or directed away from the (1) 2-decanone and (2) clothianidin composition/combination, drawn to the (3) sucrose, while the infestation of any remaining insects or pests is addressed.

As another non-limiting example, compounds, compositions, and methods described herein can be utilized in the following scenario.

For example, in one embodiment of the present disclosure, a vacuum planter is used to plant corn seed in a large field in a typical farming operation. The corn seed is genetically modified to tolerate a glufosinate-based herbicide, and the corn seed is coated with a clothianidin/*Bacillus firmus* seed treatment (e.g. the PONCHO/VOTIVO seed treatment available from Bayer CropScience LP.) The novel lubricant of the present invention is added to a seed hopper on the vacuum planter by scooping it into the seed hopper in a powder form, to provide fluency and lubricity for the corn seeds during the planting operation, but with the desirably reduced dusting associated with the novel lubricant. An insect controlling, directing and repelling composition of the Formulas I-XIII, (for example 2 decanone in particular), that selectively repels honey bees is provided in a powder form as a separate composition to be incorporated at or about the time and generally in the same manner that the novel lubricant, e.g., via scooping it into the seed hopper. In an optional embodiment of the present invention, the corn seeds are also coated with an insect controlling, directing and repelling compound at or about the time they are treated with the PONCHO/VOTIVO seed treatment. Also, in an optional embodiment of the present invention, the exhaust mechanism of the vacuum planter is fitted with a mechanism that allows for dispersion of the insect controlling, directing and repelling composition into the vacuum planter's exhaust at a variable rate that is selectable by the operator of the vacuum planter. Also, optionally in this embodiment of the present invention, an adjoining field containing wild flowers is treated with an attractant that operates to attract honey bees to the adjoining field.

When these embodiments of the disclosure are employed, including those that are optional, several benefits are apparent. As a starting point, dusting is reduced or eliminated with the novel lubricant. To the extent any dusting is not eliminated and develops from the corn seeds abrading against each other during planting, with the repellent composition present on the seeds, it will be abraded to and will be included in any dust that is formed and exhausted from the planter. And should more repellent composition be required or desired, the operator of the planter will selectively introduce additional repellent composition into the exhaust stream when and where it is needed.

The result is that honey bees are selectively repelled from the field where planting occurs, and are simultaneously drawn by the attractant to the neighboring field containing the wild flowers. Because the repellant composition is selective for honey bees, the PONCHO/VOTIVO seed treatment remains effective to control other insects and nematodes in the manner described on its label instructions.

Figure 36:
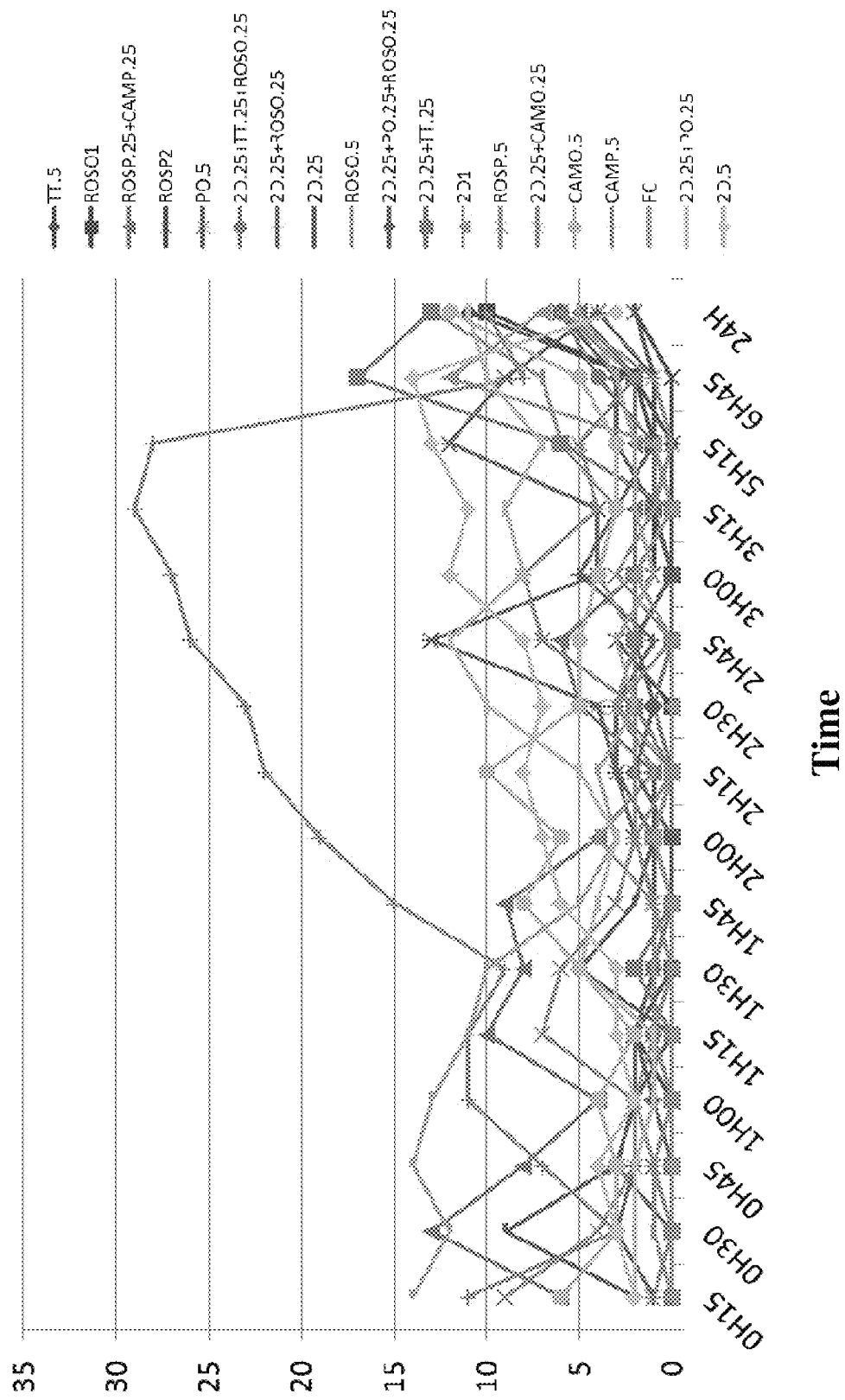
FIG. 36 describes the number of wasps visiting feeding stations in diagram form for various active agents over specified time points.
Figure 38:
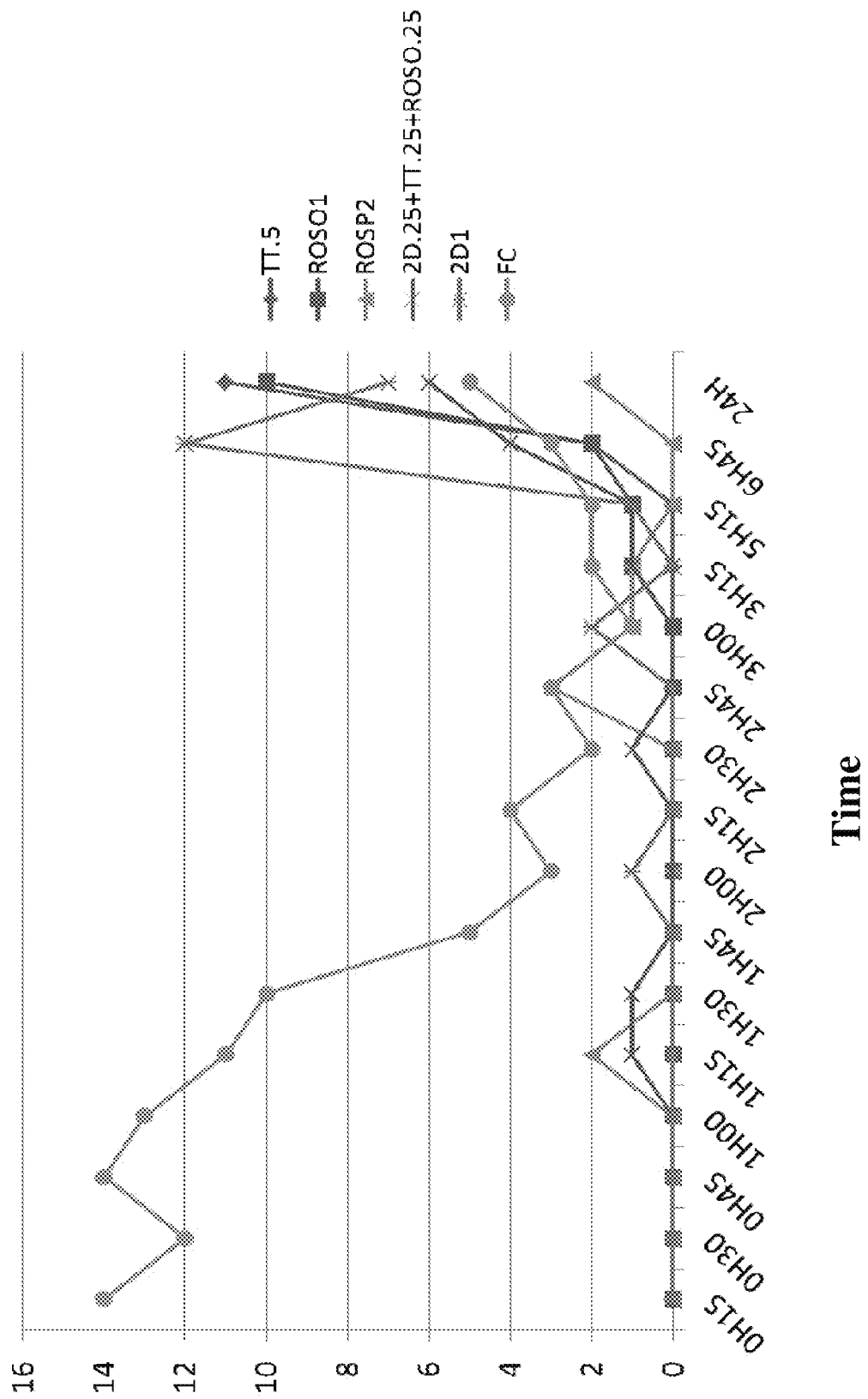
FIG. 38 describes the number of wasps visiting feeding stations in diagram form for various active agents over specified time points.

The disclosure also provides for methods of repelling, controlling, or attracting wasps by utilizing a compound or composition described herein as set forth in, for example, FIGS. 36, 37(A)(B), 38, and 39. In an aspect, the disclosure provides for a method of attracting wasps by utilizing camphor, camphor oil, camphor powder, or combinations thereof with any of the methodology described herein. In yet another aspect, the disclosure provides for a method of attracting wasps by utilizing camphor, camphor oil, camphor powder, or combinations thereof in at least about 0.01%, at least about 0.025%, at least about 0.05%, at least about 0.1%, at least about 0.25%, at least about 0.5%, at least about 1%, at least about 2% at least about 2.5%, at least about 5%, at least about 7.5%, at least about 10%, at least about 25%, or at least about 50%, by weight of a composition.

Compositions

In an aspect, the amount of a repelling, controlling, or directing compound or composition described herein can be an amount that is effective ("effective amount") to repel, control, or direct the movement of an insect of interest. In another aspect, the amount of a repelling, controlling, or directing compound or composition described herein can be an amount that is effective ("effective amount") to reduce or mitigate the influence of a substance that is harmful to an insect of interest. In another aspect, the amount of a compound or composition with insecticidal and nematicidal properties can be an amount that is effective to protect seeds, plant parts, or plants against insect and/or nematode infestation.

In another aspect, a composition comprises a repelling, controlling, or directing compound or composition in at least about 0.01%, at least about 0.025%, at least about 0.05%, at least about 0.1%, at least about 0.25%, at least about 0.5%, at least about 1%, at least about 2% at least about 2.5%, at least about 5%, at least about 7.5%, at least about 10%, at least about 25%, or at least about 50%, by weight of a composition. In yet another aspect, a composition comprises a repelling, controlling, or directing compound or composition is no more than about 0.01%, no more than about 0.025%, no more than about 0.05%, no more than about 0.1%, no more than about 0.25%, no more than about 0.5%, no more than about 1%, no more than about 2.0%, no more than about 2.5%, no more than about 5%, no more than about 7.5%, no more than about 10%, no more than about 25%, no more than about 50%, by weight of a composition.

In another aspect, a compound or composition described herein comprises a repelling, controlling, or directing compound or composition at 0.001% to about 0.1%, about 0.025%, about 0.0025% to about 0.25%, about 0.1% to about 1%, about 0.1% to about 2.5%, about 0.5% to about 2.5%, about 1% to about 2%, about 1% to about 3%, about 1% to about 5%, about 1% to about 10%, about 2% to about 10%, about 5% to about 10%, about 5% to about 20%, about 10% to about 25%, about 10% to about 50%, about 25% to about 50%, or about 20% to about 80%, and about 95% or more by weight of a composition.

In another aspect, a composition described herein comprises an insecticide, herbicide, fungicide, miticide, composition with insecticidal and nematicidal properties described herein, or other compound described herein in at least about 0.01%, at least about 0.025%, at least about 0.05%, at least about 0.1%, at least about 0.25%, at least about 0.5%, at least about 1%, at least about 2% at least about 2.5%, at least about 5%, at least about 7.5%, at least about 10%, at least about 25%, or at least about 50%, by weight of a composition. In yet another aspect, a composition comprises a repelling, controlling, or directing compound or composition in no more than about 0.01%, no more than about 0.025%, no more than about 0.05%, no more than about 0.1%, no more than about 0.25%, no more than about 0.5%, no more than about 1%, no more than about 2.0%, no more than about 2.5%, no more than about 5%, no more than about 7.5%, no more than about 10%, no more than about 25%, no more than about 50%, by weight of a composition.

In yet another aspect, a composition described herein comprises a insecticide, herbicide, fungicide, miticide, composition with insecticidal and nematicidal properties described herein, or other compound described herein at 0.001% to about 0.1%, about 0.025%, about 0.0025% to about 0.25%, about 0.1% to about 1%, about 0.1% to about 2.5%, about 0.5% to about 2.5%, about 1% to about 2%, about 1% to about 3%, about 1% to about 5%, about 1% to about 10%, about 2% to about 10%, about 5% to about 10%, about 5% to about 20%, about 10% to about 25%, about 10% to about 50%, about 25% to about 50%, or about 20% to about 80%, and about 95% or more by weight of a composition.

In an aspect, a repelling, controlling, or directing compound or composition described herein and/or dust reducing lubricant or wax composition described herein can be used in conjunction with an insecticidal, herbicidal and/or fungicidal active agent. In an aspect, the disclosure provides for a composition further including one or more of the following:

(a) acetylcholine esterase inhibitor, for example, carbamate and organophosphates;
(b) a GABA-gated chloride channel antagonist, for example, cyclodiene organochlorine, phenylpyrazole (Fiproles), ethiprole, and fipronil;
(c) sodium channel modulator, for example, methoxychlor and pyrethroids;
(d) nicotinic acetylcholine receptor agonists/antagonists, for example, neonicotinoid, nicotine, nensultap, cartap hydrochloride, and nereistoxin analogues;
(e) nicotinic acetylcholine receptor agonists (allosteric), for example, a spinosyns or spinosad; and
(f) chloride channel activators, for example, avermectin, abamectin, emamectin benzoate, milbemycins, and milbemectin.

In an aspect, an active agent is selected from the group consisting of acetamiprid, clothianidin, dinotefuran, imidacloprid, nitenpyram, thiacloprid, thiamethoxam, ethiprole, fipronil, imidacloprid, spiromesifen, beta-cyfluthrin, spirodiclofen, flubendiamide, thiodicarb, spirotetramat, Poncho, Gaucho, Votivo, Votivo with an additional insecticide, Nipsit INSIDE® (Valent), Platinum® (Syngenta), Admire® Pro (Bayer CropScience), Cruiser (Syngenta), Gaucho (Bayer CropScience), Leverage® (Bayer CropScience), Actara (Syngenta), Venom (Valent), Provado® (Bayer CropScience), Movento® (Bayer CropScience), Larvin® (Bayer CropScience), Belt® (Bayer CropScience), Sepresto® (Bayer CropScience), Leverage 360® (Bayer CropScience), Envidor® (Bayer CropScience), Baythroid® XL (Bayer CropScience), Oberon® (Bayer CropScience), Calypso (Bayer CropScience), Alias (Mana), Pasada (Mana), Couraze (Cheminova), Assail® (DuPont), Poncho®/VOTiVO™ (Bayer CropScience), Poncho® 1250+VOTiVO™ (Pioneer), Poncho® Beta (Bayer CropScience), Poncho® 600 (Bayer CropScience), Gaucho® 600 (Bayer CropScience), Gaucho®-XT (Bayer CropScience), Aeris® (Bayer CropScience), Prosper® FX (Bayer CropScience), Prosper® Evergol (Bayer CropScience), and/or Requiem® (Agroquest).

In another aspect, about 1 ppb, 5 ppb, 10 ppb, 20 ppb, 30 ppb, 50 ppb, 100 ppb, or 250 ppb or more of one of the above active agents is used in conjunction with a repelling, controlling, or directing compound or composition described herein and/or dust reducing lubricant or wax composition described herein. In yet another aspect, about 1 ppb to about 10 ppb, about 5 ppb to about 20 ppb, about 20 ppb to about 50 ppb, about 30 ppb to about 100 ppb, about 100 ppb to about 250 ppb of one of the above active agents is used in conjunction with a repelling, controlling, or directing compound or composition described herein and/or dust reducing lubricant or wax composition described herein.

The disclosure also provides for a composition capable of being used with a method described herein comprising, consisting essentially of, or consisting of (1) a repelling, controlling, or directing compound or composition described herein together with an (2) insecticidal, herbicidal and/or fungicidal treating agent, wherein the combination of wherein the addition of (1) a repelling, controlling, or directing compound or composition described herein to an (2) insecticidal, herbicidal and/or fungicidal treating agent improves the repelling, controlling, or directing characteristics of the composition. For instance, in an aspect, when added or combined with (1) a repelling, controlling, or directing compound or composition described herein, for example, 2-decanone, rosemary powder, or rosemary oil, the repelling, controlling, or directing characteristics of the (2) insecticidal, herbicidal and/or fungicidal treating agent composition, for example imidacloprid, are improved relative to the (2) insecticidal, herbicidal and/or fungicidal treating agent composition alone. Such a methodology is set forth in, for example, Example 7 and FIG. 27.

In an aspect, a composition described herein includes a mixture or combination of a lubricant composition and active or treatment agent described herein.

In another aspect, the disclosure provides for a composition comprising, consisting of, or consisting essentially of a repelling, controlling, or directing compound or composition described herein and an insecticidal, herbicidal and/or fungicidal treating agent. In yet another aspect, the disclosure provides for a composition comprising, consisting of, or consisting essentially of a repelling, controlling, or directing compound or composition described herein and an insecticidal, herbicidal and/or fungicidal treating agent, wherein the composition does not exhibit a reduction of insecticidal, herbicidal and/or fungicidal as the result of the addition of a repelling, controlling, or directing compound or composition described herein.

In an aspect, the disclosure provides for a composition comprising, consisting of, or consisting essentially of (1) a repelling, controlling, or directing compound or composition described herein together with an (2) insecticidal, herbicidal and/or fungicidal treating agent, wherein the combination of (1) a repelling, controlling, or directing compound or composition described herein and (2) insecticidal, herbicidal and/or fungicidal treating agent does not exhibit a reduction in the efficacy of the (2) insecticidal, herbicidal and/or fungicidal treating agent as the result of the addition of (1) a repelling, controlling, or directing compound or composition to (2) insecticidal, herbicidal and/or fungicidal treating agent composition described herein.

In yet another aspect, the disclosure provides for a composition comprising, consisting of, or consisting essentially of 2-decanone and imidacloprid, wherein the 2-decanone and imidacloprid does not exhibit a reduction in the efficacy of the imidacloprid as the result of the addition of 2-decanone to an imidacloprid-based composition described herein. In yet another aspect, the disclosure provides for a composition comprising, consisting of, or consisting essentially of 2-decanone and clothianidin, wherein the 2-decanone and clothianidin does not exhibit a reduction in the efficacy of the clothianidin as the result of the addition of 2-decanone to an clothianidin-based composition described herein.

In another aspect, a repelling, controlling, or directing compound or composition described herein is formulated with insecticidal, herbicidal, fungicide, insect regulator, plant growth regulator, plant growth regulator for crop protection, insect growth regulator, and pest control agents, such as household pest control agents. In yet another aspect, a repelling, controlling, or directing compound or composition described herein is formulated with a nematocide, insect growth regulators, antitranspirant, and/or plant growth regulator.

In an aspect, the disclosure provides for a composition comprising, consisting of, or consisting essentially of one or more repelling, controlling, or directing compounds or compositions disclosed herein. In another aspect, the disclosure provides for a composition comprising, consisting of, or consisting essentially of a single repelling, controlling, or directing compound or composition disclosed herein. In yet another aspect, the disclosure provides for a composition comprising, consisting of, or consisting essentially of two, three, four, or five or more repelling, controlling, or directing compounds or compositions. In another aspect, the disclosure provides for a composition comprising, consisting of, or consisting essentially of no more than two, no more than three, no more than four, or no more than five or more repelling, controlling, or directing compounds or compositions.

In another aspect, the disclosure provides for a composition comprising, consisting of, or consisting essentially of a repelling, controlling, or directing compound or composition described herein used in conjunction with a compound or composition described in WO2012151556A2, US 2013/0125451, and WO2009036450, the entirety of which is incorporated by reference into the application.

In yet another aspect, the disclosure provides for a composition comprising, consisting of, or consisting essentially of a at least one (1) repelling, controlling, or directing compound or composition described herein together with at least one (2) honeybee repellent has a repellent activity that mimics or substantially mimics a repellent chemosensory cue of 2-heptanone.

The disclosure provides for a composition comprising, consisting of, or consisting essentially of at least one (1) repelling, controlling, or directing compound or composition described herein together with at least one (2)-benzyl-4-(4-methoxy-2,3-dimethylbenzyl) piperazine, 1-[(6-nitro-1,3-benzodioxol-5-yl)methyl]-4-phenylpiperazine, 4-[4-nitro-3-(2-phenoxyethoxy)phenyl]morpholine, 1-(3-chlorophenyl)-4-[(6-nitro-1,3-benzodioxol-5-yl)methyl]piperazine, 1-(4-methoxybenzyl)-4-(3-methylbenzyl)piperazine, 4-(4-methoxy-2,3-dimethylbenzyl) morpholine, 1-benzyl-4-(4-methoxy-3-methylbenzyl)piperazine, 1-(4-methoxy-2,3-dimethylbenzyl)-4-methyl piperazine, 1-(4-methoxy-2,3-dimethylbenzyl)-4-methylpiperazine, 1-(1,3-benzodioxol-5-ylmethyl)-4-(4,5-dimethoxy-2-nitrobenzyl)piperazine, 1-(2,3-dimethylphenyl)-4-(4-methoxy-2,3-dimethylbenzyl)piperazine, 1-(4-methoxy-2,3-dimethylbenzyl)-4-phenylpiperazine, 1-[3-(4-iodophenoxy)propyl]piperidine, 1-(4-methoxy-2,3-dimethylbenzyl)-4-(4-methylphenyl)piperazine, 2-{[(2-methoxy-1-naphthyl)methylene]amino}-1H-isoindole-1,3(2H)-dione, substituted 2-[(2-ethoxybenzylidene)amino]-1H-isoindole-1,3(2H)-dione, 3-ethyl-5-(4-hydroxybenzylidene)-2-thioxo-1,3-thiazolidin-4-one, 3-butyl-5-(3-hydroxybenzylidene)-2-thioxo-1,3-thiazolidin-4-one, an optionally substituted 5-(3-bromo-4-methoxybenzylidene)-3-methyl-2-thioxo-1,3-thiazolidin-4-one, 5-(5-bromo-2-hydroxybenzylidene)-3-ethyl-2-thioxo-1,3-thiazolidin-4-one, 2-phenyl-4-(2-thienylmethylene)-1,3-oxazol-5(4H)-one, 5-(4-chlorobenzylidene)-3-(2-methoxyphenyl)-2-thioxo-1,3-thiazolidin-4-one, 3-(4-bromophenyl)-5-(4-hydroxybenzylidene)-2-thioxo-1,3-thiazolidin-4-one, 4-[3-bromo-4-(dimethylamino)benzylidene]-2-(2-methoxyphenyl)-1,3-oxazol-5(4H)-one, 4-[2-(4-nitrophenyl)vinyl]phenol, 3-{2-[(4-fluorobenzyl)amino]phenyl}-2(1H)-quinoxalinone, 4-bromo-3-chlorophenyl)(4-ethoxybenzylidene) amine, 4-[(2-chloro-5-nitrobenzylidene)amino]phenol, 2-[(2-hydroxy-3,5-diiodobenzylidene)amino]-4,6-dimethylphenol, (2-methoxybenzyl)(4-methoxy-3-biphenylyl) amine, 2-{[(5-ethyl-2-hydroxyphenyl)imino]methyl}-4,6-diiodophenol, 3-methoxy-4-(4-nitrophenoxy)benzaldehyde oxime, 1-butyl-4-hydroxy-2-oxo-N-(2-pyridinylmethyl)-1,2-dihydro-3-quinolinecarboxamide, 2-acetyl-4-chlorophenyl 4-methylbenzoate, N-(2-fluorobenzyl)-4-hydroxy-2-oxo-1-propyl-1,2-dihydro-3-quinolinecarboxamide, ethyl 2-(benzoylamino)-5-ethyl-3-thiophenecarboxylate, 2-(benzoylamino)-N-(2-chlorophenyl)benzamide, ethyl 2-(3-aminophenyl)-4-quinolinecarboxylate, 1-(4-bromobenzoyl)-2,2,4-trimethyl-1,2-dihydroquinoline, dimethyl 2-(1,2,2-trimethyl-3-thioxo-2,3-dihydro-4(1H)-quinolinylidene)-1,3-dithiole-4,5-dicarboxylate, dimethyl 2-(2,2,7-trimethyl-3-thioxo-2,3-dihydro-4(1H)-quinolinylidene)-1,3-dithiole-4,5-dicarboxylate, N-(4-methoxy-2,3-dimethylbenzyl)-N,N',N'-trimethyl-1,2-ethanediamine, 1,2,3-trichloro-4-(isopropylamino)anthra-9,10-quinone, and/or [1-(3-nitrobenzyl)-3-piperidinyl]methyl 3-phenylacrylate, (3-amino-4,6-dimethylthieno[2,3-b]pyridin-2-yl) (4-chlorophenyl)methanone, (4-bromophenyl)(5-methoxy-2-methyl-1-benzofuran-3-yl)methanone, 1-(4-methoxyphenyl)-3-(2-methyl-1H-indol-3-yl)-2-propen-1-one, and/or 2-[2-(3,5-dimethyl-1H-pyrazol-1-yl)-6-phenyl-4-pyrimidinyl]phenol. In another aspect, the above are optionally substituted. In another aspect, the above are optionally substituted with additional substituent groups capable of maintaining or increasing repellent efficacy.

The disclosure provides for a composition comprising, consisting of, or consisting essentially of at least one (1) repelling, controlling, or directing compound from Formula I-X as described herein together with at least one (2) 1-benzyl-4-(4-methoxy-2,3-dimethylbenzyl) piperazine, 1-[(6-nitro-1,3-benzodioxol-5-yl)methyl]-4-phenylpiperazine, 4-[4-nitro-3-(2-phenoxyethoxy)phenyl]morpholine, 1-(3-chlorophenyl)-4-[(6-nitro-1,3-benzodioxol-5-yl) methyl]piperazine, 1-(4-methoxybenzyl)-4-(3-methylbenzyl)piperazine, 4-(4-methoxy-2,3-dimethylbenzyl) morpholine, 1-benzyl-4-(4-methoxy-3-methylbenzyl)piperazine, 1-(4-methoxy-2,3-dimethylbenzyl)-4-methyl piperazine, 1-(4-methoxy-2,3-dimethylbenzyl)-4-methylpiperazine, 1-(1,3-benzodioxol-5-ylmethyl)-4-(4,5-dimethoxy-2-nitrobenzyl)piperazine, 1-(2,3-dimethylphenyl)-4-(4-methoxy-2,3-dimethylbenzyl)piperazine, 1-(4-methoxy-2,3-dimethylbenzyl)-4-phenylpiperazine, 1-[3-(4-iodophenoxy) propyl]piperidine, 1-(4-methoxy-2,3-dimethylbenzyl)-4-(4-methylphenyl)piperazine, or any combination thereof. In another aspect, the above are optionally substituted with additional substituent groups capable of maintaining or increasing repellent efficacy.

The disclosure also provides for a composition comprising, consisting of, or consisting essentially of at least one (1) 2-decanone, rosemary oil, rosemary powder and/or camphor together with at least one (2) 1-benzyl-4-(4-methoxy-2,3-dimethylbenzyl) piperazine, 1-[(6-nitro-1,3-benzodioxol-5-yl)methyl]-4-phenylpiperazine, 4-[4-nitro-3-(2-phenoxyethoxy)phenyl]morpholine, 1-(3-chlorophenyl)-4-[(6-nitro-1,3-benzodioxol-5-yl)methyl]piperazine, 1-(4-methoxybenzyl)-4-(3-methylbenzyl)piperazine, 4-(4-methoxy-2,3-dimethylbenzyl) morpholine, 1-benzyl-4-(4-methoxy-3-methylbenzyl)piperazine, 1-(4-methoxy-2,3-dimethylbenzyl)-4-methyl piperazine, 1-(4-methoxy-2,3-dimethylbenzyl)-4-methylpiperazine, 1-(1,3-benzodioxol-5-ylmethyl)-4-(4,5-dimethoxy-2-nitrobenzyl)piperazine, 1-(2,3-dimethylphenyl)-4-(4-methoxy-2,3-dimethylbenzyl) piperazine, 1-(4-methoxy-2,3-dimethylbenzyl)-4-phenylpiperazine, 1-[3-(4-iodophenoxy)propyl]piperidine, 1-(4-methoxy-2,3-dimethylbenzyl)-4-(4-methylphenyl)piperazine, or any combination thereof. In another aspect, the above are optionally substituted with additional substituent groups capable of maintaining or increasing repellent efficacy. In an aspect, these compounds produce a synergistically effect. In yet another aspect, these compounds produce an additive effect. In yet another aspect, the composition may include an agent selected from the group consisting of camphor, camphor oil, camphor powder, tea tree oil, essential oils of tea tree, pine oil, rosemary powder, and/or rosemary oil.

In an aspect, a compound or composition described herein is formulated as a foliar composition, a foliar spray, solutions, emulsions, suspension, coating formulation, non-pesticidal or pesticidal coating formulation, encapsulated formulation, solid, liquid, fertilizer, paste, granule, powder, suspension, or suspension concentrate. In another aspect, a compound or composition described herein may be employed alone or in solid, dispersant, or liquid formulation. In yet another aspect, a compound or composition described herein is formulated as a tank-mix product. In another aspect, a compound or composition described herein is formulated as a soil application formulation, such as a drench formulation or granular spray formulation.

In an aspect, a compound or composition described herein is encapsulated. In another aspect, a compound of Formula I-XIII is encapsulated into a powder form, for example, a natural powder such as rosemary powder. In yet another aspect, one or more of 3-heptanone, 4-heptanone, 2-hexanone, cycloheptanone, 2-octanone, 3-octanone, cyclooctanone, 2-nonanone, cyclononanone, 2-decanone, 3-decanone, 4-decanone, 5-decanone, 2-undecanone, 2-dodecanone, 2-trideconone, 2-tetradecanone, 2-pentadecanone, 2-hexadecanone, 2-heptadecanone, cyclodeconone, and sulfur (or thio) analogs of 2-decanone and associated oxidation states is encapsulated into a powder form, such as with rosemary powder.

In another aspect, a compound or composition described herein can take any of a variety of dosage forms including, without limitation, suspension concentrates, aerosols, capsule suspensions, cold-fogging concentrates, warm-fogging concentrates, encapsulated granules, fine granules, flowable concentrates for the treatment of seed, ready-to-use solutions, dustable powders, emulsifiable concentrates, oil-in-water emulsions, water-in-oil emulsions, macrogranules, microgranules, oil-dispersible powders, oil-miscible flowable concentrates, oil-miscible liquids, foams, pastes, pesticide-coated seed, suspoemulsion concentrates, soluble concentrates, suspensions, wettable powders, soluble powders, dusts and granules, water-soluble granules or tablets, water-soluble powders for the treatment of seed, wettable powders, natural products and synthetic substances impregnated with a compound or composition described herein, a net impregnated with a compound or composition described herein, and also microencapsulations in polymeric substances and in coating materials for seed, and also ULV cold-fogging and warm-fogging formulations.

In another aspect, a seed is coated, encapsulated or otherwise covered with one or more repelling, controlling, or directing compounds or compositions described herein. In yet another aspect, a seed is coated, encapsulated or otherwise covered with one or more repelling, controlling, or directing compounds and one or more insecticides, pesticides, fungicides, fertilizers of a micronutrient or macronutrient nature, herbicides, feeding inhibitors, insect molting, insect mating, insect maturation inhibitors, nematocides, nutritional or horticultural supplements, or larvicides. In another aspect, a compound or composition described herein is formulated to repel, control, or direct an insect, for example a bee, from a seed. In another aspect, a compound or composition described herein is formulated to repel an insect, for example a bee, from a seed and therefore from a field, yard, pot, area, bush, tree, or body of water onto which the seeds are intentionally or unintentionally present as well as provide an additional beneficial or otherwise useful effect.

In another aspect, a compound or composition disclosed herein may optionally include one or more additional compounds providing an additional beneficial or otherwise useful effect. Such compounds include, without limitation, an adhesive, a solvent, a surfactant, a wetting agent, an emulsifying agent, a carrier, adjuvant, a diluent, a dispersing agent an insecticide, a pesticide, a fungicide, a fertilizer of a micronutrient or macronutrient nature, a herbicide, a feeding inhibitor, an insect molting inhibitor, an insect mating inhibitor, an insect maturation inhibitor, a nematocide, a nutritional or horticultural supplement, or any combination thereof. In an aspect, a composition described herein is odor free. In another aspect, the surfactant is Genapol, for example Genapol X-080.

In another aspect, compounds or compositions described herein can be combined with a fertilizer. Examples of fertilizers capable of being used with the compositions and methods described herein include, for example, Urea, Ammonium Nitrate, Ammonium Sulfate, Calcium Nitrate, Diammonium Phosphate, Monoammonium phosphate, Triple Super Phosphate, Potassium Nitrate, Potassium nitrate, nitrate of potash, Potassium Chloride, muriate of potash, di and mono potassiumaiusm salts of phosphite/phosphonate.

In another aspect, the disclosure provides for a fertilizer composition combined with at least one repelling, controlling, or directing compound or composition from Formula I-X or compounds 1-33 in Table 1.

The disclosure also provides for bait composition comprising a compound or composition described herein. In another aspect, the disclosure provides for bait composition comprising a repelling, controlling, or directing compound or composition described herein. The bait composition comprising a repelling, controlling, or directing compound or composition described herein and may be used in any of the methods described herein and may optionally include another active ingredient, such as an insecticide, herbicide, or pesticide.

In an aspect, an insect repelling, controlling, or directing compound or composition is combined with a compound or composition that alters the olfactory senses, sight, chemosensory senses, or other physical characteristics of an insect. In another aspect, an insect repelling compound or composition described herein can be combined with a compound or composition that alters the behavior of an insect by color, taste, or additional feature that has the ability to influence the senses of an insect.

In an aspect, a composition or method described herein includes an inorganic lubricant composition. In another aspect, a composition or method described herein does not include an inorganic lubricant composition. Inorganic compounds, for example talc and graphite, encompass compounds such as carbides, carbonates, simple oxides of carbon, cyanides, and allotropes of carbon.

In an aspect, a repelling, controlling, or directing compound or composition described herein is combined with a talc and/or graphite. In another aspect, a repelling, controlling, or directing compound or composition described herein is combined with talc and/or graphite and an active agent compound or composition, for example, an insecticide, pesticide, fungicide, or herbicide. In another aspect, (1) the talc and/or graphite, (2) repelling, controlling, or directing compound or composition, and (3) an active agent are added to a hopper box or planter together, separately, or combinations thereof. In another aspect, seed is added to the hopper or planter with the composition combination. In yet another aspect, seed pre-treated with an active agent composition is added to the hopper and/or planter and a talc and/or graphite composition is added together with a repelling, controlling, or directing compound or composition described herein.

In an aspect, a composition or method described herein does not include talc. In another aspect, a composition or method described herein does not include graphite or graphite blends. In yet another aspect, a composition or method described herein does not include blends of graphite and/or talc. In another aspect, a composition or method described herein contains trace amount of talc or graphite. In another aspect, a composition or method described herein contains less than about 5%, less than about 10%, less than about 20%, less than about 20%, less than about 30%, less than about 40%, or less than about 50% by weight of talc, graphite, or a combination of talc or graphite.

In yet another aspect, a composition described herein may be blended with inert materials to improve handling or packaging, for example, silica, starches (natural and derived), clays, and other minerals.

In an aspect, a composition described herein is applied as a powder to a seed at the same time or before the planter fills the planter hopper with seed. In another aspect, a composition described herein is applied as a dry powder to a seed as a farmer fills the planter hopper with seed.

In an aspect, a composition described herein, such as a wax, is capable of providing lubricity at a lower use rate as compared to conventional lubricants, such as talc or graphite. In another aspect, a wax described herein provides for improved seed to seed and seed to planter mechanism slip and reduces insecticide loss from seed due to attrition as it passes through the vacuum planter mechanisms.

In another aspect, a lubricant composition described herein provides an increased level of lubricity to reduce seed to seed and seed to planter mechanism attrition as compared to traditional lubricant compositions, such as talc or graphite. In an aspect, a lubricant composition described herein is also effective at lower application rates than talc or graphite.

In an aspect, a repelling, controlling, or directing compound described herein is formulated as follows:

TABLE 2

| | | | | | | | |
|---|---|---|---|---|---|---|---|
| colspan="8" | Repelling, Controlling, or Directing Compound Alone |
| 1 | EC Formulation | Compound | | Surfactant | | | |
| 2 | EC Formulation | Compound | | Surfactant | | Water | |
| colspan="8" | Compound + Solid Carrier |
| 3 | WP Formulation | Compound | Attagel/Silica | Surfactant/wetter | Dispersant | | |
| 4 | SC Formulation | Compound | Attagel/Silica | Surfactant/wetter | Dispersant | Water | |
| 5 | SC Formulation | Compound | Attagel/Silica | Surfactant/wetter | Dispersant | Water | Salt |
| colspan="8" | Compound + Solid Carrier + Wax (Encapsulated or Controlled Release) |
| 6 | WP Formulation | Compound | Attagel/Silica/Wax | Surfactant/wetter | Dispersant | | |
| 7 | SC Formulation | Compound | Attagel/Silica/Wax | Surfactant/Wetter | Dispersant | Water | |
| 8 | SC Formulation | Compound | Attagel/Silica/Wax | Surfactant/wetter | Dispersant | Water | Salt |
| 9 | WP Formulation | Compound/Wax | Attagel/Silica | Surfactant/wetter | Dispersant | | |
| 10 | SC Formulation | Compound/Wax | Attagel/Silica | Surfactant/Wetter | Dispersant | Water | |
| 11 | SC Formulation | Compound/Wax | Attagel/Silica | Surfactant/Wetter | Dispersant | Water | Salt |

EC—Emulsion concentrate;
WP—Wettable Powder;
SC—Suspension Concentrate;
"Compound" refers to repelling, controlling, or directing compound Compositions Capable of Repelling, Controlling, or Directing Pollinating Insect and Protecting Plants and Crops from Pests and Nematodes In another aspect, the disclosure provides for a composition comprising, consisting of, or consisting essentially of:
(1) an insect repelling, controlling, or directing compound or composition described herein; and
(2) a compound or composition with insecticidal and/or nematicidal properties.

In another aspect, the disclosure provides for a composition comprising, consisting of, or consisting essentially of:
(1) an insect repelling, controlling, or directing compound or composition described herein; and
(2) a compound or composition with a neonicotinoid-based compound.

In yet another aspect, the disclosure provides for a composition comprising, consisting of, or consisting essentially of:
(1) an insect repelling, controlling, or directing compound or composition described herein; and
(2) a clothianidin-based composition.

In yet another aspect, the disclosure provides for a composition comprising, consisting of, or consisting essentially of:
(1) an insect repelling, controlling, or directing compound or composition described herein; and
(2) a clothianidin-based composition together with a *bacillus* compound or composition.

In yet another aspect, the disclosure provides for a composition comprising, consisting of, or consisting essentially of:
(1) an insect repelling, controlling, or directing compound or composition described herein; and
(2) a clothianidin-based composition together with a *Bacillus firmus*. compound or composition.

The disclosure also provides for a composition comprising, consisting of, or consisting essentially of:
(1) an insect repelling, controlling, or directing compound from Formula I-XIII and/or one or more of compounds 1-33 in Table 1; and
(2) a clothianidin-based composition.

In another aspect, the disclosure provides for a composition comprising, consisting of, or consisting essentially of:
(1) an insect repelling, controlling, or directing compound or composition described herein; and
(2) one or more of Poncho®/VOTiVO™ (Bayer CropScience), Poncho Beta (Bayer CropScience), Poncho® 600 (Bayer CropScience), Poncho® 1250+VOTiVO™ (Pioneer), Belay® (Valent), Prosper® FX (Bayer CropScience), or Prosper® Evergol.

In another aspect, the disclosure provides for a composition comprising, consisting of, or consisting essentially of:
(1) an insect repelling, controlling, or directing compound or composition described herein; and
(2) Poncho®/VOTiVO™ (Bayer CropScience).

The disclosure also provides for a composition comprising, consisting of, or consisting essentially of:
(1) one or more compounds selected from the group consisting of 3-heptanone, 4-heptanone, cycloheptanone, 2-octanone, 3-octanone, cyclooctanone, 2-nonanone, cyclononanone, 2-decanone, 3-decanone, 4-decanone, 5-decanone, 2-undecanone, 2-dodecanone, 2-trideconone, 2-tetradecanone, 2-pentadecanone, 2-hexadecanone, 2-heptadecanone, cyclodeconone, and sulfur (or thio) analogs of 2-decanone and associated oxidation states; and
(2) a composition comprising, consisting of, or consisting essentially of clothianidin.

The disclosure also provides for a composition comprising, consisting of, or consisting essentially of:
(1) 2-decanone, 3-decanone, 4-decanone, 5-decanone, 2-undecanone, 2-dodecanone, 2-trideconone, 2-tetradecanone, 2-pentadecanone, 2-hexadecanone, 2-heptadecanone, cyclodeconone, or sulfur (or thio) analogs of 2-decanone and associated oxidation states;
(2) camphor oil, ajowan oil, camphor powder, rosemary powder, or rosemary oil; and
(3) clothianidin or a composition comprising clothianidin.

In another aspect, a composition described herein includes one or more compounds or compositions with insect repelling, controlling, and/or directing properties and one or more compounds or compositions with insecticidal and/or nematode treating or reducing properties.

In another aspect, the disclosure provides for a method of repelling, controlling, or directing an insect, for example a bee, by treating a seed, plant, or plant part with compound or composition described herein.

In an aspect, an insecticidal compound described herein having insecticidal properties includes a neonicotinoid-based compound. Neonicotinoids act on the central nervous system of insects.

In an aspect, an active agent described herein includes a nematode treating compound or composition. In another aspect, an insecticidal compound described herein includes clothianidin. In yet aspect, a compound or composition with insecticidal and nematicidal properties includes clothianidin. In another aspect, an insecticidal or a compound or composition with insecticidal and nematicidal properties described herein includes Poncho®/VOTiVO™ (Bayer CropScience), Poncho® Beta (Bayer CropScience), Poncho® 600 (Bayer CropScience), Poncho® 1250+VOTiVO™ (Pioneer), Belay® (Valent), Prosper® FX (Bayer CropScience), and/or Prosper® Evergol. In another aspect, a composition described herein includes clothianidin with a *Bacillus*-based compound or composition, for example, *Bacillus firmus*. In another aspect, the *Bacillus*-based compound or composition includes, for example, one or more of *Bacillus cereus, Bacillus pumilis, Bacillus amyloliquefaciens, Bacillus subtilis, Bacillus subtilis* strain GB03, *Bacillus subtilis* strain QST713.

In an aspect, the disclosure provides for a composition comprising (1) a repelling, controlling, or directing compound or composition described herein together with an (2) a compound or composition with insecticidal and nematicidal properties described herein, wherein the combination of (1) a repelling, controlling, or directing compound or composition described herein and (2) the compound or composition with insecticidal and nematicidal properties described herein does not exhibit a reduction in the efficacy of the (2) a compound or composition with insecticidal and nematicidal properties described herein, as the result of the addition of (1) a repelling, controlling, or directing compound or composition to (2) the compound or composition with insecticidal and nematicidal properties described herein.

In another aspect, the disclosure provides for a composition comprising, consisting of, or consisting essentially of 2-decanone and clothianidin, wherein the 2-decanone and clothianidin does not exhibit a reduction in the efficacy of the clothianidin as the result of the addition of 2-decanone to an clothianidin-based composition described herein.

Methods of Repelling, Controlling, or Directing an Insect and Treating Nematode Infestation The disclosure provides for a method of (i) repelling, controlling, and/or directing an insect; and (ii) treating insect and/or nematode infestation comprising utilizing a compound or composition described herein.

The disclosure also provides for a method of (i) repelling, controlling, and/or directing an insect; and (ii) treating insect and/or nematode infestation comprising treating a seed, plant part, or plant with a composition comprising:
(1) at least one compound from Formula I-XIII; and
(2) a compound or composition with insecticidal and nematicidal properties.

The disclosure also provides for a method of (i) repelling, controlling, and/or directing an insect; and (ii) treating insect and/or nematode infestation comprising treating a seed, plant, or plant part with a composition comprising:
(1) an insect repelling, controlling, or directing compound from Formula I-XIII and/or one or more of compounds 1-33 in Table 1; and
(2) a neonicotinoid-based compound.

The disclosure also provides for a method of (i) repelling, controlling, and/or directing an insect; and (ii) treating insect and/or nematode infestation comprising treating a seed, plant, or plant part with a composition comprising:
(1) an insect repelling, controlling, or directing compound from Formula I-XIII and/or one or more of compounds 1-33 in Table 1; and
(2) a clothianidin-based composition.

The disclosure also provides for a method of (i) repelling, controlling, and/or directing an insect; and (ii) treating insect and/or nematode infestation comprising treating a seed, plant, or plant part with a composition comprising:
(1) an insect repelling, controlling, or directing compound or composition described herein; and
(2) one or more of Poncho®/VOTiVO™ (Bayer CropScience), Poncho® Beta (Bayer CropScience), Poncho® 600 (Bayer CropScience), Poncho® 1250+VOTiVO™ (Pioneer), Belay® (Valent), Prosper® FX (Bayer CropScience), or Prosper® Evergol.

The disclosure also provides for a method of (i) repelling, controlling, and/or directing an insect; and (ii) treating insect and/or nematode infestation comprising treating a seed, plant, or plant part with a composition comprising:
(1) one or more compounds selected from the group consisting of 3-heptanone, 4-heptanone, cycloheptanone, 2-octanone, 3-octanone, cyclooctanone, 2-nonanone, cyclononanone, 2-decanone, 3-decanone, 4-decanone, 5-decanone, 2-undecanone, 2-dodecanone, 2-trideconone, 2-tetradecanone, 2-pentadecanone, 2-hexadecanone, 2-heptadecanone, cyclodeconone, and sulfur (or thio) analogs of 2-decanone and associated oxidation states; and
(2) clothianidin or a composition comprising clothianidin.

In an aspect, the disclosure provides for a method of selectively repelling, controlling, or directing a pollinating insect, for example a bee, with a repelling, controlling, or directing compound or composition described herein while selectively treating insect and/or nematode infestation with a compound or composition with insecticidal and nematicidal properties described herein.

Protection of Plants and Crops Against Insects Pests and/or Nematodes

In an aspect, a compound or composition with insecticidal and nematicidal properties described herein treats or reduces infestation by any nematode capable of destroying or harming a plant or crop. In another aspect, a compound or composition with insecticidal and nematicidal properties described herein treats or reduces infestation of a nematode selected from the group consisting of a but not limited to Soil Nematodes, Dagger Nematode, Lance Nematode, Needle Nematode, Pin Nematode, Ring Nematode, Root Knot Nematode, Root Lesion Nematode, Spiral Nematode, Sting Nematode, Stubby Root Nematode, Stunt Nematode, Columbia Lance Nematode, Reniform Nematode, Soybean Cyst Nematode, False Root-Knot Nematode, Western Corn Root Worm and/or SugarBeet Cyst Nematode.

In yet another aspect, a compound or composition with insecticidal and nematicidal properties described herein treats or reduces infestation of an insect or pest selected from the group consisting of a Chinch bug, Corn flea beetle, Corn leaf aphid Cutworm—black, Grape *colaspis*, Seedcorn maggot, Southern corn leaf beetle, Southern corn rootworm, Southern green stinkbug, Indian meal moth, Lesser grain borer, Red flour beetle, Rice weevil, Rusty grain beetle, Sugarcane beetle, White grub, European, Chafer larvae, May/June beetle larvae, Japanese beetle larvae, *Thrips*, Wireworm, Aphid, Greenbug, Yellow sugarcane aphid, English grain aphid, Bean leaf Beetle, Leafhoppers, Three Cornered Alfalfa Hopper, Black bean aphids, Flea beetles, Leafminers, Subterranean springtails, Sugarbeet leafhoppers, and Sugarbeet root maggot.

Methods of Repelling, Controlling, or Directing an Insect

In an aspect, the disclosure provides for a method of repelling, controlling, or directing an insect by utilizing a compound or composition described herein. In another aspect, the disclosure provides for a method of repelling, controlling, or directing an insect by treating a seed, plant, or plant part with a compound or composition described herein.

In another aspect, a compound or composition described herein repels, controls, or directs on a selective basis. In yet another aspect, the insect may be directed by coming into contact with a compound or composition described herein. In another aspect, an insect of interest, such as a bee, in a manner such that the insect is not in direct contact with a substance treated with the repellent, controlling, or directing compound or composition. In another aspect, a compound or composition described herein repels, controls, or directs an insect of interest, such as a bee, in a manner such that the insect has only minimal contact with a treated substance.

In another aspect, the disclosure provides for a method of repelling, controlling, or directing an insect, for example a bee, away from a seed, plant part, or plant, treated with a compound or composition with nematicidal properties.

In yet another aspect, the disclosure provides for a method of repelling, controlling, or directing an insect from an area or substance while at the same time attracting an insect to a different area or substance. The disclosure provides for a method of treating an area or substance with a repelling, controlling, or directing compound or composition described herein and at the same or different time treating a distinct area or substance with an insect attractant compound that is strategically placed at an optimized distance. In an aspect, such a methodology can help to increase repelling, controlling, or directing efficacy by repelling an insect from an area to be avoided while attracting the same insect to an area of interest.

Controlled Release, Extended Release, Rapid Release and Multi-Coating Release Formulations In another aspect, a compound or composition described herein can be formulated in a controlled-release, extended-release, rapid-release formulation or combinations thereof. In another aspect, a compound or composition described herein can be formulated in a multi-coating or multi-layer formulation. The disclosure also provides for a formulation designed to release a compound or composition disclosed herein over a period of about 5 minutes, about 15 minutes, about 30 minutes, about 1 hour, about 2 hours, about 6 hours, about 12 hours, about 24 hours, about 3 days, about 5 days, about 7 days, about 15 days, about 30 days, about 45 days, about 60 days, about 75 days, or about 90 days in single or multiple release time points. In another aspect, the disclosure also provides for a formulation designed to release a compound or composition disclosed herein over a period of about 30 minutes to about 1 hour, about 1 hour to about 6 hours, about 6 hours to about 12 hours, about 24 hours to 2 days, about 1 to about 7 days, about 7 days to about 15 days, about 10 days to about 30 days, or about 30 days to about 60 days or more.

In an aspect, a rapid-release layer or coating releases a compound immediately, after about 1 minute, after about 5 minutes, after about 15 minutes, after about 30 minutes, after about 1 hour, or after about 2 hours. In another aspect, a controlled release layer or coating releases a compound after about 3 hours, after about 6 hours, after about 12 hours, or after about 18 hours. In another aspect, an extended release or delayed-release layer or coating releases a compound after about 1 day, after about 2 days, after about 3 days, after about 7 days, or after about 14 days or more.

The disclosure also provides for a composition with a coating as follows:
(1) an outside rapid release coating with a first insect repelling, controlling, or directing compound or composition described herein; and
(2) at least one inner extended or controlled release coating with a second insect repelling, controlling, or directing compound or composition described herein.

The disclosure also provides for a composition with a coating as follows:
(1) an outside controlled release coating with a first insect repelling, controlling, or directing compound or composition described herein; and
(2) at least one inner extended or controlled release coating with a second insect repelling, controlling, or directing compound or composition described herein.

The disclosure also provides for a composition with a coating as follows:
(1) an outside rapid release coating with a first insect repelling, controlling, or directing compound or composition described herein;
(2) at least one inner extended or controlled release coating with a second insect repelling, controlling, or directing compound or composition described herein, and
(3) at least one inner extended or controlled release coating with a compound or composition capable of repelling, controlling, or directing an insect pest or predator.

The disclosure also provides for a composition with a coating as follows:
(1) an outside rapid release or controlled release coating with a first insect repelling, controlling, or directing compound or composition described herein; and
(2) at least one inner extended or controlled release coating with a compound or composition capable of repelling, controlling, or directing the insect pests or predators.

In an aspect, the insect would be attracted and exposed to the rapid release or controlled release repelling, controlling, or directing compound or composition. After exposure to the rapid release or controlled release attractant, the insect, for example a bee, would take a percentage of the compound or composition back to the hive wherein the slow release compound or composition capable of repelling the insect pests or predators. Such a methodology would provide additional protection for the hive thereby promoting the health of insects.

The disclosure also provides for a composition with a coating as follows:
(1) an outside rapid release or controlled release coating with a first insect attractant compound or composition described herein; and
(2) at least one inner slow or controlled release coating with a compound or composition capable of promoting the health of an insect, such as an antibiotic or a nutritional supplement.

In an aspect, the insect would be attracted and exposed to the rapid release or controlled release attractant compound or composition. After exposure to the rapid release attractant, the insect, for example a bee, would take a percentage of the compound or composition back to the hive wherein the slow release compound or composition capable of promoting the health of an insect, such as an antibiotic or a nutritional supplement, would be released.

In another embodiment, a repelling, controlling, or directing compound or composition disclosed herein can be incorporated into a controlled-release device which dispenses a honey bee repelling, controlling, or directing compound and/or other beneficial compound over time in a regulated or predictable manner. A controlled-release device disclosed herein may be employed by itself or incorporated into another device used to house the controlled-release device.

Formulations that provide for release of a compound or composition, for example, by degradation, light release or release with lack of light, or moisture are also provided for.

Methods of Repelling, Controlling, or Directing Insects and Reducing Seed Dust a. Lubricant and/or Wax-Based Compositions The disclosure also provides for a method of reducing dust released during planting by utilizing a dust reducing composition or lubricity composition together with a repelling, controlling, or directing compound or composition described herein. In an aspect, the disclosure provides for a method of reducing insect exposure to vacuum planter dust released during planting by utilizing a compound or composition described herein. In an aspect, the vacuum planter dust is an insecticidal, pesticidal, or fungicidal dust.

In yet another aspect, the disclosure provides for a method of reducing dust emission, pesticidal dust, insecticidal dust, or fungicidal dust by:
(1) applying a treating agent to a seed; and
(2) applying a lubricant composition to the treated seed such that the lubricant composition reduces dust emission, pesticidal dust, insecticidal dust, herbicidal and/or fungicidal dust.

In an aspect, the disclosure provides for a method of repelling, controlling, or directing an insect by applying (1) a repelling, controlling, or directing compound or composition herein to seed in combination with a (2) dust reducing composition described herein. In another aspect, a compound or composition described herein is applied to wet seed. The disclosure also provides for a method of increasing seed lubricity by coating a seed with a dust reducing composition in conjunction with a compound or composition described herein.

In an aspect, a repelling, controlling, or directing compound or composition described herein is applied to a seed before, after, or during planting of the seed. In another aspect, a repelling, controlling, or directing compound or composition described herein is applied in a hopper with a seed prior to or during planting.

In an aspect, the disclosure provides for a method of coating a seed with a treating agent and a lubricant composition described herein, for example a wax composition, wherein the coated seed emits a reduced amount of dust, pesticidal dust, insecticidal dust, or dust. In an aspect, one or more repelling, controlling, or directing compounds is incorporated into the dust in an amount sufficient to selectively repel, control, or direct an insect of interest, for example a bee.

The disclosure also provides for a method of reducing vacuum planter dust released during planting. In an aspect, the disclosure provides for a method of reducing insect exposure to vacuum planter dust released during planting. In another aspect, the vacuum planter dust is an insecticidal, pesticidal, or fungicidal dust.

In an aspect, the disclosure provides for a method of improving seed flow by applying or treating seed with a composition described herein. In another aspect, a composition described herein is applied to wet seed. The disclosure also provides for a method of increasing seed lubricity by coating a seed with a composition described herein. In an aspect, the disclosure provides for a method of lowering lubricity at lower use rates than those afforded by the coating of a seed with talc or graphite. The disclosure also provides for a method increasing the level of lubricity in an amount that is sufficient to reduce seed attrition that may result in the loss of small amounts of insecticide from the seed surface.

The disclosure also provides for a method of adding a treating agent, a wax, and/or at least one repelling, controlling, or directing compound or composition described herein to a seed.

In an aspect, a lubricant compound or composition and one or more repelling, controlling, or directing compounds or compositions are added to a pre-treated seed prior, at the same time, or after the pre-treated seed is placed in soil. In an aspect, the seed is pre-treated with an insecticidal, pesticidal, or fungicidal compound or composition described herein.

In another aspect, a lubricant compound or composition, one or more repelling, controlling, or directing compounds or compositions, and/or an insecticidal, pesticidal, or fungicidal compound or composition described herein are added to a seed prior, at the same time, or after the seed is placed in soil. In an aspect, the seed is untreated or pre-treated.

The disclosure also provides for a method of adding a dust reducing wax composition together with a compound or composition described herein to a seed. In another aspect, a wax or lubricant compound or composition is added to a pre-treated seed prior planting. In another aspect, a seed is pre-treated by both a dust reducing wax or lubricant composition and a compound or composition described herein prior to planting. In yet another aspect, a seed is pre-treated by both a dust reducing wax composition and a compound or composition described herein in a planter or hopper either manually or with a mechanized system, such as a mechanized metering system. In an aspect, the powder form of a wax is added to seed in a planter.

In an aspect, a treating agent, wax, and/or repelling, controlling, and/or directing compound or composition are added to a seed prior to placing the seed into a bag or container. In another aspect, the components are added to a seed prior or after the bag and/or container of seed has been shipped to a planting site. In another aspect, after the seed arrives at the planting site, a lubricant composition and/or repelling, controlling, and/or directing compound or composition described herein is added to the seed. In yet another aspect, a lubricant composition and/or repelling, controlling, and/or directing compound or composition described herein is added to pre-treated seed (seed previously treated with a treating agent) in a planter mechanism or hopper of the planting mechanism. In another aspect, a treating agent, a lubricant, and/or a repelling, controlling, and/or directing compound are added to a seed prior to the seed being loaded on a planter or hopper for planting. In yet another aspect, a treating agent, a first lubricant, and or a first repelling, controlling, and/or directing compound or composition are added to seed prior to the seed being loaded on a planter or hopper for planting and a second lubricant composition and/or a second repelling, controlling, and/or directing compound or composition are added to seed in the planter or hopper.

In an aspect, the dust, insecticidal dust, herbicidal dust, pesticidal dust, or fungicidal dust emission is reduced relative to traditional lubricants, such as talc or graphite. In yet another aspect, a lubricant composition described herein, for example a wax composition, reduces the dust, insecticidal dust, herbicidal dust, pesticidal dust, or fungicidal dust emission from the planter mechanism, such as an air or vacuum planter. In an aspect, the planter mechanism is a John Deere, Case IH, Kinze, AGCO White, Great Plains, or Precision Planting vacuum planter.

In an aspect, a composition described herein is applied to a seed in a single application step. In another aspect, a composition described herein is applied in multiple application steps. In yet another aspect, a composition described herein is applied in one, two, three or more application steps to a seed. In another aspect, a method described herein excludes multiple application steps. In an aspect, the methods described herein include a first sequential application of a treating agent described herein to a seed followed by a second application of lubricant composition described herein to a seed.

In an aspect, the dust reducing composition is a lubricant. In an aspect, a dust reducing wax composition is selected from the group consisting of polyethylene, powdered polyethylene, carnuba, paraffin, polypropylene, an oxidized polyethylene wax, a powdered oxidized polyethylene wax, montan waxes, microcrystalline waxes, Fischer-Tropsch waxes, amide waxes, Ethylene-Acrylic-Acid (EAA) waxes, polyolefin waxes, Ethylene bis stearamide (EBS) waxes, animal waxes (bees wax & lanolin), vegetable waxes (carnauba & candelilla), or slac and scale waxes.

In an aspect, a composition capable of being used with the methods described herein comprises, consists essentially of, or consists of a lubricant composition. In another aspect, a composition capable of being used with the methods described herein comprises, consists essentially of, or consists of a wax, polyethylene wax, powdered polyethylene wax, or Michem®Wax 437 (Michelman).

In an aspect, a composition capable of being used with the methods described herein comprises, consists essentially of, or consists of a treatment agent and a lubricant composition, for example, a wax. In another aspect, a composition capable of being used with the methods described herein comprises, consists essentially of, or consists of a treatment agent together with a polyethylene wax or powdered polyethylene wax. In an aspect, the wax is used as a planter lubricant.

In another aspect, a compound or composition described herein can be applied to a seed, plant part, or plant by the following methods: "on planter," "fogging," or in a "Hopper box." In another aspect, a repelling, controlling, or directing compound described herein can be added to a lubricant or dust reducing compound or composition. In yet another aspect, a repelling, controlling, or directing compound described herein can be incorporated or encapsulated within a seed.

b. Repelling, Controlling, or Directing Structure

In an aspect, the disclosure provides for a structure that disperses, is coated with, or treated with an insect repelling, controlling, and/or directing compound in an amount that is sufficient to repel, control, or direct an insect of interest according to embodiments of the disclosure.

In an aspect, a structure is any piece of material or machinery that disperses, is coated with, or treated with an insect repelling, controlling, and/or directing compound in an amount that is sufficient to repel, control, or direct an insect of interest according to embodiments of the disclosure. In another aspect, the structure is treated with a lubricant compound or composition described herein. In a non-limiting embodiment, a repelling, controlling, and/or directing compound is coated or applied to a tractor, farm machinery, and/or other equipment designed for planting or otherwise treating seeds, plants, or plant parts. The components attached or incorporated into a seeds a tractor, farm machinery, and/or other equipment designed for planting or otherwise treating seeds, plants, or plant parts can also be treated. In an aspect, a tractor, farm machinery, and/or other equipment designed for planting or otherwise treating seeds, plants, or plant parts can be treated with "strips" or "containers" that house sufficient amount of a repelling, controlling, or directing compound or composition described herein to selectively repel an insect of interest, such as a bee.

In another aspect, the mechanism or container responsible for planting or dispersing seed, for example, a hopper box or planter, is treated with a repelling, controlling, or directing compound or composition described herein. In another aspect, only the mechanism or container responsible for planting or dispersing seed, for example, a hopper box or planter, is treated with a repelling, controlling, or directing compound or composition described herein.

In an aspect, the structure, for example, the mechanism or container responsible for planting or dispersing seed is lined with "strips" of a substance that is treated with a repelling, controlling, and/or directing compound or composition herein. In another aspect, the "strips" are sticker-like and can be applied when and where it is desirable to repel, control, or direct an insect or interest, such as a bee. In yet another aspect, a repelling, controlling, and/or directing compound or composition herein is impregnated into the mechanism or container responsible for planting or dispersing seed or otherwise treated with a repelling, controlling, and/or directing compound or composition herein.

In yet another aspect, an additional machine that is separate from a tractor, farm machinery, and/or other equipment designed for planting or otherwise treating seeds, plants, or plant parts is treated or otherwise disperses a repelling, controlling, and/or directing compound or composition herein in an amount that selectively repels, controls, or directs an insect of interest, such as a bee, for the time and/or the distance described herein. In an aspect, the additional machine is a trailer.

In an aspect, the amount of a repelling, controlling, or directing compound or composition described herein used to treat a tractor, farm machinery, and/or other equipment involved in the planting and/or treatment of seeds, plants, or plant parts is higher (in weight percent) than the amount used to treat a seed, plant, or plant part thereof outside of using such equipment. In another aspect, the amount of a repelling, controlling, or directing compound or composition described herein used to treat a tractor, farm machinery, and/or other equipment involved in the planting and/or treatment of seeds, plants, or plant parts is at least about 1%, at least about 2%, at least about 2.5%, at least about 5%, at least about 7.5%, at least about 10%, at least about 20%, at least about 30%, at least about 40% by weight, at least about 50% by weight, or at least about 75% by weight of a composition.

In another aspect, the amount of a repelling, controlling, or directing compound or composition described herein used to treat a tractor, farm machinery, and/or other equipment involved in the planting and/or treatment of seeds, plants, or plant parts is at least at 0.1% to about 02%, about 0.5% to about 5%, about 3% to about 10%, about 5% to about 15%, about 10% to about 20%, about 20% to about 35%, about 10% to about 50%, about 25% to about 75%, or about 50% to about 80%, and about 95% or more by weight of a composition.

c. Compositions for Reducing Seed Dust and Dispersing an Active Agent on a Seed Surface In an aspect, the disclosure provides for compositions capable of dispersing an active agent on a seed surface and methods thereof. In yet another aspect, compositions described herein are capable of achieving improved active agent uniformity on a seed surface thereby yielding treated seeds with reduced dust content. In another aspect, the dust reducing compositions provided herein are combined with an insecticide, herbicide, pesticide, and/or fungicide compound or composition and result in a decreased dust profile during planting.

In another aspect, a composition herein reduces coating dust or can be used as a pre-treatment seed additive to reduce seed dust.

In an aspect, a composition described herein includes one or more of the following and combinations thereof:
(a) oil;
(b) wetting agent; and
(c) dispersing agent.

In yet another aspect, a composition described herein includes one or more of the following and combinations thereof:
(a) oil;
(b) wetting agent; and
(c) binder.

In an aspect, a composition described herein includes one or more of the following and combinations thereof:
(a) film forming compound;
(b) binder;
(c) oil;
(d) wetting agent; and
(e) dispersing agent.

In another aspect, the disclosure provides for a composition comprising one or more of the following and combinations thereof:
(a) poly(vinyl alcohol)/poly(vinyl pyrrolidone) ("PVP-PVA") copolymer;
(b) polyurethane composition or dispersion;
(c) ethoxylated fatty acid;
(d) sorbitan monooleate;
(e) alkyl alcohol with an ethylene oxide/propylene oxide;
(f) ethoxylated oleyl alcohol; and
(g) oil.

In another aspect, the disclosure provides for a composition comprising one or more of the following and combinations thereof:
- (a-1) poly(vinyl alcohol)/poly(vinyl pyrrolidone) ("PVP-PVA") copolymer;
- (b-2) polyurethane composition or dispersion;
- (c-3) ethoxylated fatty acid;
- (d-4) sorbitan monooleate;
- (e-5) alkyl alcohol with an ethylene oxide/propylene oxide;
- (f-6) ethoxylated oleyl alcohol;
- (g-7) mineral oil; and
- (h-8) vegetable oil.

In another aspect, the disclosure provides for a dust reducing composition comprising components "a-1" to "h-8" set forth in Table 3 and Table 4. As set forth in Tables 3 and 4, the amount of each respective component (in samples 1-11) is represented in "weight percent." Each sample exhibits a reduced dust profile relative to a seed sample that is not treated with the components set forth in Tables 3 and 4.

TABLE 3

| Sample | a-1 | b-2 | c-3 | d-4 | e-5 | f-6 | g-7 | h-8 |
|---|---|---|---|---|---|---|---|---|
| 1 | 1-8 | 6-15 | 0 | 2-10 | 2-10 | 2-10 | 0 | 0 |
| 2 | 1-8 | 0 | 2-10 | 2-10 | 2-10 | 0 | 0 | 0 |
| 3 | 0 | 6-15 | 2-10 | 2-10 | 0 | 0 | 0 | 12-25 |
| 4 | 1-8 | 6-15 | 2-10 | 0 | 0 | 0 | 6-15 | 0 |
| 5 | 1-8 | 6-15 | 0 | 0 | 0 | 2-10 | 0 | 12-25 |
| 6 | 1-8 | 0 | 0 | 0 | 2-10 | 0 | 6-15 | 12-25 |
| 7 | 0 | 0 | 0 | 2-10 | 0 | 2-10 | 6-15 | 0 |
| 8 | 0 | 0 | 2-10 | 0 | 2-10 | 2-10 | 0 | 12-25 |
| 9 | 0 | 6-15 | 0 | 2-10 | 2-10 | 0 | 6-15 | 12-25 |
| 10 | 1-8 | 0 | 2-10 | 2-10 | 0 | 2-10 | 6-15 | 12-25 |
| 11 | 0 | 6-15 | 2-10 | 0 | 2-10 | 2-10 | 6-15 | 0 |

TABLE 4

| Sample | a-1 | b-2 | c-3 | d-4 | e-5 | f-6 | g-7 | h-8 |
|---|---|---|---|---|---|---|---|---|
| 1 | 1-10 | 5-25 | 0 | 2-15 | 2-15 | 2-15 | 0 | 0 |
| 2 | 1-10 | 0 | 2-15 | 2-15 | 2-15 | 0 | 0 | 0 |
| 3 | 0 | 5-25 | 2-15 | 2-15 | 0 | 0 | 0 | 5-40 |
| 4 | 1-10 | 5-25 | 2-15 | 0 | 0 | 0 | 1-20 | 0 |
| 5 | 1-10 | 5-25 | 0 | 0 | 0 | 2-15 | 0 | 5-40 |
| 6 | 1-10 | 0 | 0 | 0 | 2-15 | 0 | 1-20 | 5-40 |
| 7 | 0 | 0 | 0 | 2-15 | 0 | 2-15 | 1-20 | 0 |
| 8 | 0 | 0 | 2-15 | 0 | 2-15 | 2-15 | 0 | 5-40 |
| 9 | 0 | 5-25 | 0 | 2-15 | 2-15 | 0 | 1-20 | 5-40 |
| 10 | 1-10 | 0 | 2-15 | 2-15 | 0 | 2-15 | 1-20 | 5-40 |
| 11 | 0 | 5-25 | 2-15 | 0 | 2-15 | 2-15 | 1-20 | 0 |

In an aspect, a film forming compound is a compound that forms a solid layer on a seed surface. In another aspect, a film forming compound is a compound that forms a solid layer when slurry dries on a seed surface. Without being limited, a film forming compound is selected from the group consisting of polyurethane compound or composition, a polyurethane dispersion, an anionic aliphatic polyester-polyurethane dispersion, a water-soluble polymer, a polyvinylpyrrolidone (PVP polymer), Impranil® DLN 50 (Bayer), Impranil® DLN W 50 (Bayer), Luvitec® VA 64 (BASF), and Luvitec® line of products In an aspect, a binder is a compound or composition that binds particles on seed surface. In another aspect, a binder is a compound or composition that physically or chemically binds solid particles on seed surface. Without being limited, a binder is an adhesion agent, acrylic polymer, vinyl acetate, or a styrene-butadyne polymeric latex compound.

In an aspect, an oil is selected from the group consisting of, for example, mineral oil, mineral processing oil, vegetable oil, natural oil, synthetic oil, refined vegetable oil, plant oil, linseed oil, and Tufflo® 100 (Calumet).

In an aspect, a wetting agent is a material capable of making a hydrophobic seed surface more hydrophilic. In another aspect, a wetting agent is a material, for example a surfactants, capable of making a hydrophobic seed surface more hydrophilic. Without being limited, a wetting agent is selected from the group consisting of a fatty alcohol ethoxylate, polysiloxane, sorbitan monooleate, polyoxyethylene sorbitan monooleate Polyoxyethylene sorbitan monooleate, ethoxylated oleyl alcohol, Ninex® MT-615 (Stepan), Genapol® O-100 (Clariant), or Tween® 80.

In an aspect, a dispersing agent is a material capable of keeping suspended particles from coagulating or aggregating. In another aspect, a dispersing agent creates a barrier between active ingredients, without being limited, a dispersing agent is selected from the group consisting of naphthalene, alkyl alcohol with an ethylene oxide/propylene oxide ("EO-PO")n chain, butyl capped EO-PO copolymer, and Antarox® B/848 (Rhodia).

In another aspect, the dust reducing composition described herein can include one or more of the following and combinations thereof: Luvitec®VA 64; Impranil® DLN 50; Antarox® B/848; Ninex® MT-615; Tween® 80; Genapol® O-100; Tufflo® 100; and Linseed oil.

In an aspect, the methods and compositions described herein reduce dust, insecticidal dust emissions, pesticidal dust emissions, herbicidal dust emissions, or fungicidal dust emissions by about 5% to about 20%, about 20% to about 60%, about 40% to about 70%, about 50% to about 90%, about 60% to about 80%, about 65% to about 95%, about 80% to about 95%, or about 5%, about 15%, about 25%, about 40%, about 50%, about 60%, about 70%, about 80%, about 90%, or about 95%, or about 5% or more, about 15% or more, about 25% or more, about 40% or more, about 50% or more, about 60% or more, about 70% or more, about 80% or more, about 90% or more, or about 95% or more. In yet another aspect, the dust emissions, insecticidal dust emissions, pesticidal dust emissions, or fungicidal dust emissions is reduced relative to traditional lubricants, such as talc or graphite.

In an aspect, a seed dust reducing compound or composition described herein is applied to a seed at a rate of about 0.1-5.0 oz/cwt (ounces/hundredweight), about 0.5-4.0 oz/cwt, about 1.0-3.5 oz/cwt, about 1.5-3.0 oz/cwt, about 2.0-3.0 oz/cwt, about 2.0-2.5 oz/cwt, or about 0.2 oz/cwt, about 0.5 oz/cwt, about 0.75 oz/cwt, about 1.0 oz/cwt, about 1.5 oz/cwt, about 2.0 oz/cwt, about 2.5 oz/cwt, about 3.0 oz/cwt, about 3.5 oz/cwt, about 4.0 oz/cwt, about 4.5 oz/cwt, about 5.0 oz/cwt, or about 0.2 oz/cwt or more, about 0.5 oz/cwt or more, about 0.75 oz/cwt or more, about 1.0 oz/cwt or more, about 1.5 oz/cwt or more, about 2.0 oz/cwt or more, about 2.5 oz/cwt or more, about 3.0 oz/cwt or more, about 3.5 oz/cwt or more, about 4.0 oz/cwt or more, about 4.5 oz/cwt or more, or about 5.0 oz/cwt or more. In yet another aspect, a composition described herein is applied to a seed in a manner sufficient to convey the desired property.

Mite Repelling or Killing Compound or Composition

In an aspect, a composition described herein can include a compound capable of controlling or killing a mite. In an aspect, a compound capable of controlling or killing a mite is selected from the group consisting of 1-arylimidazoles, 1-aryl pyrroles, and 1-arylpyrazoles.

In another aspect, a compound capable of controlling or killing a mite is selected from the group consisting of Formulas XIV-XVI:

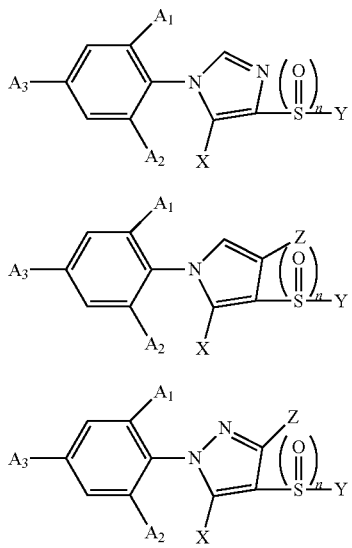

wherein,
X is halogen, Cl, F, Br, or I;
$A_1$, $A_2$, and $A_3$ are individually selected from halogen, Cl, F, Br, I, alkyl, or haloalkyl;
Z is H, CN, halogen, or alkylcarbonyl,
n is 0, 1, or 2, and
Y is alkyl, methyl, haloalkyl, perhaloalkyl, polyhaloalkyl, CF2Cl, CF3, or CCl2F.

In another aspect, compounds of Formulas XIV-XVI can be used together with a compound or composition described herein in the methodology described herein.

Composition or Support Treated with a Compound or Composition Described Herein

In an aspect, the disclosure provides for a support or carrier material combined with a compound or composition described herein. In another aspect, the support material can be coated or impregnated with a compound or composition described herein. An insecticide, herbicide, fungicide, or miticide can also be added to the support material coated or impregnated with a compound or composition described herein. Examples of support materials capable of being used with a compound or composition described herein include an absorbent material, wood, cardboard, corrugated cardboard, cotton, wallpaper, paper, plastic, a plastic tube, and metal. Support materials with a low heat transfer rate may also be suitable.

Methods of Synthesizing Ketones Described Herein

Ketones described herein can be synthesized or prepared using various methods, transformations, and reactions. In an aspect, a ketone prepared herein is produced from its corresponding alcohol by oxidation of alcohols to ketones in the presence of catalyst. The alkene oxidation can be carried out under catalytic conditions. In an aspect, the ketones are extracted or isolated from a natural source.

In an aspect, a ketone described herein can be prepared or manufactured using the Wacker process or the Hoechst-Wacker process by the oxidation of alkenes to ketones.

The Wacker-Tsuji oxidation is the laboratory scale version of the above reaction (wacker process), for example the conversion of 1-decene to 2-decanone with palladium(II) chloride and copper(I) chloride in a water/dimethylformamide solvent mixture in the presence of air as follows in Formula I:

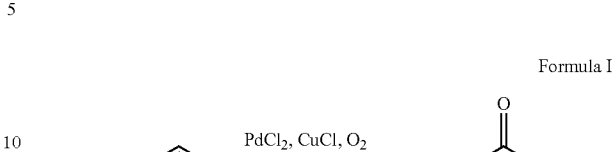

Formula I

In another aspect, the Weinreb ketone synthesis can be applied to synthesize or prepare ketones described herein. The reaction involves two subsequent reactions that converts an acid chloride into an N,O dimethylhydroxyamide, (a Weinreb amide) and subsequent treatment with an organometallic reagent such as a Grignard reagent or organolithium reagent. The reaction mechanism is shown below.

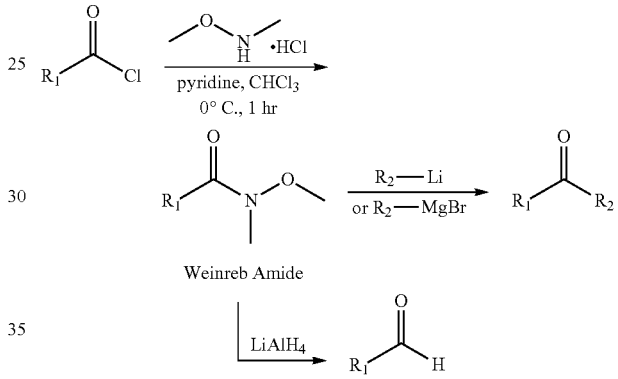

In an aspect the disclosure also provides for a method of producing a ketones described herein as follows:
1) By hydrolysis of gem-dihalides;
2) By hydrolysis of vinyl ethers, acetals, and ortho esters;
3) By hydrolysis of enol esters;
4) By alkylation using carbanion with alkyl halides;
5) By reaction of acyl halides with organometallic compounds such as Grignard reagents;
6) By Ruzicka cyclization to form cyclic ketones from dicarboxylic acid;
7) By utilizing Friedel-Crafts acylation to synthesize aryl ketone;
8) By acylation with nitriles (Hoesch reaction or Houben-hoesch reaction);
9) By Fries rearrangement starting from aryl ester in the presence of acid such as Lewis acid, e.g. ALCL3;
10) By Using Stork enamine reaction;
11) By decomposition of tertiary hypochlorites;
12) By hydration of alkynes;
13) By hydrolysis of imime (C=N double bond);
14) By hydrolysis aliphatic nitro compounds;
15) By addition of Grignard reagents to nitriles;
16) By pinacol rearrangement;
17) By rearrangement of vinyl ether; and
18) By ozonolysis of olefin.

In another aspect, a ketone described herein can be converted to a corresponding oxime by any known synthesis method. In another aspect, a ketone described herein can be used as an insect repellent and the corresponding oxime can be used as an insect attractant. In yet another aspect, the disclosure provides for a method of producing a ketone to be used as an insect repellent and converting said ketone to an oxime which can be used as an insect attractant.

In yet another aspect, the disclosure provides for a one step method of producing both an insect attractant (oxime) and insect repellent (ketone) by converting a (1) ketone to a corresponding (2) oxime by a one step method producing a ketone to be used as an insect repellent. In an aspect, the ketone repellent and oxime attractant can be used to repel or attract the same or different insect during the same or different methods.

Kit

In another aspect, the disclosure provides for a kit comprising, consisting essentially of, or consisting of any of the compounds or compositions disclosed herein. In an aspect, the kit includes any of the combination of compounds or compositions described in Examples 1-15, Tables 1-24, or FIGS. 1-49. In another aspect, the kit provides for the compositions described in Examples 1-15, Tables 1-24, or FIGS. 1-49, applied in a manner that is consistent with the methodology of these examples and figures. In another aspect, the kit provides instructions or guidance regarding the use of the compositions or methods described herein.

In an aspect, the kit includes instructions describing the methodology described herein. In another aspect, the kit includes instructions describing the methodology set forth in any of Examples 1-15, Tables 1-24, or FIGS. 1-49. In an aspect, the instructions are included with the kit, separate from the kit, in the kit, or are included on the kit packaging.

In another aspect, a repelling, controlling, or directing compound or composition disclosed herein is incorporated into a device or support. In another aspect, a device can include a device designed to house and/or shelter a repelling, controlling, or directing compound or composition disclosed herein. In yet another aspect, a device disclosed herein may be a container, holder or other solid support onto or into which a repelling, controlling, or directing compound or composition disclosed herein. A device disclosed herein may be made from any biological or synthetic material, including, without limitation, paper, filter paper, wood, cork, cotton, plastic, polymer, metal, or glass.

In another aspect, the kit can contain a single-use disposable detection device, bait, support material, or trap. The kit may also contain a reusable multi-use detection device, bait, support material, or trap.

In another aspect, the kit may include a supplement to the detection device, bait, support material, or trap. For example, the supplemental kit may contain an additional bait composition or other supplement to the to the detection device, bait, support material, or trap. In one aspect, the supplemental kit is packaged separate from the detection device, bait, support material, or trap. In another aspect, the supplemental kit is packaged together with the detection device, bait, support material, or trap.

The following examples serve to illustrate certain aspects of the disclosure and are not intended to limit the disclosure.

EXAMPLES

Example 1

Example 1 sets forth the feeding station arrangement for the honeybee repulsion experiments described herein.

FIG. 1 describes the feeding station arrangement (A and B) for the honeybee repulsion experiments described herein. As set forth in FIG. 1, panel (A) sets forth the bee cage positions on the left portion of panel (A) with the randomized feeding station positions on the right portion of panel (A). Panel (B) sets forth an alignment of the randomized feeding station positions with a distance of two meters between feeding stations. A total of eight feeding stations were evaluated at a ten meter distance in front of the respective bee hives. The feeding stations were placed two meters apart from one another.

Honeybees were trained to deep feeders (eight positions), each containing a 50% sucrose solution for one day. After the honeybees were trained to each feeder, the 50% sucrose feeder at randomized positions 1-8 was replaced with a shallow feeder containing a combination of repelling compounds and a 50% sucrose solution according to Table 5. In accordance with FIGS. 5 and 6, 2% by weight of Camphor oil (T4), Ajowan oil (T5), Camphor powder (T6), Rosemary oil (T7), and 2-Decanone (T8) in combination with a 50% sucrose treatment were added to feeders on day two. Honeybees in randomized position 8 (2-Decanone) exhibited repellency at 24 hours.

Example 2

Example 2 describes the effectiveness of various active agents in repelling honeybees.

Table 5 describes active agents evaluated for bee repulsion and their randomized feeding station positions. As described in Table 5, T1 (control), T2 (control), T3 (control), T4 (Camphor oil), T5 (Ajowan oil), T6 (Camphor powder), T7 (Rosemary oil), and T8 (2-Decanone).

TABLE 5

| Number Code | Treatment | Randomized position (feeding station number) |
|---|---|---|
| 1 | C (untreated 50% sucrose) | 6 |
| 2 | C (untreated 50% sucrose) | 7 |
| 3 | C (untreated 50% sucrose) | 1 |
| 4 | Camphor oil 2.18 g/100.4 g with 50% sucrose | 4 |
| 5 | Ajowan oil 3.25 g/101.1 g with 50% sucrose | 2 |
| 6 | Camphor powder diluted to 100 fluid g with 50% sucrose | 5 |
| 7 | Rosemary oil 2.09 g/114 g 1 g with 50% sucrose | 3 |
| 8 | 2-Decanone 8.6 g/111.83 g 1 g with 50% sucrose | |

Figure 5:
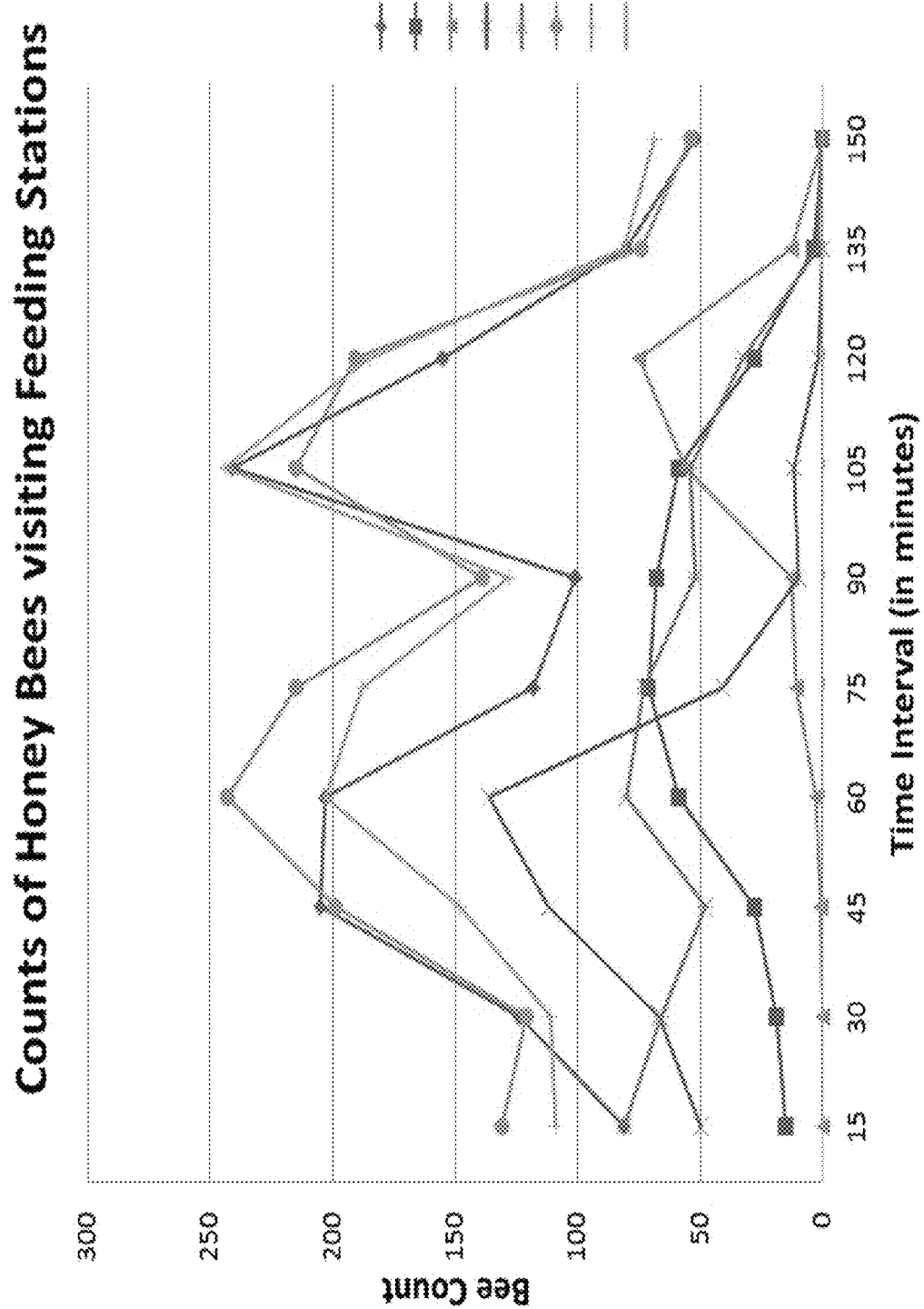
FIG. 5 sets forth the number of honeybees visiting feeding stations for T1 (control—50% sucrose), T2 (control—50% sucrose), T3 (control—50% sucrose), T4 (Camphor oil), T5 (Ajowan oil), T6 (Camphor powder), T7 (Rosemary oil), and T8 (2-Decanone) over a varied period of time. 50% sucrose was included with T4 (Camphor oil), T5 (Ajowan oil), T6 (Camphor powder), T7 (Rosemary oil), and T8 (2-Decanone).
Figure 6:
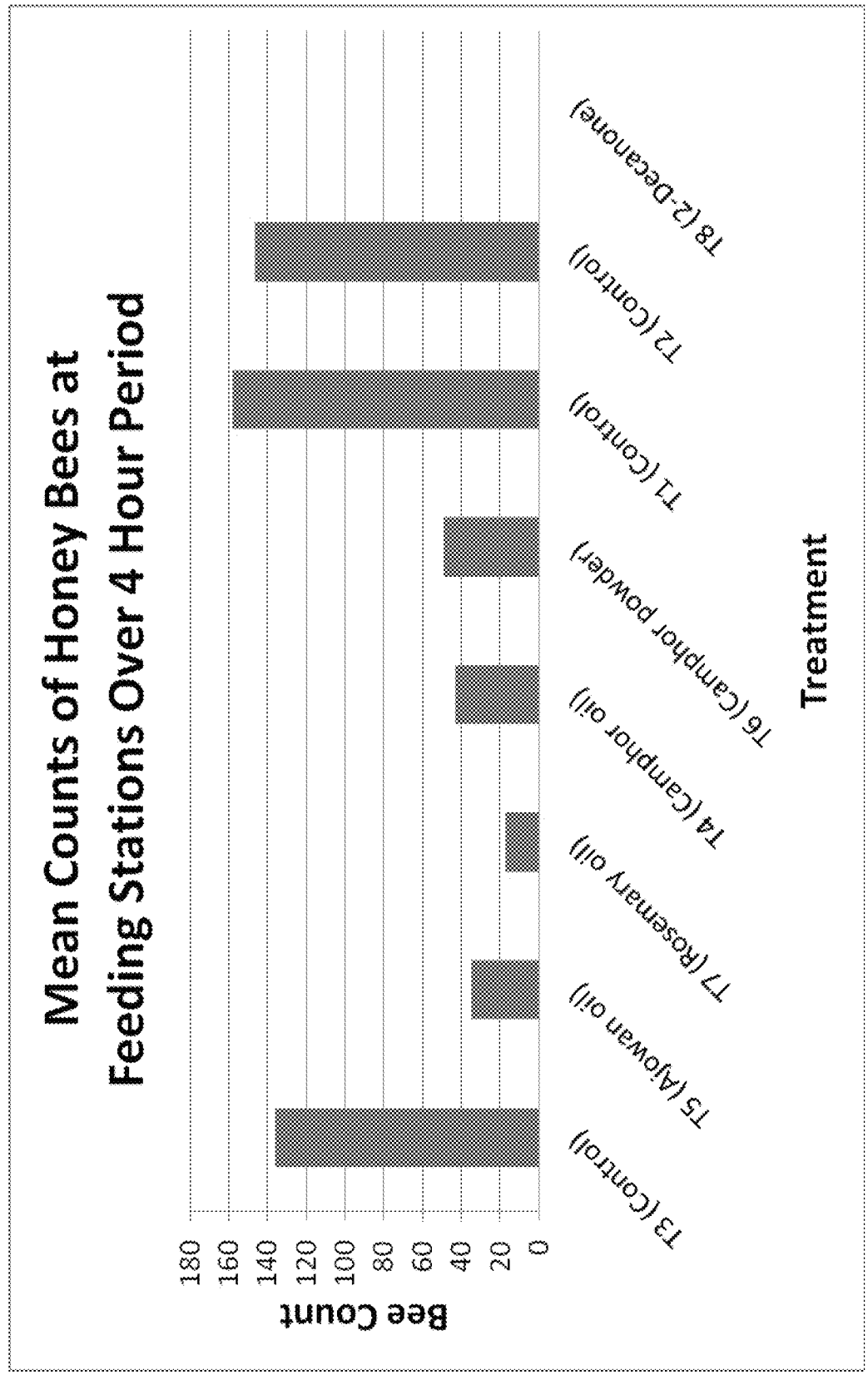
FIG. 6 sets forth the mean number of honeybees visiting feeding station over a period of four hours for T1 (control—50% sucrose), T2 (control—50% sucrose), T3 (control—50% sucrose), T4 (Camphor oil), T5 (Ajowan oil), T6 (Camphor powder), T7 (Rosemary oil), and T8 (2-Decanone). 50% sucrose was included with T4 (Camphor oil), T5 (Ajowan oil), T6 (Camphor powder), T7 (Rosemary oil), and T8 (2-Decanone).
Figure 7:
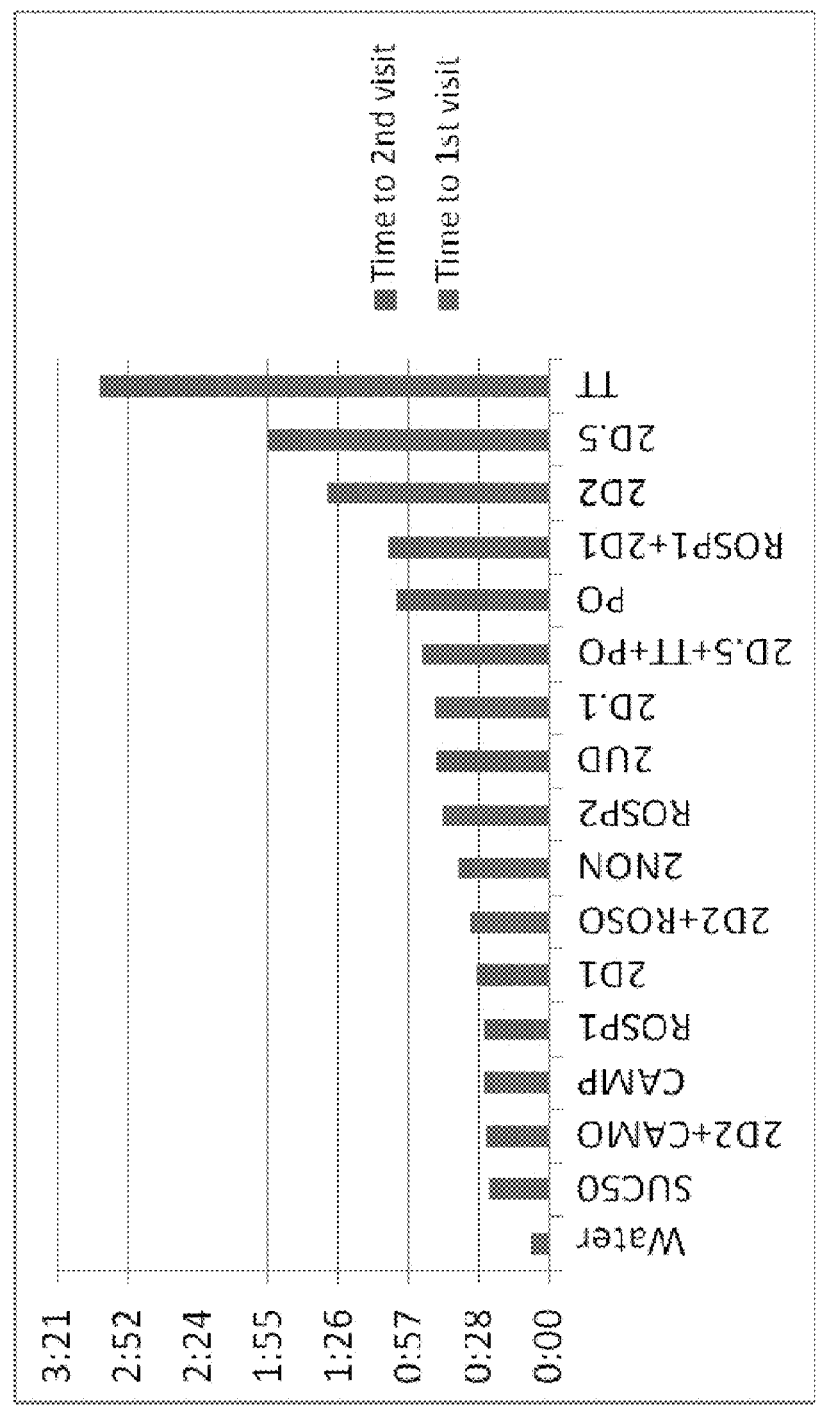
FIG. 7 sets forth the time of honeybee first and second visits accumulated delays as an index of power of initial repellency.
Figure 8:
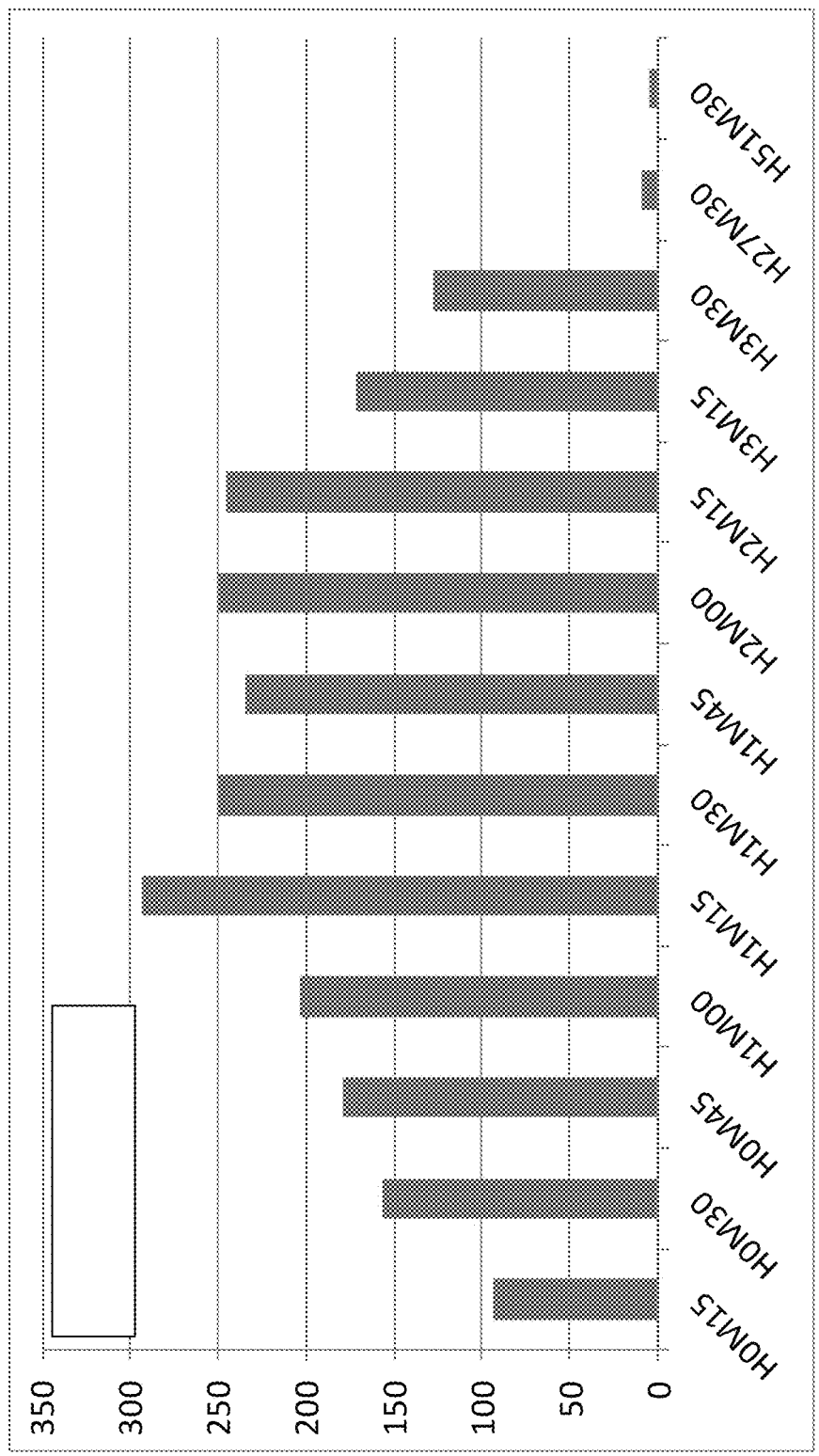
FIG. 8 sets forth the number of honeybees visiting feeding stations for a 50% sucrose control at various time points.
Figure 9:
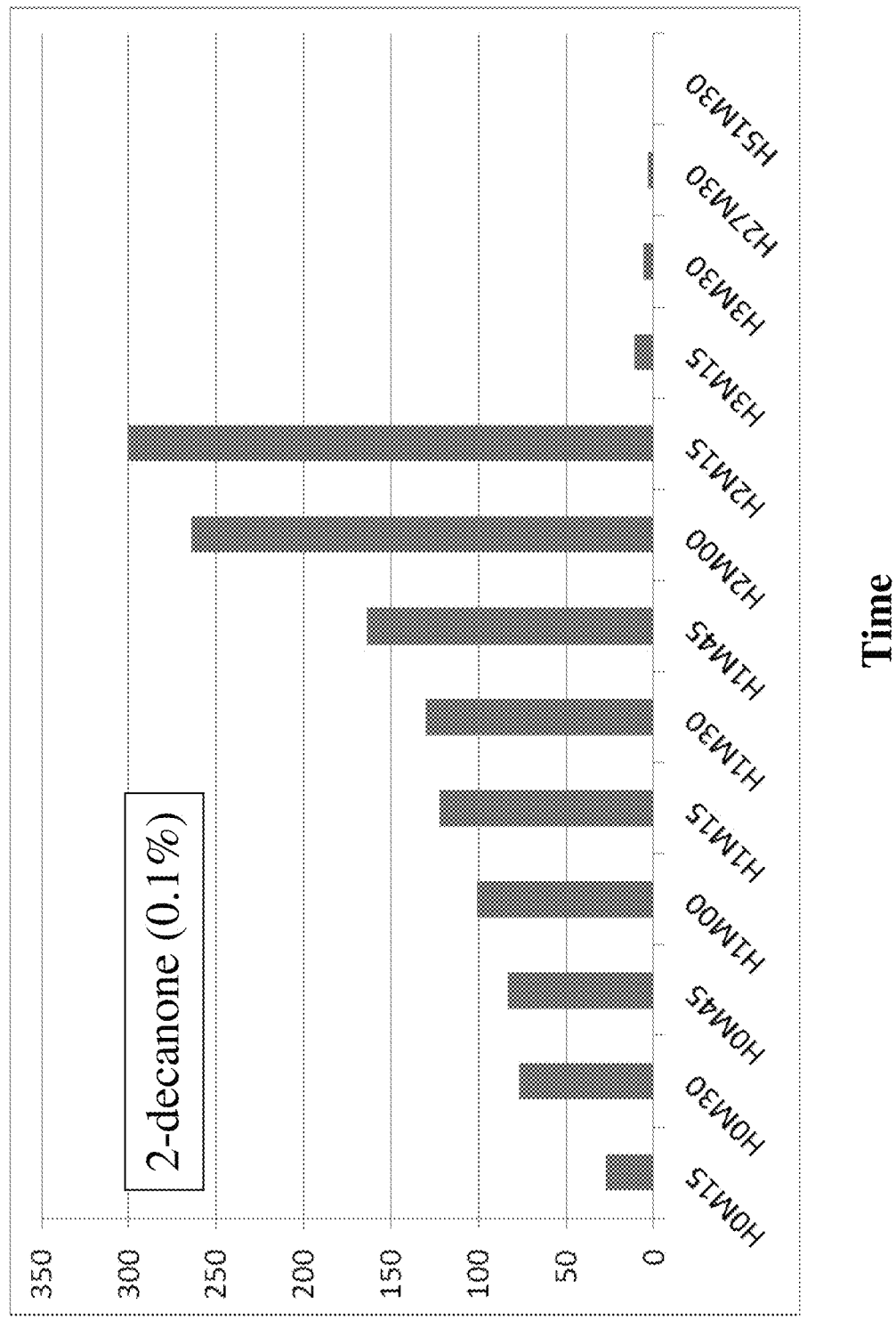
FIG. 9 sets forth the number of honeybees visiting feeding stations for a 2-decanone (0.1% wt) solution at various time points.
Figure 10:
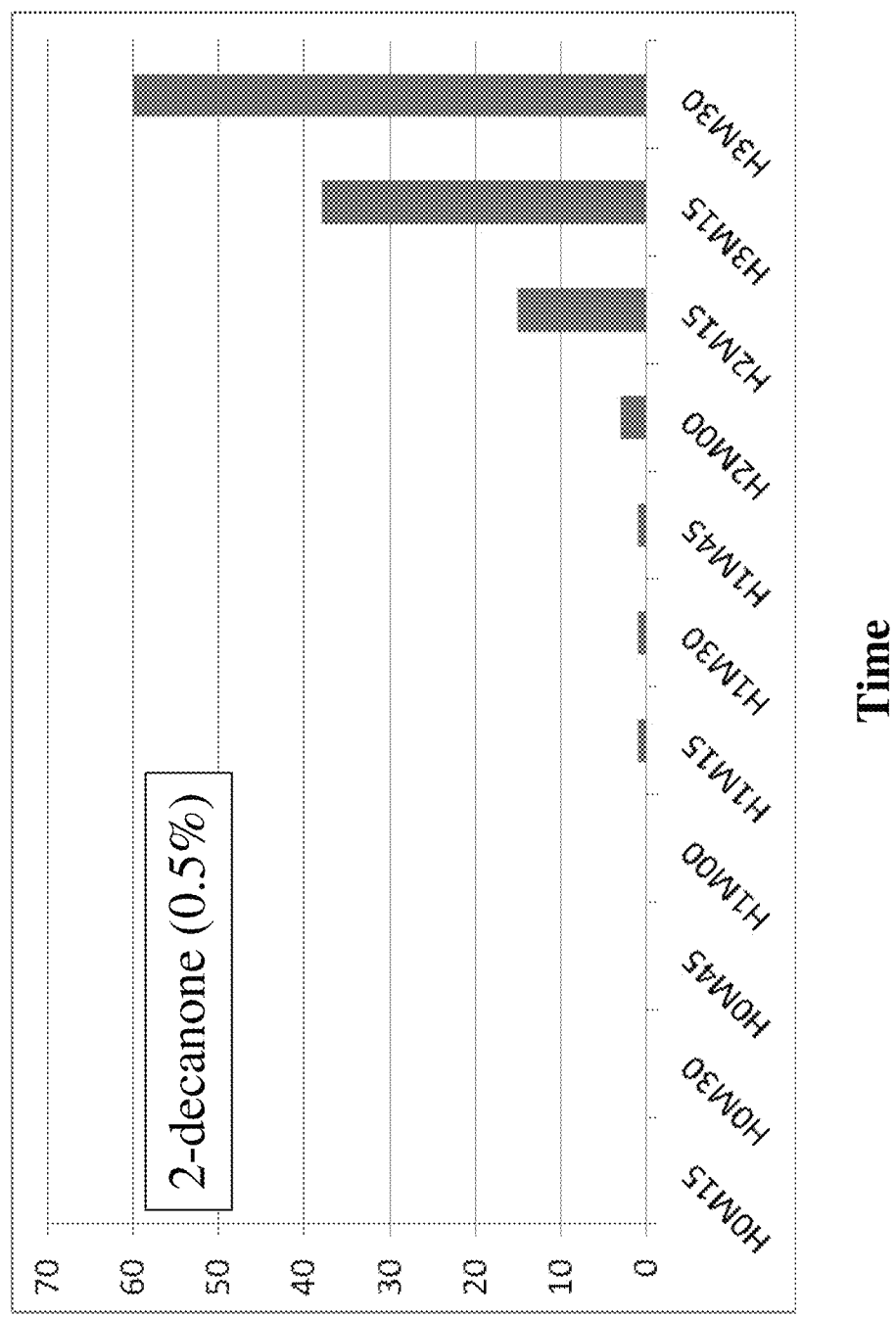
FIG. 10 sets forth the number of honeybees visiting feeding stations for a 2-decanone (0.5% wt) solution at various time points.
Figure 11:
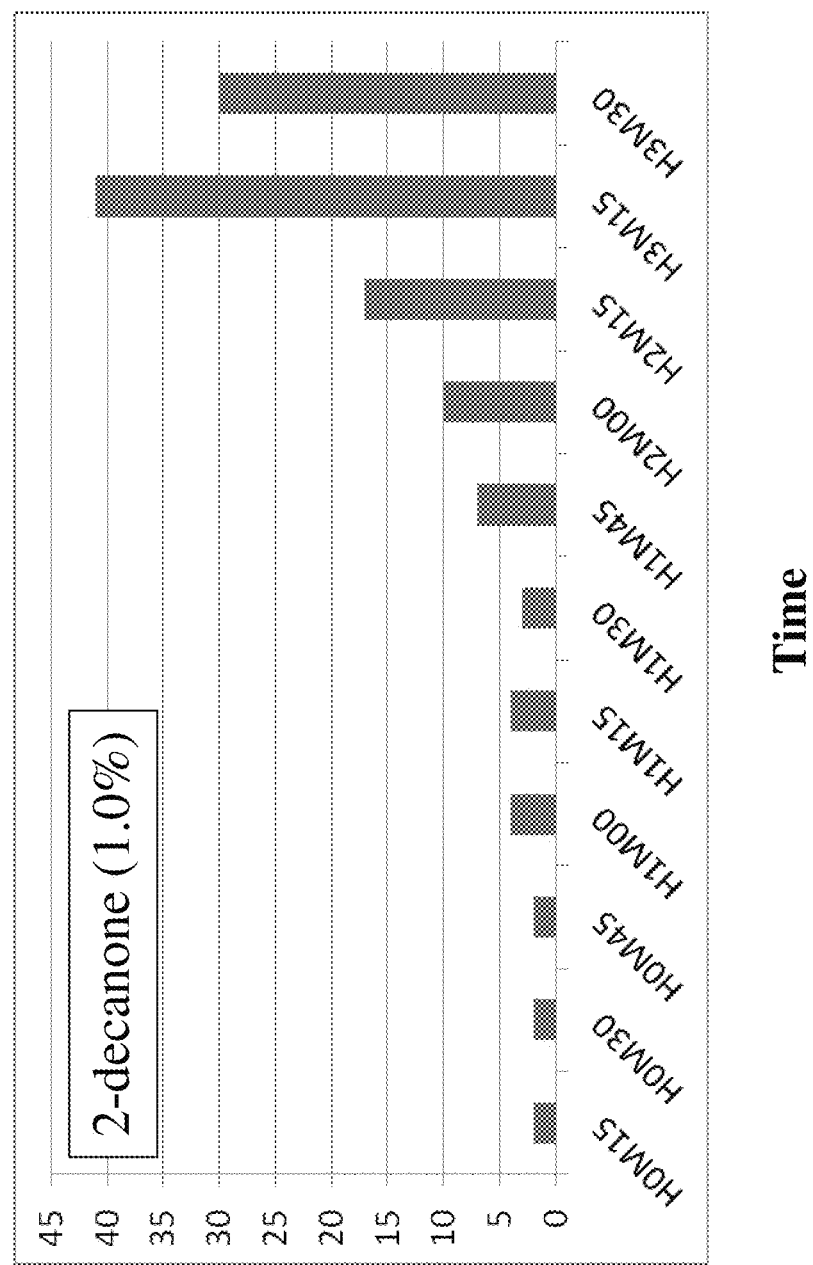
FIG. 11 sets forth the number of honeybees visiting feeding stations for a 2-decanone (1.0% wt) solution at various time points.
Figure 12:
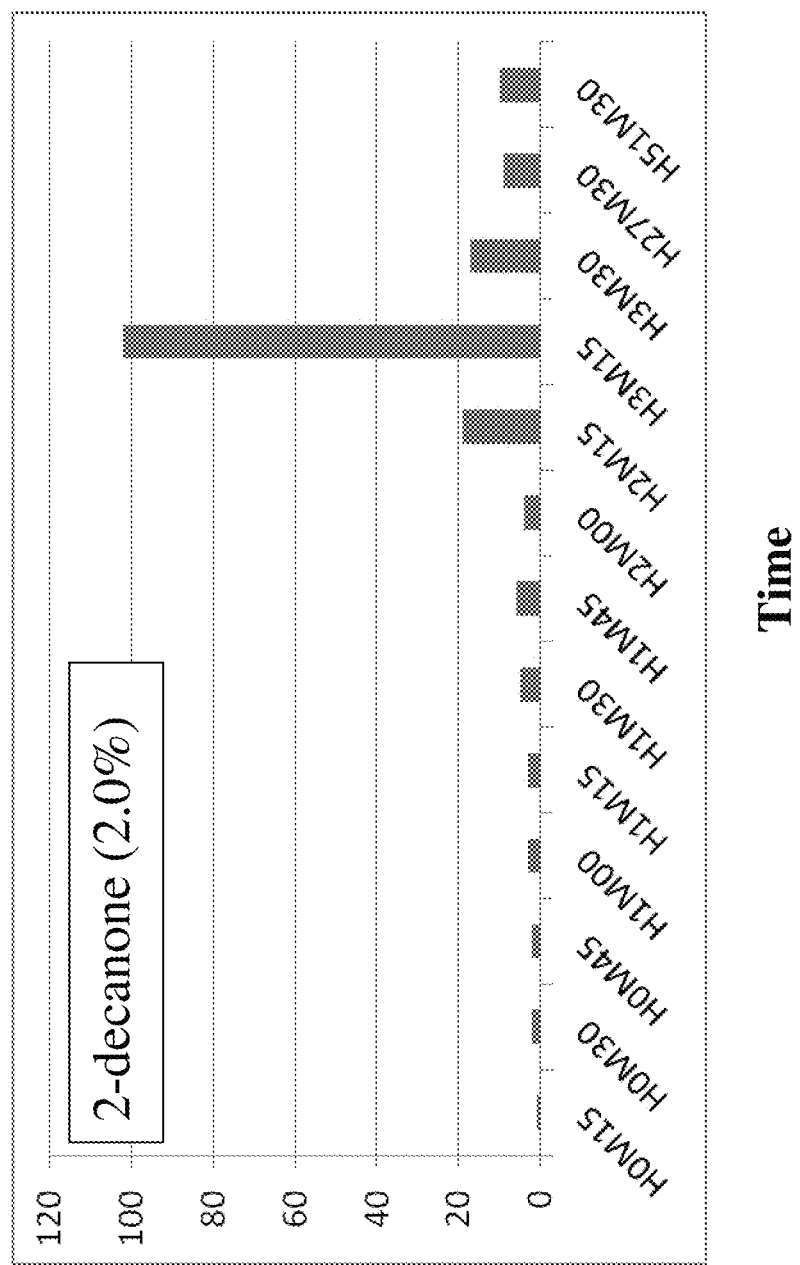
FIG. 12 sets forth the number of honeybees visiting feeding stations for a 2-decanone (2.0% wt) solution at various time points.
Figure 13:
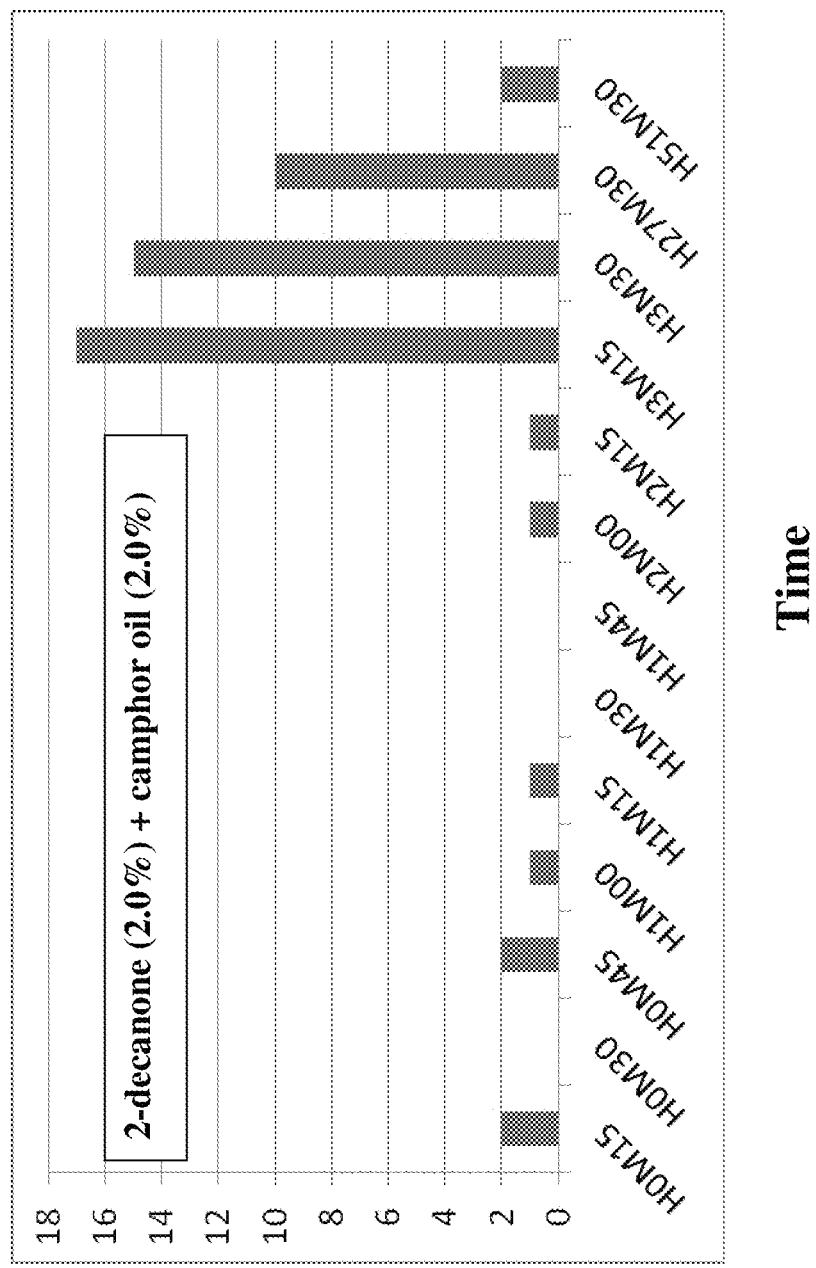
FIG. 13 sets forth the number of honeybees visiting feeding stations for a 2-decanone (2.0% wt) solution with camphor oil (2.0% wt) at various time points.
Figure 14:
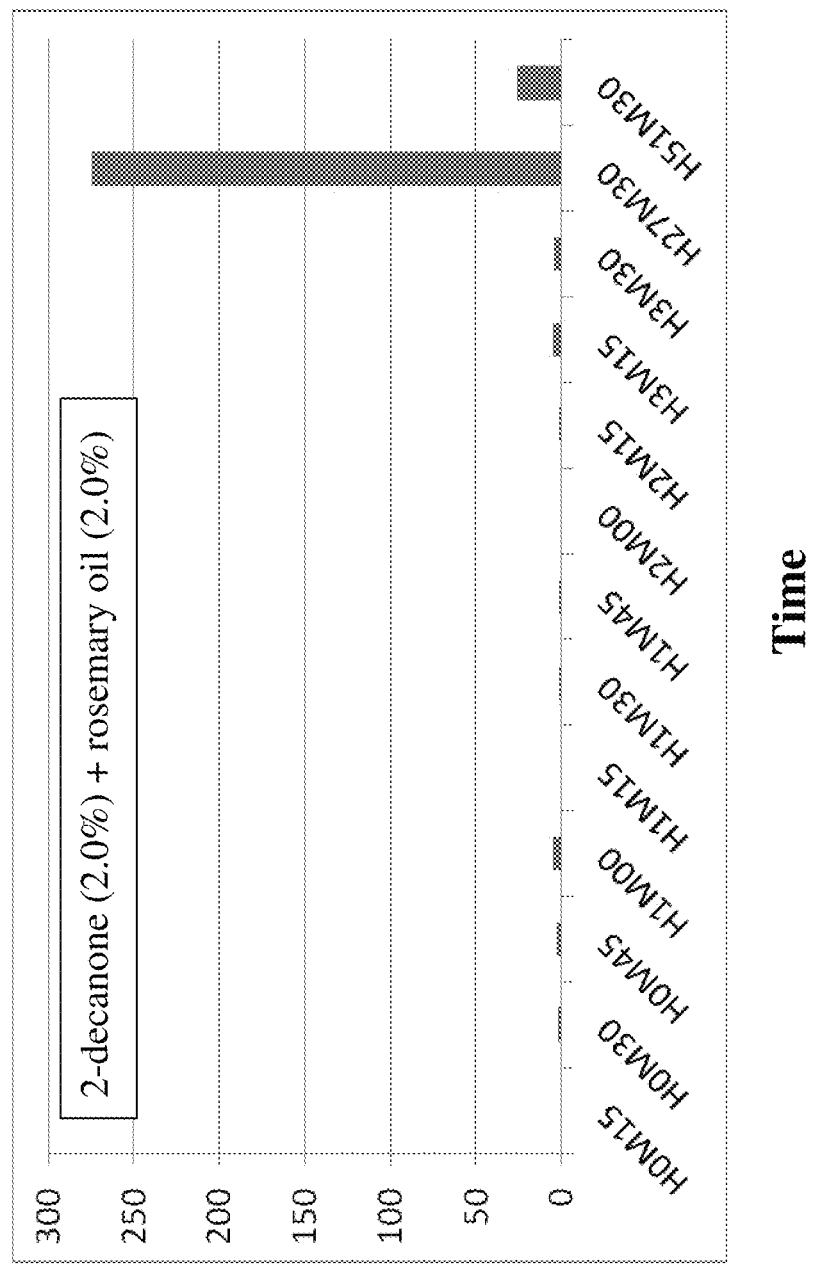
FIG. 14 sets forth the number of honeybees visiting feeding stations for a 2-decanone (2.0% wt) solution with rosemary oil (2.0% wt) at various time points.
Figure 15:
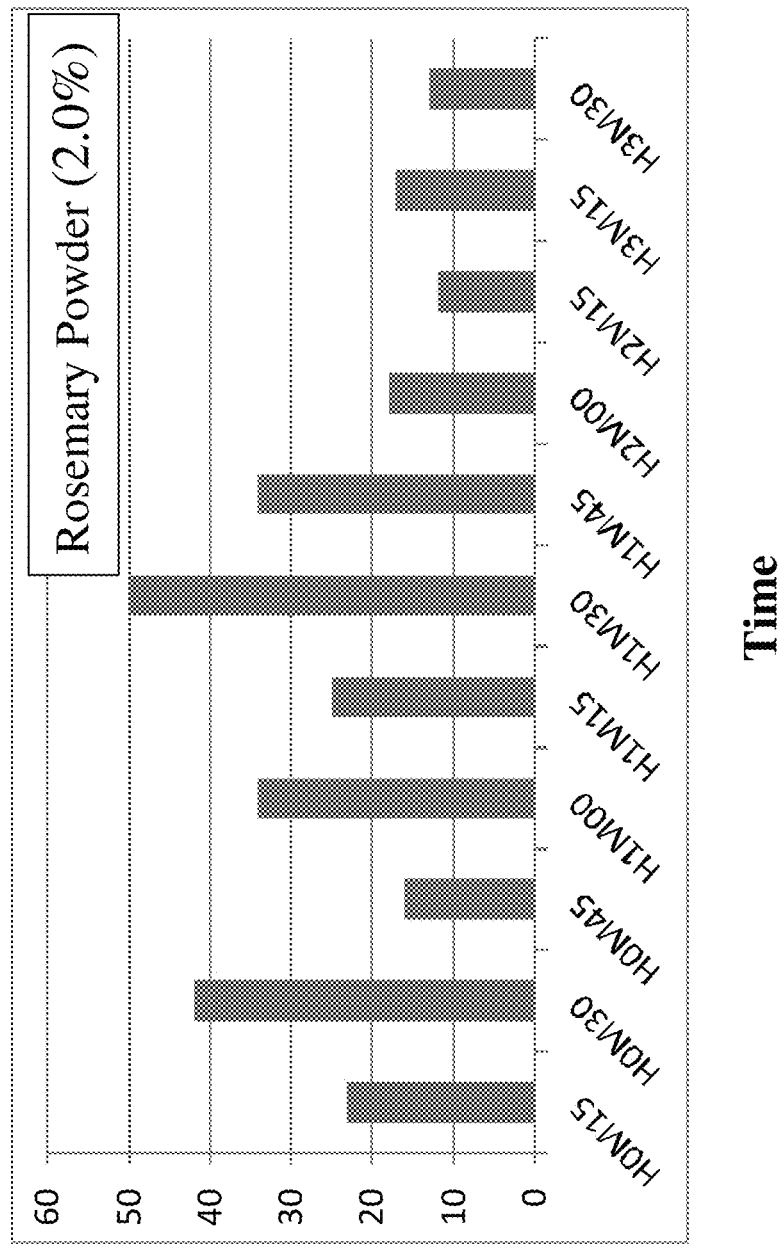
FIG. 15 sets forth the number of honeybees visiting feeding stations with rosemary powder (2.0% wt) at various time points.
Figure 16:
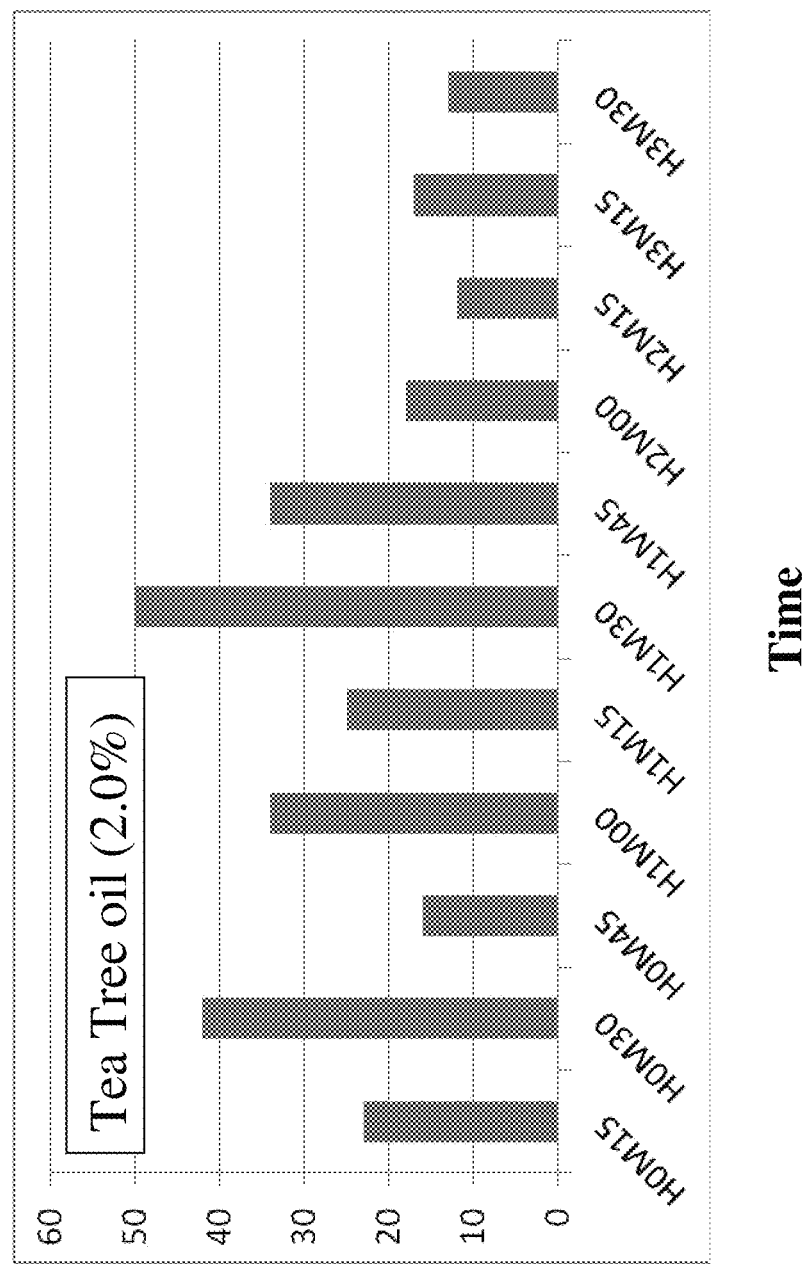
FIG. 16 sets forth the number of honeybees visiting feeding stations for a tea tree oil solution (2.0% wt) at various time points.
Figure 17:
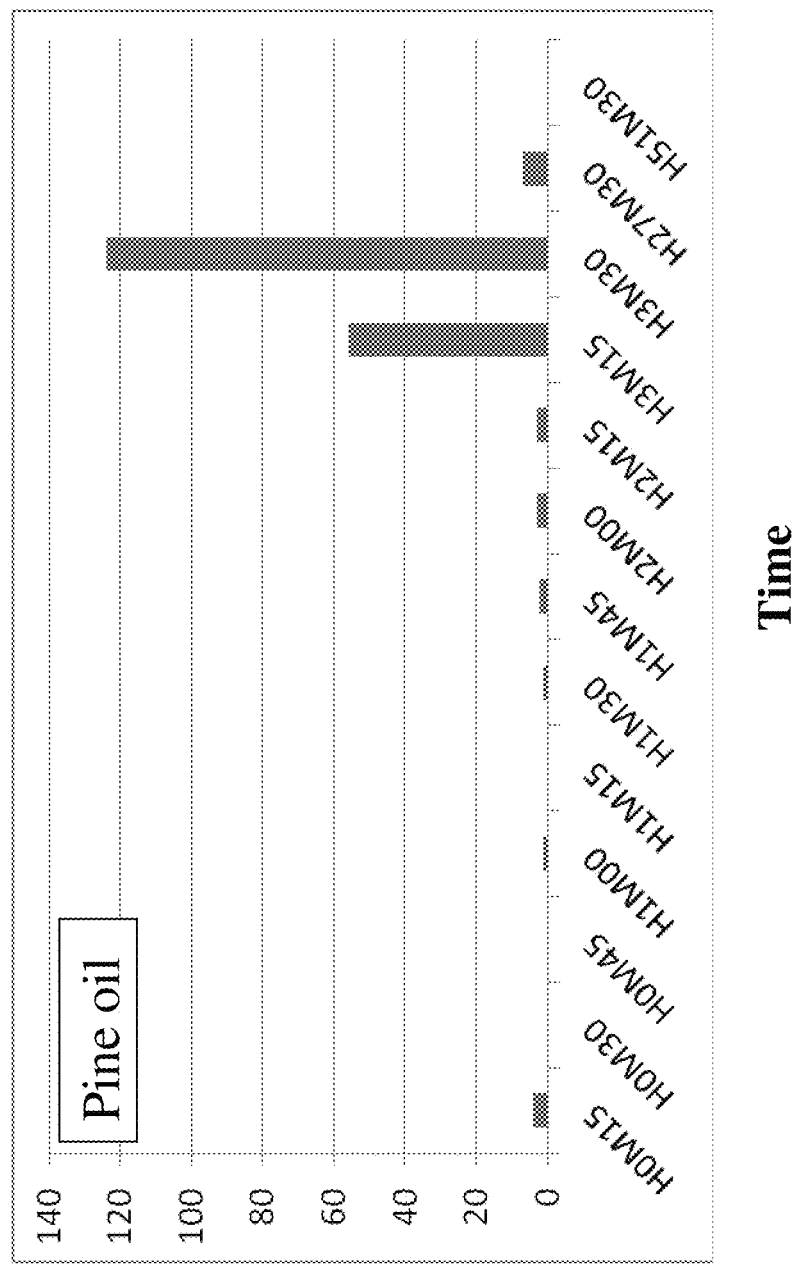
FIG. 17 sets forth the number of honeybees visiting feeding stations for a pine oil solution (2%) at various time points.
Figure 18:
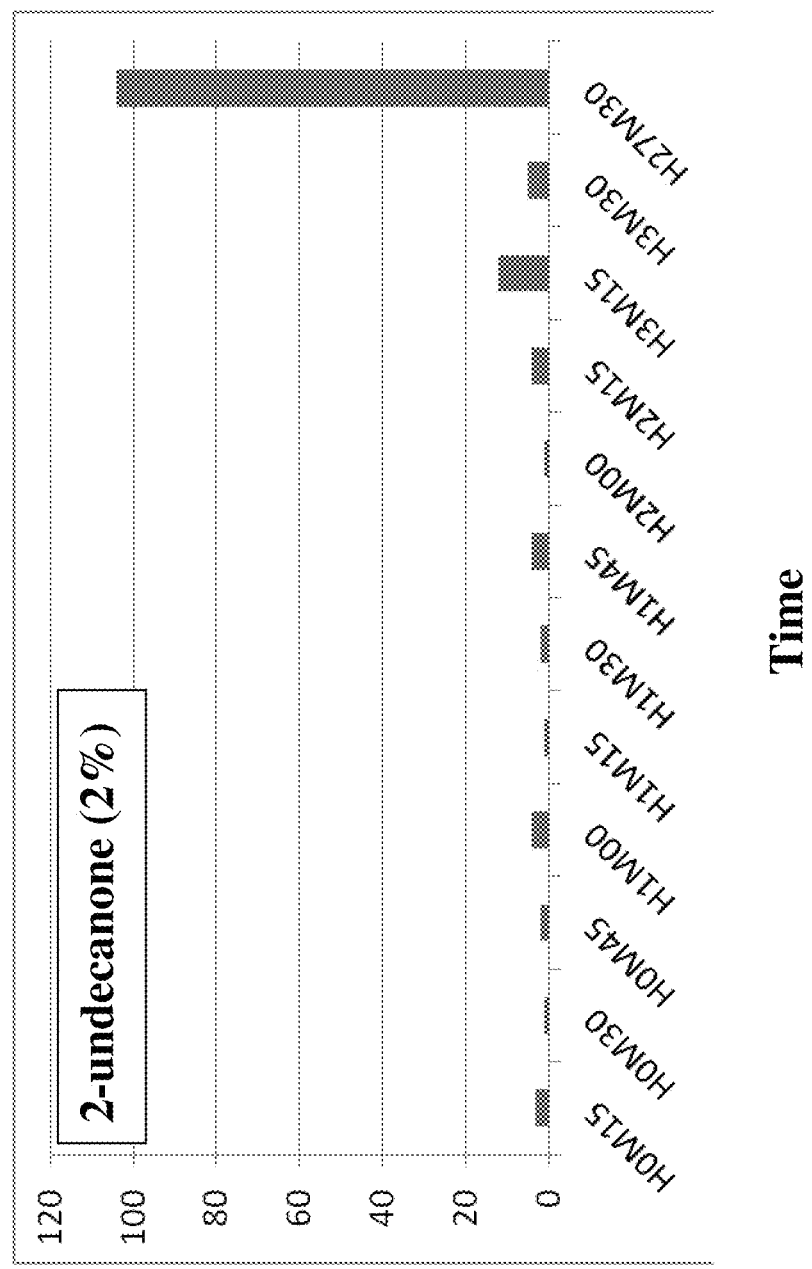
FIG. 18 sets forth the number of honeybees visiting feeding stations for a 2-undecanone solution (2.0% wt) at various time points.
Figure 19:
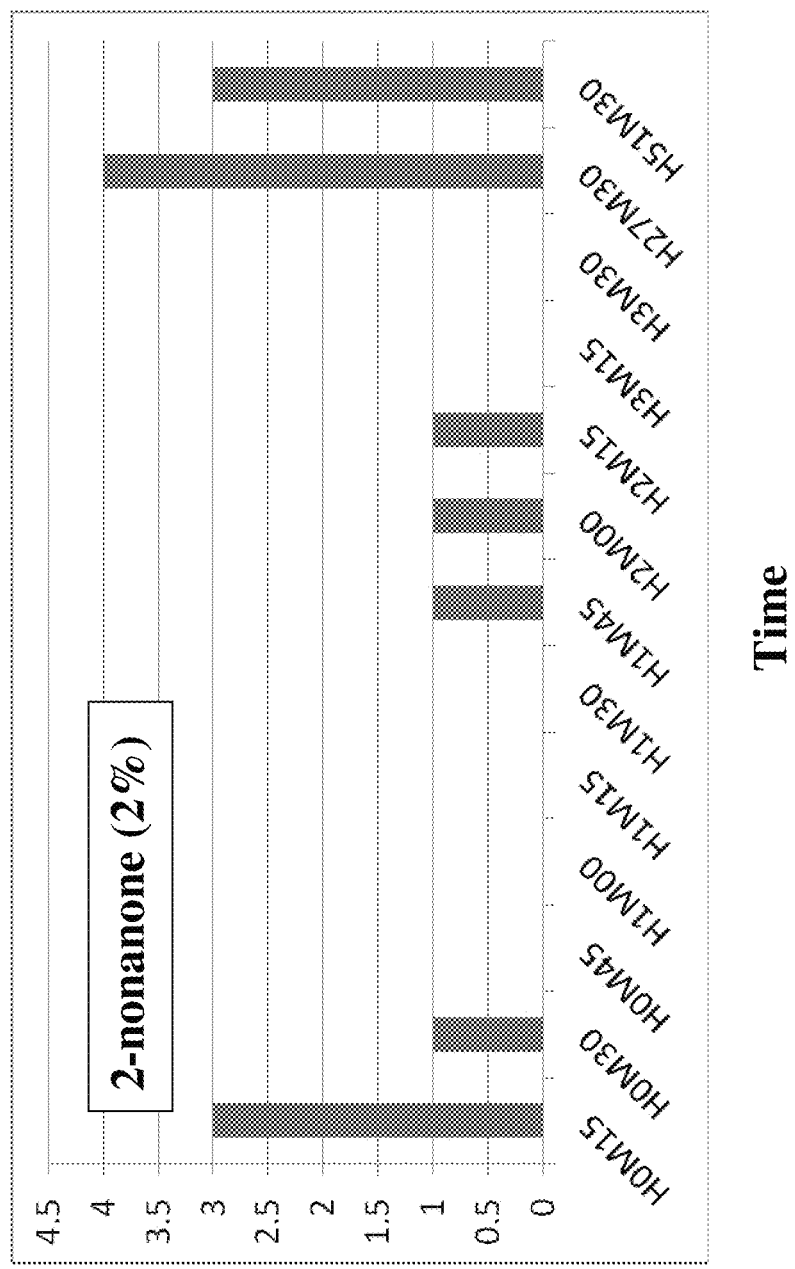
FIG. 19 sets forth the number of honeybees visiting feeding stations for a 2-nonanone solution (2.0% wt) at various time points.
Figure 20:
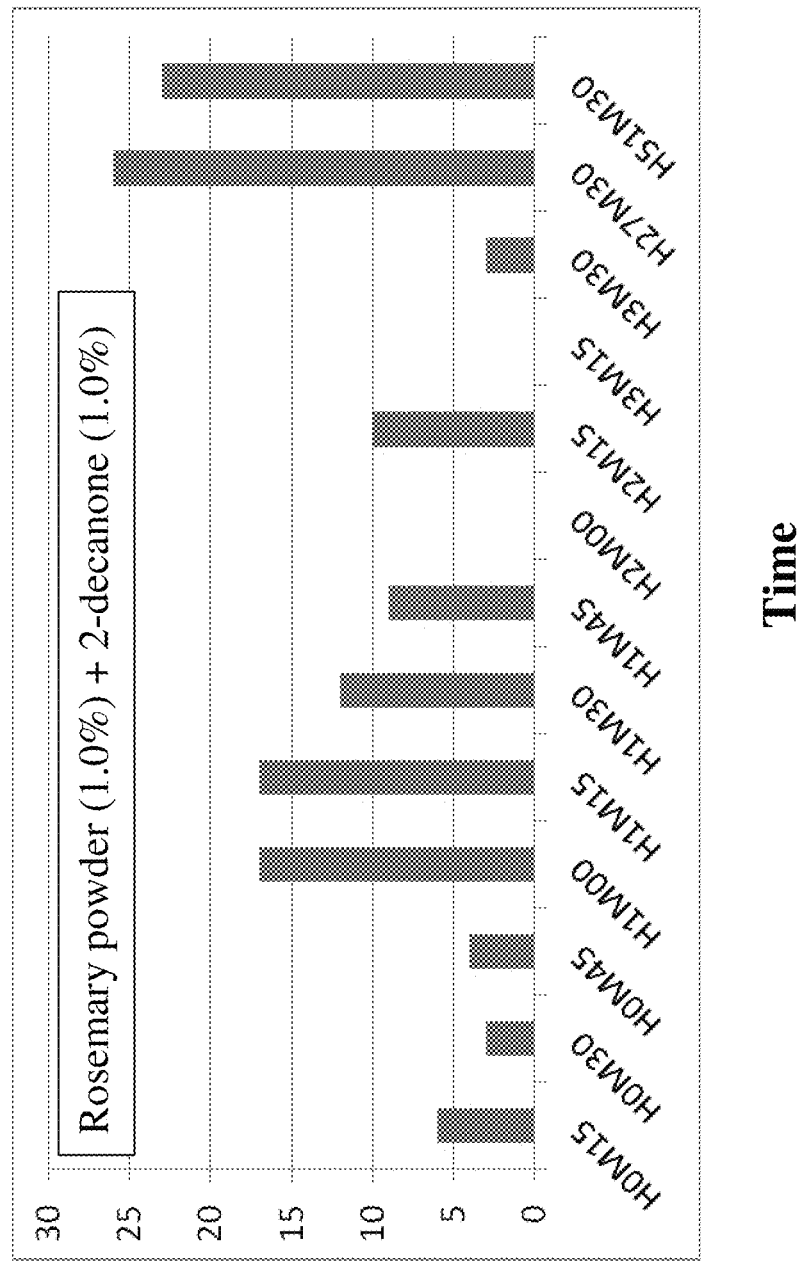
FIG. 20 sets forth the number of honeybees visiting feeding stations for a rosemary powder (1.0%) and 2-decanone solution (1.0%) at various time points.
Figure 21:
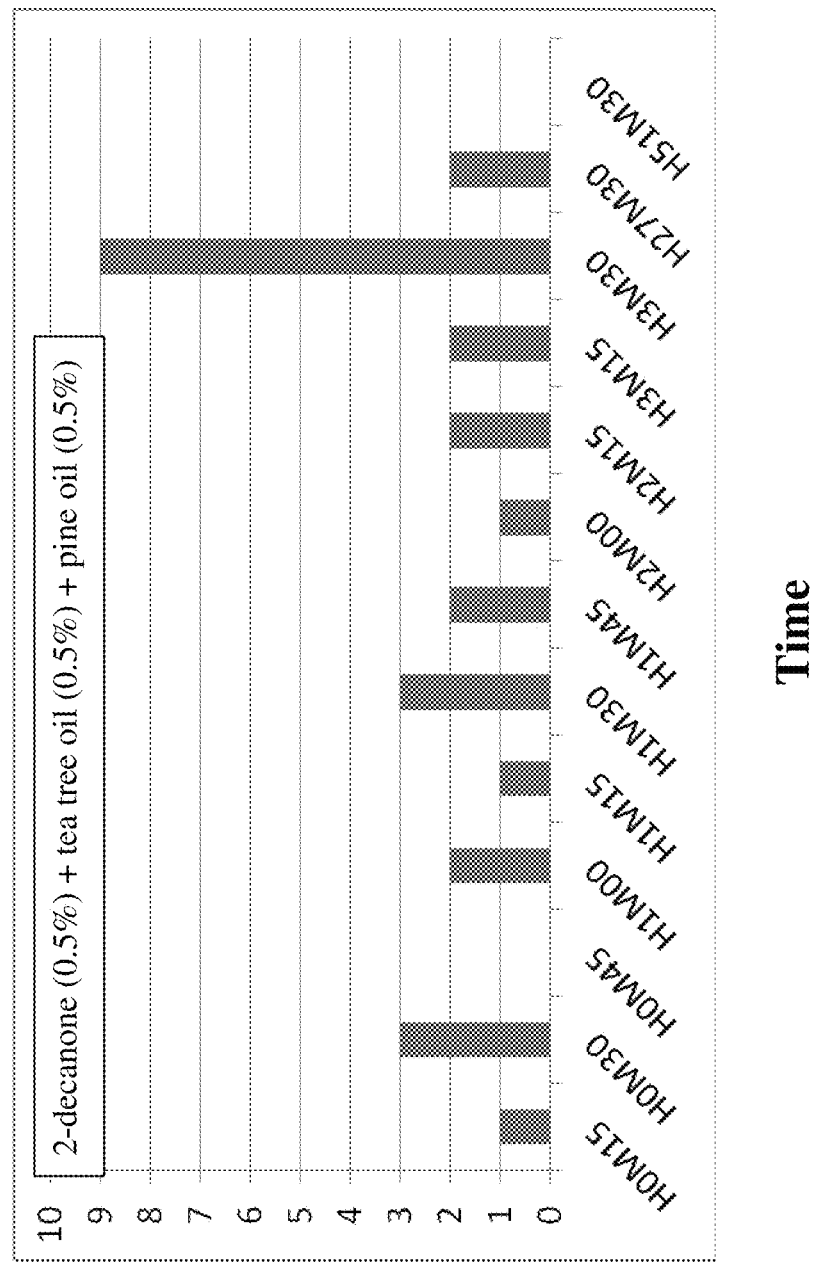
FIG. 21 sets forth the number of honeybees visiting feeding stations for a tea tree oil (0.5%), 2-decanone solution (0.5%), and pine oil (0.5%) solution at various time points.
Figure 22:
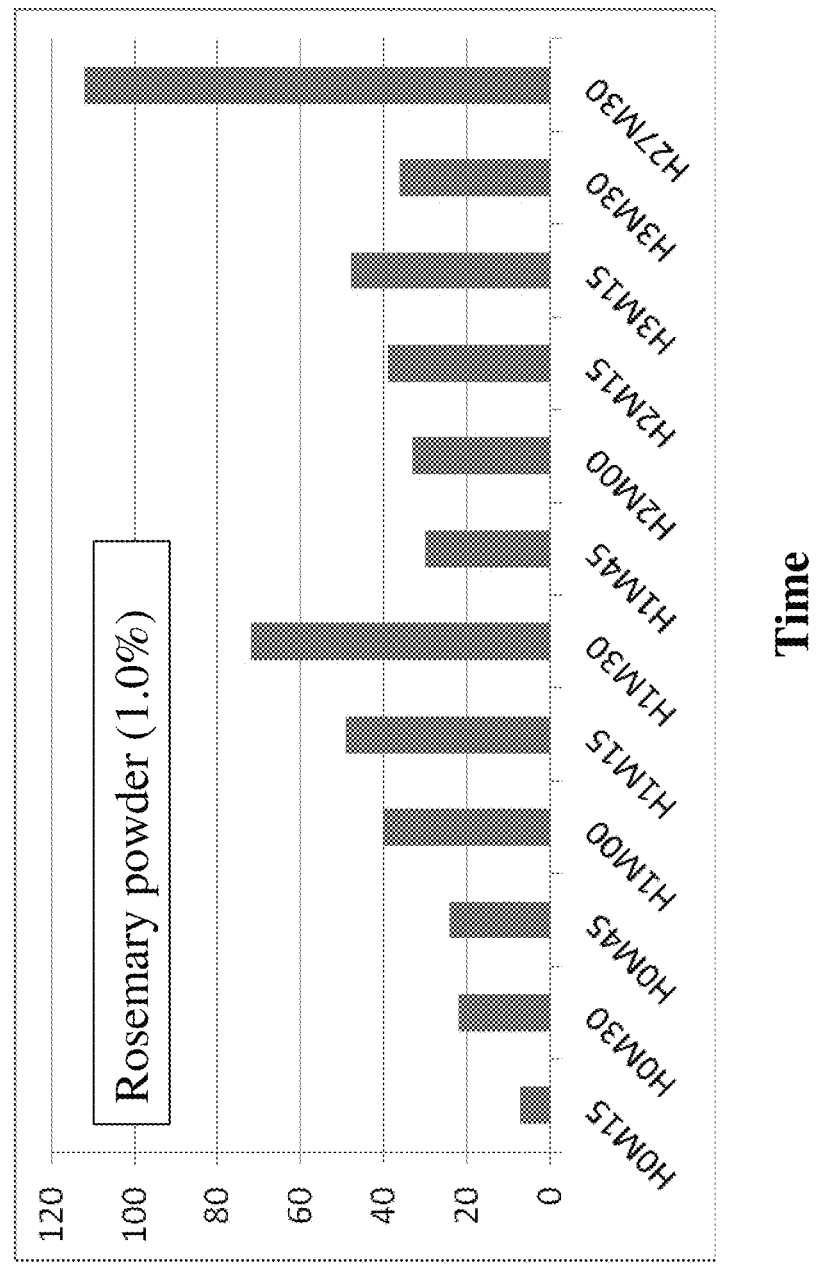
FIG. 22 sets forth the number of honeybees visiting feeding stations for a rosemary powder (1.0%) composition at various time points.
Figure 23:
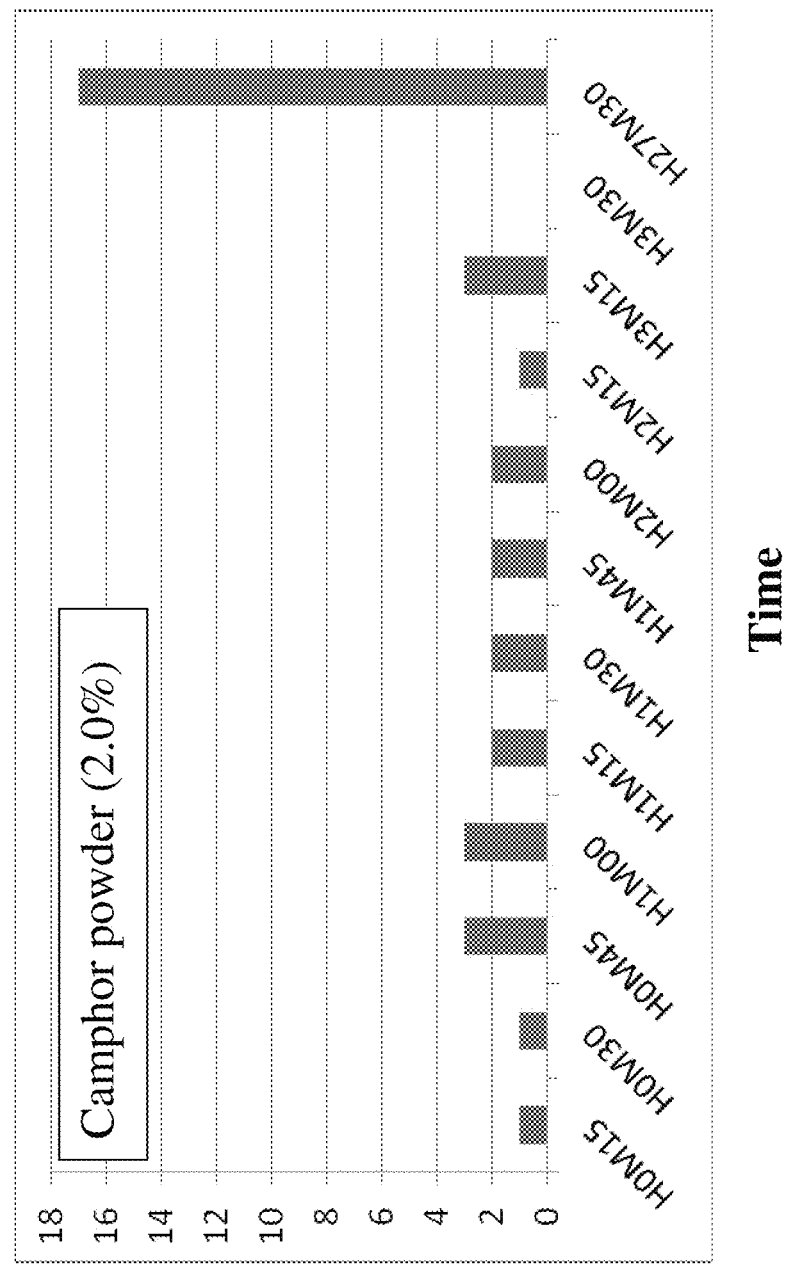
FIG. 23 sets forth the number of honeybees visiting feeding stations for a camphor powder (2.0%) composition at various time points.
Figure 24:
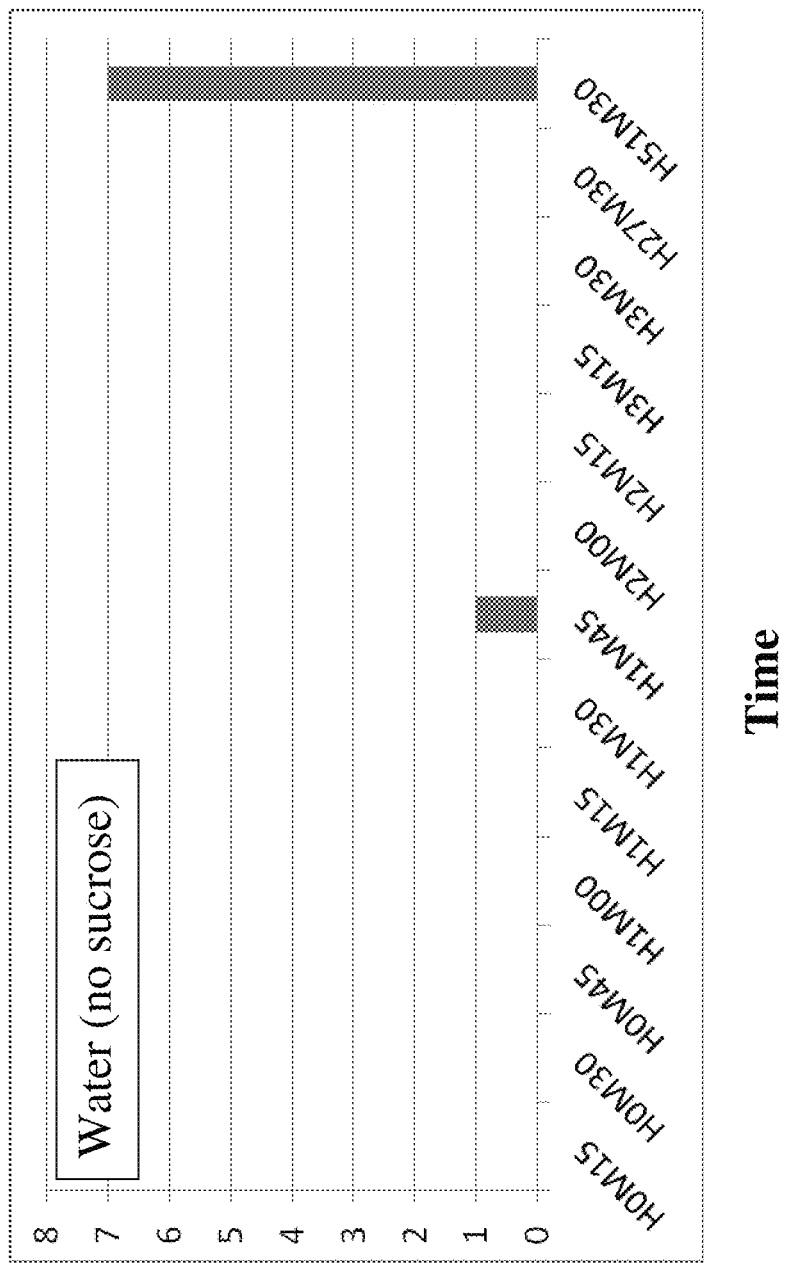
FIG. 24 sets forth the number of honeybees visiting feeding stations for water at various time points.

FIG. 5 evaluates the number of bees visiting a respective feed station over a time interval. FIG. 6 sets forth the mean number of honeybees visiting feeding station over a period of four hours. 2-decanone was highly repellent for the full 4 hour assessment period and was still repellent after 24 hours. Rosemary oil exhibited initial repellency, but this repellency was not fully maintained for the full 4 hour assessment period Example 3

Example 3 sets forth the stability of Poncho with an insect repellent, Eugenol.

Table 6 describes a stability test with a combination of Eugenol and Poncho evaluated at room temperature, 40° C., and 54° C. at zero time, 3 days, and 7 days as confirmed by high performance liquid chromatography (HPLC). As described in Table 6, the content of clothianidin, which is the active agent in Poncho, exhibited chemical stability when combined with an insect and bee repellent Eugenol for up to 54° C. for seven days.

TABLE 6

Clothianidin content

| | zero time | after 3 days | after 7 days |
|---|---|---|---|
| Room Temperature | | | |
| Poncho 600 only | 46.30% | 43.88% | 45.19% |
| Poncho 600 + Eugenol at .0053 mg/ml | 46.25% | 44.48% | 46.02% |
| Poncho 600 + Eugenol at .0372 mg/ml | 43.36% | 35.90% | 41.72% |
| 40° C. | | | |
| Poncho 600 only | 46.30% | 44.60% | 44.93% |
| Poncho 600 + Eugenol at .0065 mg/ml | 46.25% | 44.10% | 44.48% |
| Poncho 600 + Eugenol at .0086 mg/ml | 43.36% | 40.01% | 40.23% |
| 54° C. | | | |
| Poncho 600 only | 46.30% | 45.16% | 45.19% |
| Poncho 600 + Eugenol at .0029 mg/ml | 46.25% | 43.80% | 43.41% |
| Poncho 600 + Eugenol at .0203 mg/ml | 43.36% | 42.53% | 40.65% |

Example 4

Example 4 sets forth the stability of Poncho with an insect repellent, α-terpineol.

Table 7 describes a stability test with a combination of α-terpineol and Poncho 600 evaluated at room temperature, 40° C., and 54° C. at zero time, 2 days, and 8 days as confirmed by HPLC. As described in Table 7, the content of clothianidin, which is the active agent in Poncho, exhibited chemical stability when combined with an insect and bee repellent alpha-terpineol for up to 54° C. for eight days.

TABLE 7

Clothianidin content

| | zero time | after 2 days | after 8 days |
|---|---|---|---|
| Room Temperature | | | |
| Poncho 600 only | 45.31% | 46.51% | 55.33% |
| Poncho 600 + α-terpineol at .4173 mg/ml | 45.45% | 44.62% | 53.62% |
| Poncho 600 + α-terpineol at .3600 mg/ml | 45.29% | 45.32% | 45.07% |
| 40° C. | | | |
| Poncho 600 + α-terpineol at .3659 mg/ml | 45.45% | 44.97% | 45.27% |
| Poncho 600 + α-terpineol at ..3981 mg/ml | 45.29% | 44.83% | 45.37% |
| 54° C. | | | |
| Poncho 600 + α-terpineol at .4004 mg/ml | 45.45% | 46.65% | 48.18% |
| Poncho 600 + α-terpineol at .3276 mg/ml | 45.29% | 46.81% | 50.65% |

Example 5

Example 5 sets forth the stability of Gaucho with an insect repellent, α-terpineol.

Table 8 describes a stability test with a combination of α-terpineol and Gaucho evaluated at room temperature, 40° C., and 54° C. at zero time, 2 days, and 8 days as confirmed by high performance liquid chromatography (HPLC). As described in Table 8, the content of imidacloprid, which is the active agent in Gaucho, exhibited chemical stability when combined with an insect and bee repellent α-terpineol for up to 54° C. for eight days.

TABLE 8

Imidacloprid content

| | zero time | after 2 days | after 8 days |
|---|---|---|---|
| Room Temperature | | | |
| Gaucho 600 only | 47.43% | 47.96% | 51.21% |
| Gaucho 600 + α-terpineol at .3745 mg/ml | 48.59% | 47.72% | 48.21% |
| Gaucho 600 + α-terpineol at .4594 mg/ml | 48.19% | 48.85% | 47.89% |
| 40° C. | | | |
| Gaucho 600 + α-terpineol at .4140 mg/ml | 48.59% | 47.66% | 48.61% |
| Gaucho 600 + α-terpineol at .5787 mg/ml | 48.19% | 48.98% | 49.32% |
| 54° C. | | | |
| Gaucho 600 + α-terpineol at .4154 mg/ml | 48.59% | 48.82% | 50.51% |
| Gaucho 600 + α-terpineol at .4392 mg/ml | 48.19% | 49.32% | 53.16% |

Example 6

Example 6 sets forth a procedure for evaluating bee repellency utilizing a 50% sucrose solution for initial trials.

In this example, feeder station platforms were established approximately 10 meters in front of honey bee hives. The bees were subsequently trained to feeders for about 24 hours prior to conducting repellency testing. After 24 hours of training, untreated feeders were randomly replaced with assigned treated feeders. Pictures were taken at the respective time points and the number of bees were subsequently counted from the pictures. The number of bees counted at the respective time points are represented in FIGS. 8-24.

Table 9 describes active agents and their associated abbreviations evaluated for honeybee repulsion as detailed in FIGS. 8-24.

TABLE 9

| No. | Treatment Type | Treatment Abbreviation |
|---|---|---|
| 1 | sucrose (50%) + water | SUC50 |
| 2 | 2-decanone (0.5%) + sucrose (50%) | 2D.5 |
| 3 | 2-deconone (0.1%) + sucrose (50%) | 2D.1 |
| 4 | 2-decanone (1%) + sucrose (50%) | 2D1 |
| 5 | 2-decanone (2%) + sucrose (50%) | 2D2 |
| 6 | 2-decanone (2%) camphor oil (2%) + sucrose (50%) | 2D2 + CAMO |
| 7 | 2-decanone (2%) + rosemary oil (2%) + sucrose (50%) | 2D2 + ROSO2 |
| 8 | rosemary powder (2%) + sucrose (50%) | ROSP2 |
| 9 | tea tree oil (2%) + sucrose (50%) | TT |
| 10 | pine oil (0.5%) + sucrose (50%) | PO |
| 11 | 2-undecanone (2%) (11carbon) + sucrose (50%) | 2UD |
| 12 | 2-nonanone (2%) (9 carbon) + sucrose (50%) | 2NON |
| 13 | rosemary powder (1%) + 2-decanone (1%) + sucrose (50%) | ROSP1 + 2D1 |
| 14 | 2-decanone (0.5%) tea tree oil (0.5%) + pine oil (0.5%) + sucrose | 2D.5 + TT + PO |
| 15 | rosemary powder (1%) + sucrose (50%) | ROSP1 |
| 16 | camphor powder (2%) + sucrose (50%) | CAMP |
| 17 | water | water |

An example sample preparation is represented by the following methodology: 500 grams of the prepared 50% sucrose solution is weighed in a suitable 500 ml bottle, 2% by weight (10 grams) of the desired repellent material is added as characterized in FIGS. 8-24. The 500 ml bottle is closed and shaken. At the time of repellent trials, the sample is shaken vigorously shaken and rapidly sampled.

For the 50% sucrose solution, 1000 grams sugar and 1000 grams deionized water was mixed together in a 2 liter glass jug.

Example 7

Example 7 describes the effectiveness of various active agents in repelling honeybees when combined with an insecticidal active agent, such as imidacloprid.

Figure 25:
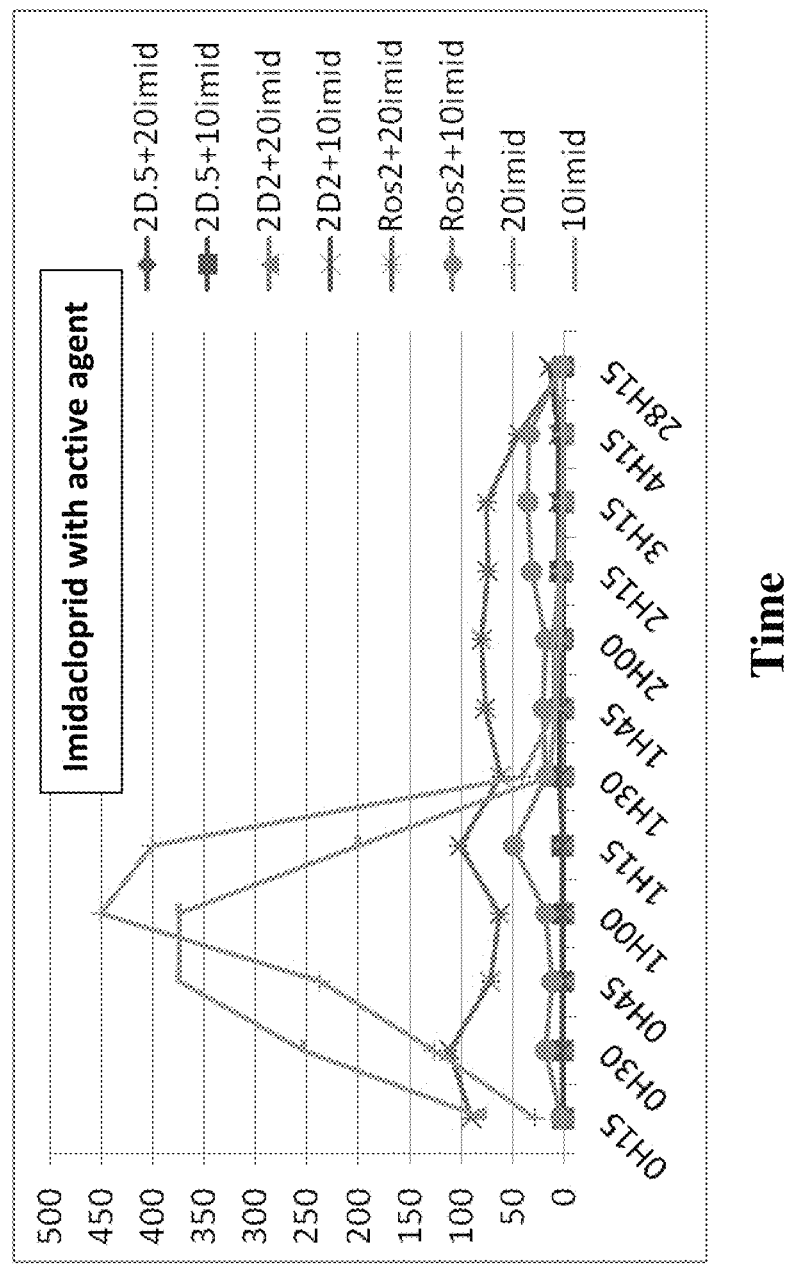
FIG. 25 sets forth the number of honeybees visiting feeding stations with combinations of imidacloprid together with active agents over a specified time range.

In this example, feeder station platforms were established in front of honey bee hives. The bees were subsequently trained to feeders for about 24 hours prior to conducting repellency testing. After 24 hours of training, untreated feeders were randomly replaced with assigned treated feeders. Pictures were taken at the respective time points and the number of bees were subsequently counted from the pictures. The number of bees counted at the respective time points are represented in FIGS. 25 and 26.

Table 10 describes active agents evaluated for bee repulsion in combination with an insecticidal active agent, such as imidacloprid.

TABLE 10

| Treatment Number | Description | Abbreviation |
|---|---|---|
| 1 | 2-decanone (0.5% wt.) + 20 ppb imidacloprid + sugar (50%) in water | 2D.5 + 20imid |
| 2 | 2-decanone (0.5% wt.) + 10 ppb imidacloprid + sugar (50%) in water | 2D.5 + 10imid |
| 3 | 2-decanone (2% wt.) + 20 ppb imidacloprid + sugar (50%) in water | 2D2 + 20imid |
| 4 | 2-decanone (2% wt.) + 10 ppb imidacloprid + sugar (50%) in water | 2D2 + 10imid |
| 5 | Rosemary powder (2% wt.) + 20 ppb imidacloprid + sugar (50%) in water | Ros2 + 20imid |
| 6 | Rosemary powder (2% wt.) + 10 ppb imidacloprid + sugar (50%) in water | Ros2 + 10imid |
| 7 | 20 ppb imidacloprid + sugar (50%) in water--- as control | 20imid |
| 8 | 10 ppb imidacloprid + sugar (50%) in water--- as control | 10imid |

Table 11 describes the repellency of 20 ppb imidacloprid+sugar (50 wt. %) as compared to 2-decanone (0.5% wt.)+20 ppb imidacloprid+sugar (50 wt).

TABLE 11

| Time | 20 ppb imidacloprid + sugar (50 wt. %) in water bee count | 2-decanone (0.5% wt.) + 20 ppb imidacloprid + sugar (50% wt) in water bee count |
|---|---|---|
| 2 minutes | 28 | 0 |
| 15 minutes | 127 | 0 |
| 30 minutes | 237 | 0 |
| 45 minutes | 450 | 0 |
| 1 hour | 400 | 0 |
| 1 hour 15 minutes | 40 | 0 |
| 1 hour 30 minutes | 9 | 0 |
| 1 hour 45 minutes | 10 | 0 |
| 2 hours | 4 | 1 |
| 3 hours | 2 | 0 |
| 4 hours | 1 | 0 |
| 24 hours | 0 | 0 |

Example 8

Example 8 sets forth active agent repellents described herein together with fluency/planter lubricants described herein.

Figure 31:
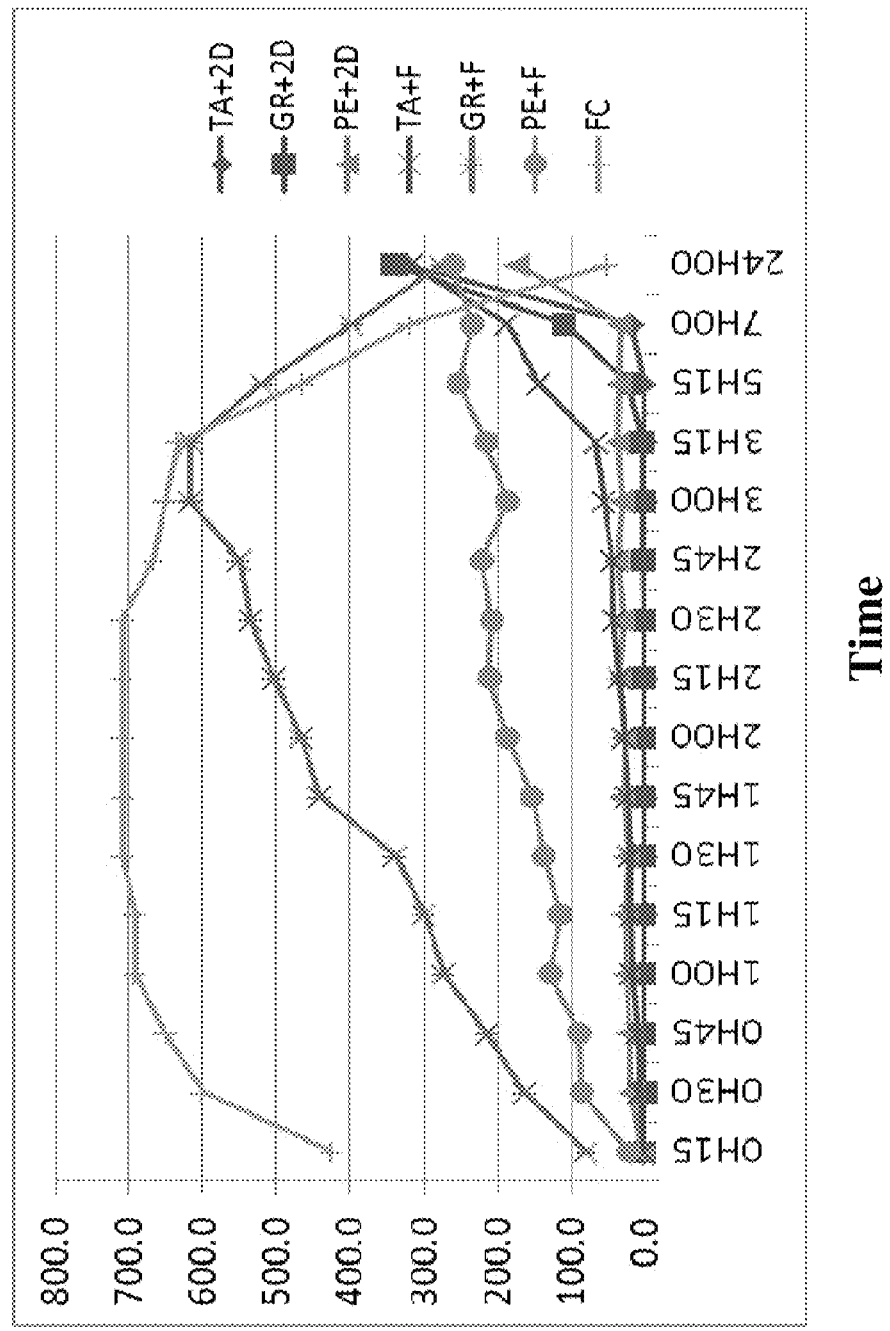
FIG. 31 sets forth the number of honeybees visiting feeding stations with combinations of a dust reducing agent together with active agents over a specified time range.
Figure 32:
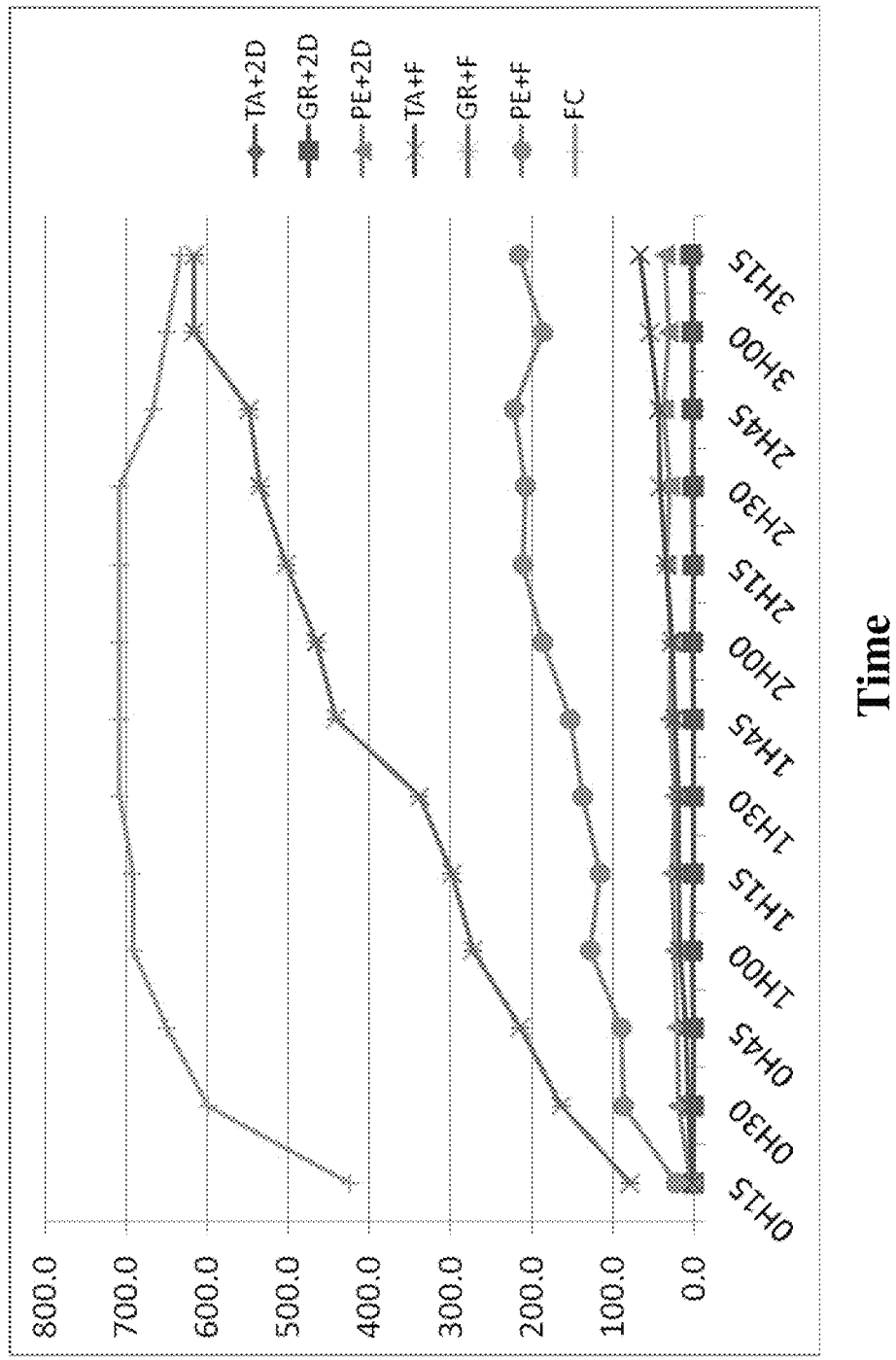
FIG. 32 sets forth the number of honeybees visiting feeding stations with combinations of a dust reducing agent together with active agents over a specified time range.

In this example, feeder station platforms were established in front of honey bee hives. Bees were trained to a fondant base, a moldable consistency which includes a mixture of icing sugar, honey, and water, and serves as an attractant for insects and bees. The bees were subsequently trained to feeders for about 24 hours prior to conducting repellency testing. After 24 hours of training, untreated feeders were randomly replaced with assigned treated feeders. Pictures were taken at the respective time points and the number of bees were subsequently counted from the pictures. The number of bees counted at the respective time points are represented in FIGS. 31-32.

In this example, the active agent, 2-decanone was added together graphite, talc, and polyethylene wax per Table 12.

Table 12 describes active agents evaluated for bee repulsion in combination with respective dust mitigating or fluency agents.

TABLE 12

| Treatment Number | Description | Abbreviation |
|---|---|---|
| 1 | Talc + 2-decanone (0.5% by wt. equivalent) introduced dropwise over the surface of Talc powder + fondant (50% wt. equivalent) | TA + 2D |
| 2 | Graphite + 2-decanone (0.5% by wt. equivalent) Introduced dropwise over the surface of graphite powder + fondant (50% wt. equivalent) | GR + 2D |
| 3 | PE Wax + 2-decanone (0.5% by wt. equivalent) introduced drop wise over the surface of PE wax powder + fondant (50% wt. equivalent) | PE + 2D |
| 4 | Talc + fondant (50% wt. equivalent) | TA + F |
| 5 | Graphite + fondant (50% wt. equivalent) | GR + F |
| 6 | Polyethylene (PE) Wax + fondant (50% wt. equivalent) | PE + F |
| 7 | Fondant control | FC |

Table 13 describes the mean number of bees (for "X" hours/"X" minutes) for an average of three separate trials for active agents in combination with respective dust mitigating or fluency agents.

TABLE 13

| Interval | 1 TA + 2D | 2 GR + 2D | 3 PE + 2D | 4 TA + F | 5 GR + F | 6 PE + F | 7 FC |
|---|---|---|---|---|---|---|---|
| 0 H 15 | 1.3 | 1.3 | 4.3 | 2.0 | 79.3 | 22.7 | 425.0 |
| 0 H 30 | 1.0 | 0.7 | 18.7 | 6.0 | 164.0 | 86.0 | 600.0 |
| 0 H 45 | 1.3 | 1.0 | 20.7 | 9.7 | 214.0 | 89.7 | 650.0 |
| 1 H 00 | 1.7 | 1.7 | 24.3 | 17.3 | 273.0 | 127.7 | 691.7 |

TABLE 13-continued

| Interval | 1<br>TA + 2D | 2<br>GR + 2D | 3<br>PE + 2D | 4<br>TA + F | 5<br>GR + F | 6<br>PE + F | 7<br>FC |
|---|---|---|---|---|---|---|---|
| 1 H 15 | 0.7 | 1.3 | 26.0 | 18.3 | 298.3 | 115.0 | 691.7 |
| 1 H 30 | 0.7 | 1.3 | 23.3 | 19.0 | 338.7 | 137.0 | 708.3 |
| 1 H 45 | 0.7 | 1.0 | 29.3 | 23.3 | 440.7 | 153.3 | 708.3 |
| 2 H 00 | 1.3 | 1.7 | 27.7 | 27.3 | 466.3 | 187.0 | 708.3 |
| 2 H 15 | 0.7 | 1.3 | 34.0 | 34.7 | 503.0 | 211.7 | 708.3 |
| 2 H 30 | 1.7 | 1.3 | 29.3 | 42.3 | 534.3 | 207.7 | 708.3 |
| 2 H 45 | 1.3 | 2.0 | 37.0 | 44.3 | 549.3 | 221.7 | 666.7 |
| 3 H 00 | 0.7 | 2.0 | 30.7 | 55.0 | 616.7 | 187.0 | 650.0 |
| 3 H 15 | 0.3 | 3.3 | 36.3 | 66.3 | 616.7 | 215.7 | 633.3 |
| 5 H 15 | 1.3 | 22.3 | 34.0 | 144.0 | 519.0 | 252.7 | 464.0 |
| 7 H 00 | 18.7 | 108.7 | 33.0 | 186.7 | 396.0 | 235.0 | 318.7 |
| 24 H 00 | 323.3 | 341.3 | 172.7 | 317.7 | 275.3 | 261.7 | 51.7 |

Table 14 describes the mean number of bees for an average of three separate trials for active agents in combination with respective dust mitigating or fluency agents.

TABLE 14

| Interval | 1<br>TA + 2D | 2<br>GR + 2D | 3<br>PE + 2D | 4<br>TA + F | 5<br>GR + F | 6<br>PE + F | 7<br>FC |
|---|---|---|---|---|---|---|---|
| 0 H 15 | 1.3 | 1.3 | 4.3 | 2.0 | 79.3 | 22.7 | 425.0 |
| 0 H 30 | 1.0 | 0.7 | 18.7 | 6.0 | 164.0 | 86.0 | 600.0 |
| 0 H 45 | 1.3 | 1.0 | 20.7 | 9.7 | 214.0 | 89.7 | 650.0 |
| 1 H 00 | 1.7 | 1.7 | 24.3 | 17.3 | 273.0 | 127.7 | 691.7 |
| 1 H 15 | 0.7 | 1.3 | 26.0 | 18.3 | 298.3 | 115.0 | 691.7 |
| 1 H 30 | 0.7 | 1.3 | 23.3 | 19.0 | 338.7 | 137.0 | 708.3 |
| 1 H 45 | 0.7 | 1.0 | 29.3 | 23.3 | 440.7 | 153.3 | 708.3 |
| 2 H 00 | 1.3 | 1.7 | 27.7 | 27.3 | 466.3 | 187.0 | 708.3 |
| 2 H 15 | 0.7 | 1.3 | 34.0 | 34.7 | 503.0 | 211.7 | 708.3 |
| 2 H 30 | 1.7 | 1.3 | 29.3 | 42.3 | 534.3 | 207.7 | 708.3 |
| 2 H 45 | 1.3 | 2.0 | 37.0 | 44.3 | 549.3 | 221.7 | 666.7 |
| 3 H 00 | 0.7 | 2.0 | 30.7 | 55.0 | 616.7 | 187.0 | 650.0 |
| 3 H 15 | 0.3 | 3.3 | 36.3 | 66.3 | 616.7 | 215.7 | 633.3 |
| 5 H 15 | 1.3 | 22.3 | 34.0 | 144.0 | 519.0 | 252.7 | 464.0 |
| 7 H 00 | 18.7 | 108.7 | 33.0 | 186.7 | 396.0 | 235.0 | 318.7 |
| 24 H 00 | 323.3 | 341.3 | 172.7 | 317.7 | 275.3 | 261.7 | 51.7 |

Figure 27:
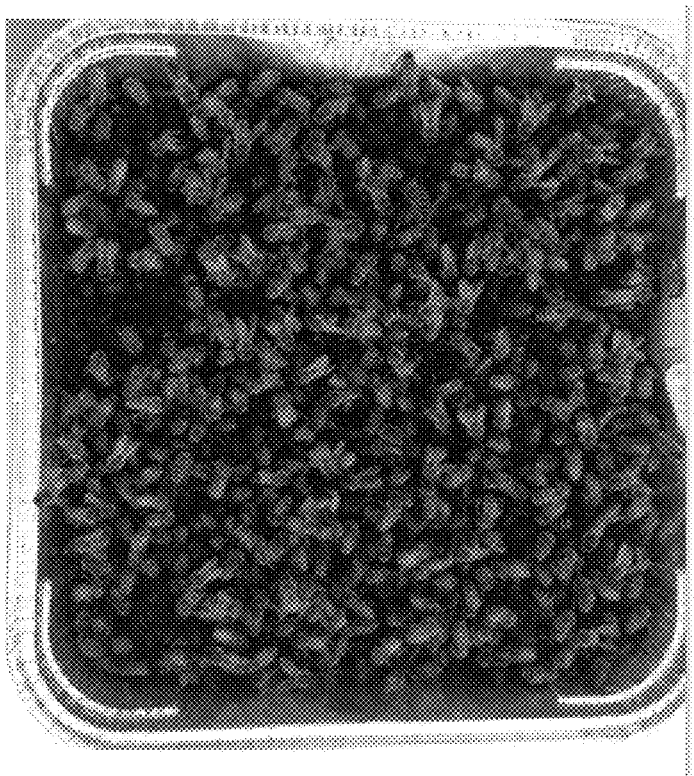
FIG. 27 sets forth a visual representation of honeybee counts for a fondant attractant control at 2.5 hours.

FIG. 27 sets forth a visual representation of the number of honeybees attracted to 500 g of the fondant control after 2.5 hours.

In FIG. 28, the repellency of 10 g of graphite and 500 g fondant (A) was visually compared to (B) 10 g of graphite, 500 g fondant, and a repellency agent, 2-decanone (0.5% wt) at 3.25 hours.

Figure 29:
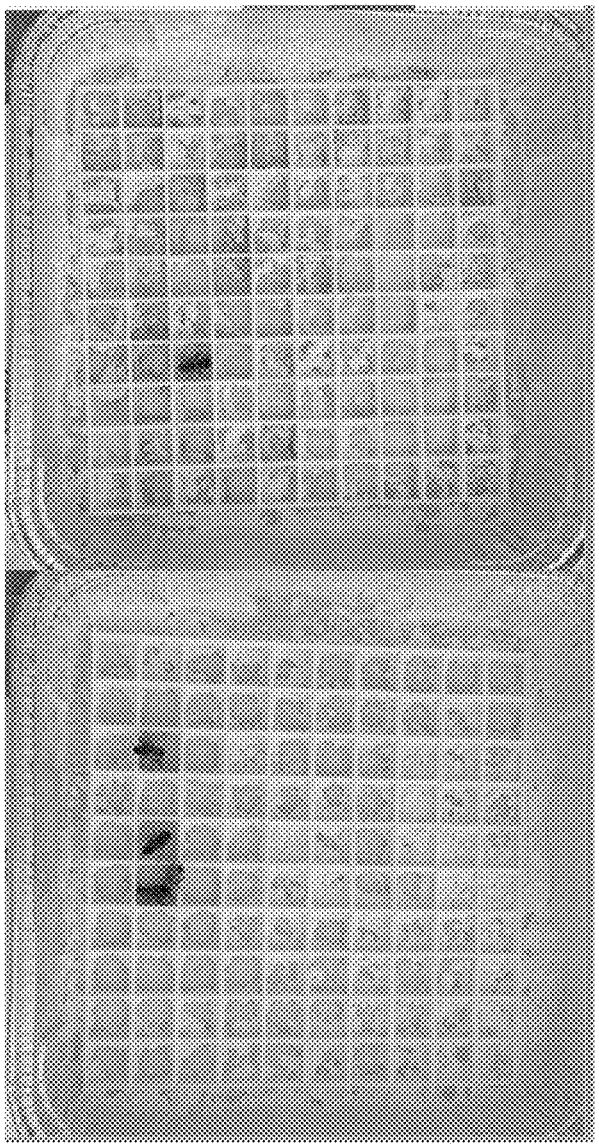
FIG. 29 sets forth a visual representation of honeybee counts for a (A) a talc (10 g) and fondant attractant (500 g) at 5.25 hours and (B) a talc (10 g), 2-decanone (0.5%), and fondant attractant (500 g) at 5.25 hours.

In FIG. 29, the repellency of 10 g of talc and 500 g fondant (A) was visually compared to (B) 10 g of talc, 500 g fondant, and a repellency agent, 2-decanone (0.5% wt) at 5.25 hours.

Figure 30:
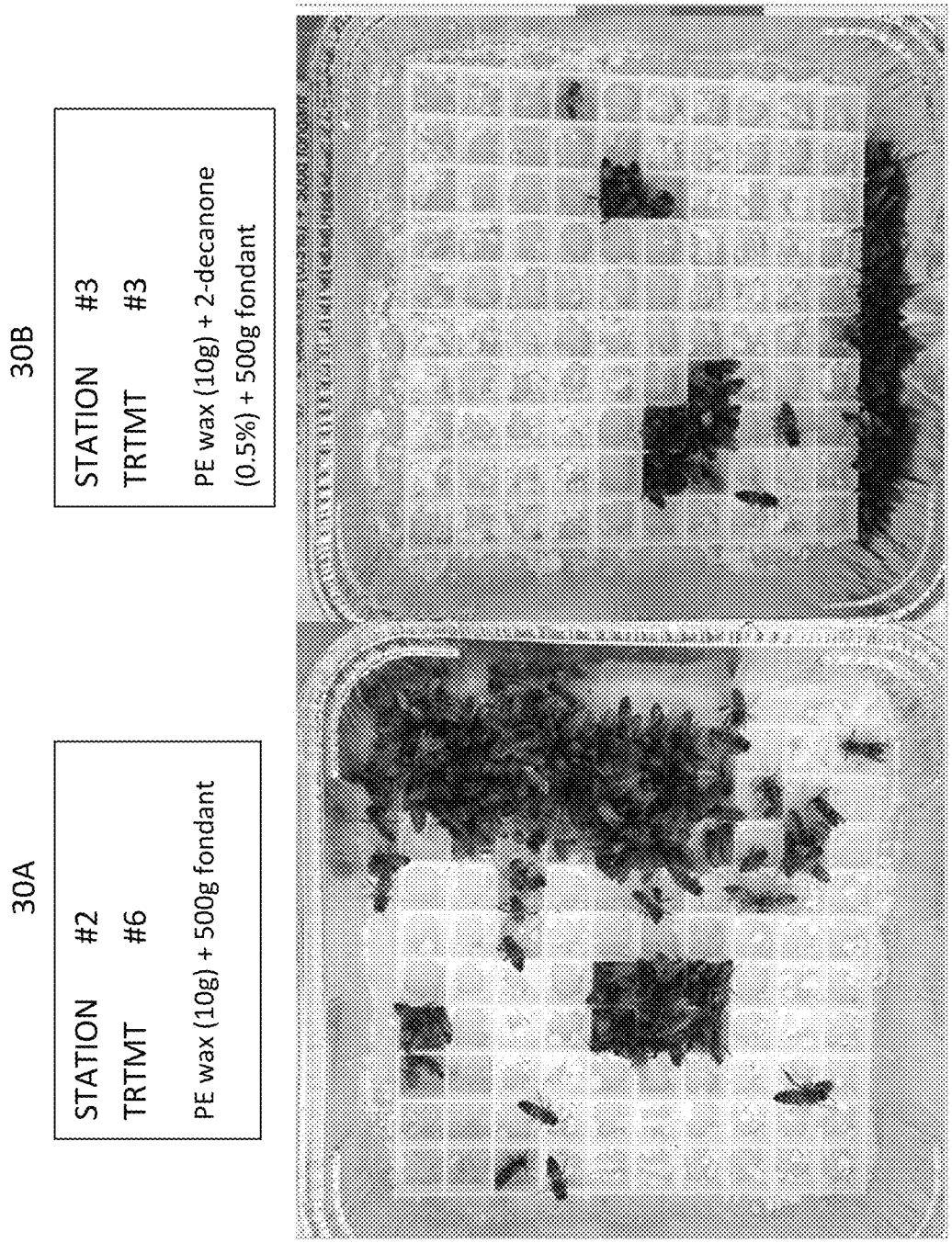
FIG. 30 sets forth a visual representation of honeybee counts for a (30A) a polyethylene wax (10 g) and fondant attractant (500 g) at 7 hours and (30B) a polyethylene wax (10 g), 2-decanone (0.5%), and fondant attractant (500 g) at 7 hours.

In FIG. 30, the repellency of 10 g of talc and 500 g fondant (A) was visually compared to (B) 10 g of talc, 500 g fondant, and a repellency agent, 2-decanone (0.5% wt) at 7 hours.

Example 9

Example 9 describes the effectiveness of various active agents in repelling honeybees using a fondant base.

Figure 33:
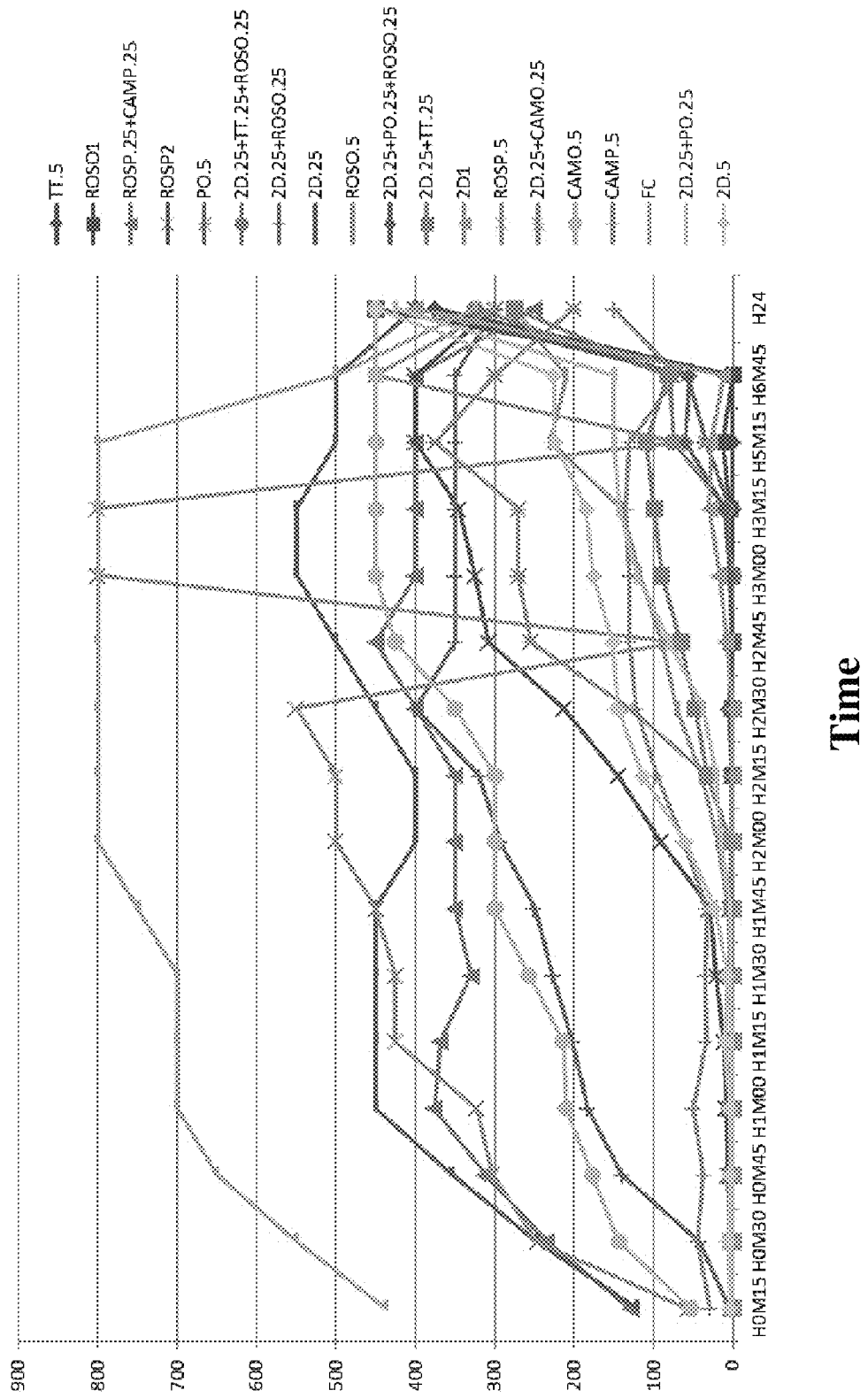
FIG. 33 describes the number of honeybees visiting feeding stations for various active agents over specified time points.
Figure 34:
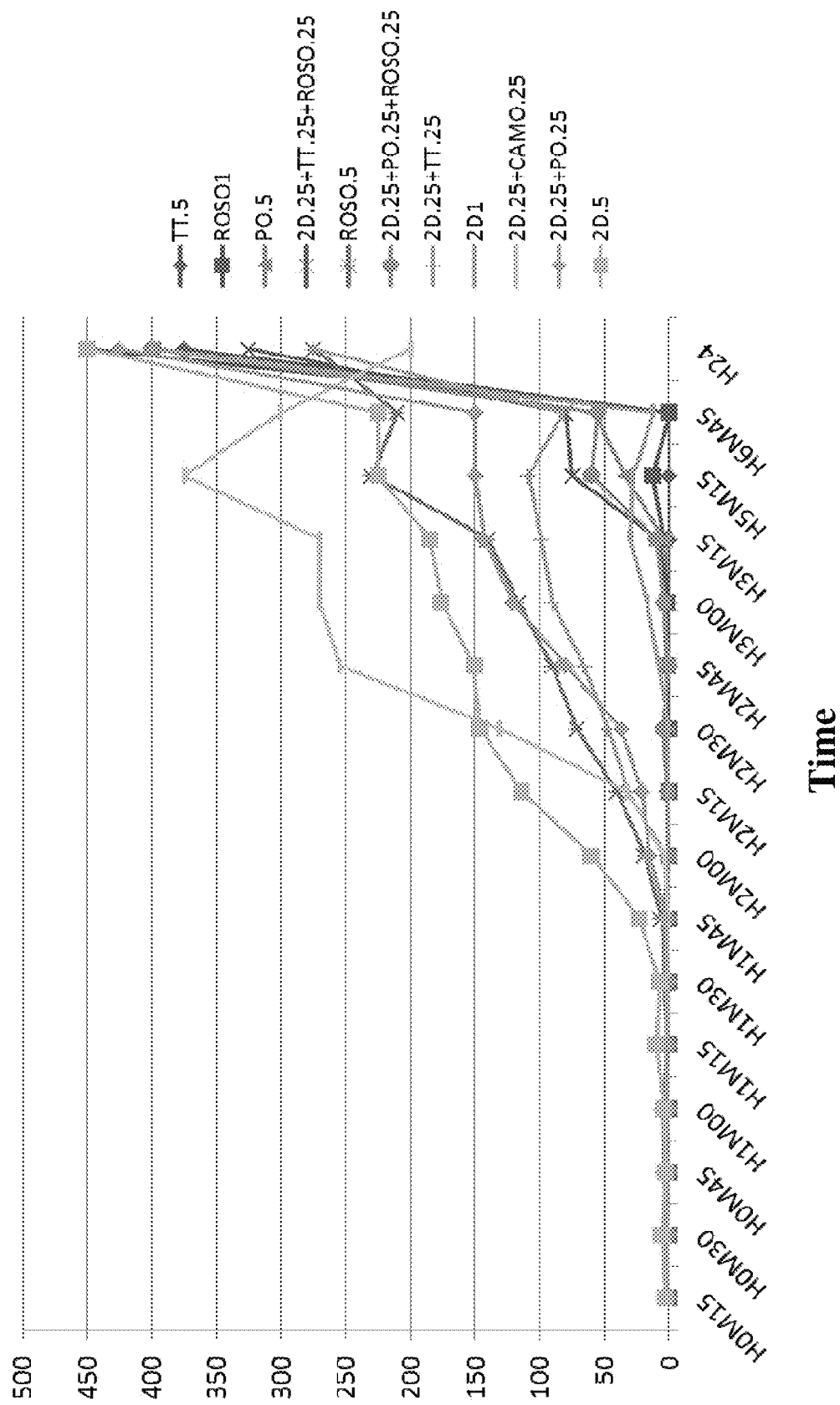
FIG. 34 describes the number of honeybees visiting feeding stations for various active agents over specified time points.
Figure 35:
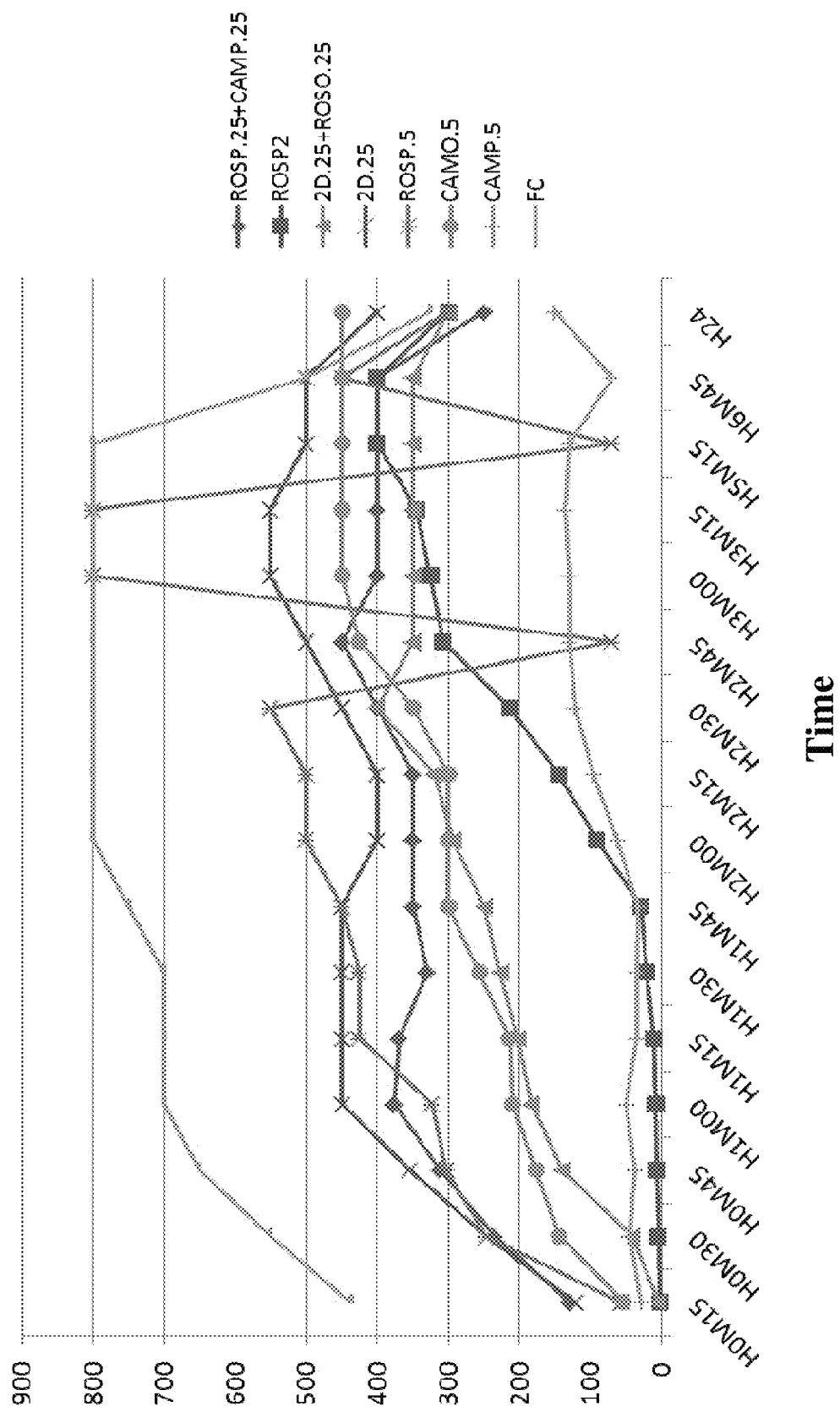
FIG. 35 describes the number of honeybees visiting feeding stations for various active agents over specified time points.

In this example, feeder station platforms were established in front of honey bee hives. Bees were trained to a fondant base which includes a sugar mixture and is an attractant for insects and bees. The bees were subsequently trained to feeders for about 24 hours prior to conducting repellency testing. After 24 hours of training, untreated feeders were randomly replaced with assigned treated feeders. Pictures were taken at the respective time points and the number of bees were subsequently counted from the pictures. The number of bees counted at the respective time points are represented in FIGS. 33-35.

Table 15 describes active agents evaluated for bee repulsion and associated abbreviations.

TABLE 15

| Number | Description | Abbreviation |
|---|---|---|
| 1 | Rosemary oil (0.5%) + fondant (500 g) | ROSO.5 |
| 2 | Rosemary oil (1%) + fondant (500 g) | ROSO1 |
| 3 | 2-decanone (1%) + fondant (500 g) | 2D1 |
| 4 | Camphor oil (0.5%) + fondant (500 g) | CAMP.5 |
| 5 | 2-decanone (0.5%) fondant (500 g) | 2D.5 |
| 6 | 2-decanone (0.25%) + fondant (500 g) | 2D.25 |
| 7 | 2-decanone (0.25%) + camphor oil (0.25%) + fondant (500 g) | 2D.25 + CAMP.25 |
| 8 | 2-decanone (0.25%) + rosemary oil (0.25%) + fondant (500 g) | 2D.25 + ROSO.25 |
| 9 | Tea tree oil (0.5%) + fondant (500 g) | TT.5 |
| 10 | Pine oil (0.5% + fondant (500 g) | PO.5 |
| 11 | 2-decanone (0.25%) + tea tree oil (0.25%) + rosemary oil (0.25%) + fondant (500 g) | 2D.25 + TT.25 + ROS).25 |
| 12 | 2-decanone (0.25%) + pine oil (0.25%) + rosemary oil (0.25%) + fondant (500 g) | 2D.25 + PO.25 + ROSO.25 |
| 13 | 2-decanone (0.25%) + tea tree oil (0.25%) + fondant (500 g) | 2D.25 + TT.25 |
| 14 | 2-decanone (0.25% + pine oil (0.25%) + fondant (500 g) | 2D.25 + PO.25 |

TABLE 15-continued

| Number | Description | Abbreviation |
|---|---|---|
| 15 | Rosemary powder (0.5%) + fondant (500 g) | ROS.5 |
| 16 | Camphor powder (0.5%) + fondant (500 g) | CAMP.5 |
| 17 | Rosemary powder (0.25%) + camphor powder (0.25%) + fondant (500 g) | ROS.25 + CAMP.25 |
| 18 | Rosemary powder (2%) + fondant (500 g) | ROSP2 |
| 19 | Fondant alone (500 g) control | FC |

Example 10

Example 10 describes the effectiveness of various active agents in repelling wasps using a fondant base.

In this example, feeder station platforms were established in front of wasp hives. Wasps were trained to a fondant base. The bees were subsequently trained to feeders for about 24 hours prior to conducting repellency testing. After 24 hours of training, untreated feeders were randomly replaced with assigned treated feeders. Pictures were taken at the respective time points and the number of bees were subsequently counted from the pictures. The number of wasps counted at the respective time points are represented in FIGS. 36, 37(A) and (B), 38, and 39.

Example 11

Example 11 describes the effectiveness of various active agents in repelling honeybees using a fondant base.

Figure 40:
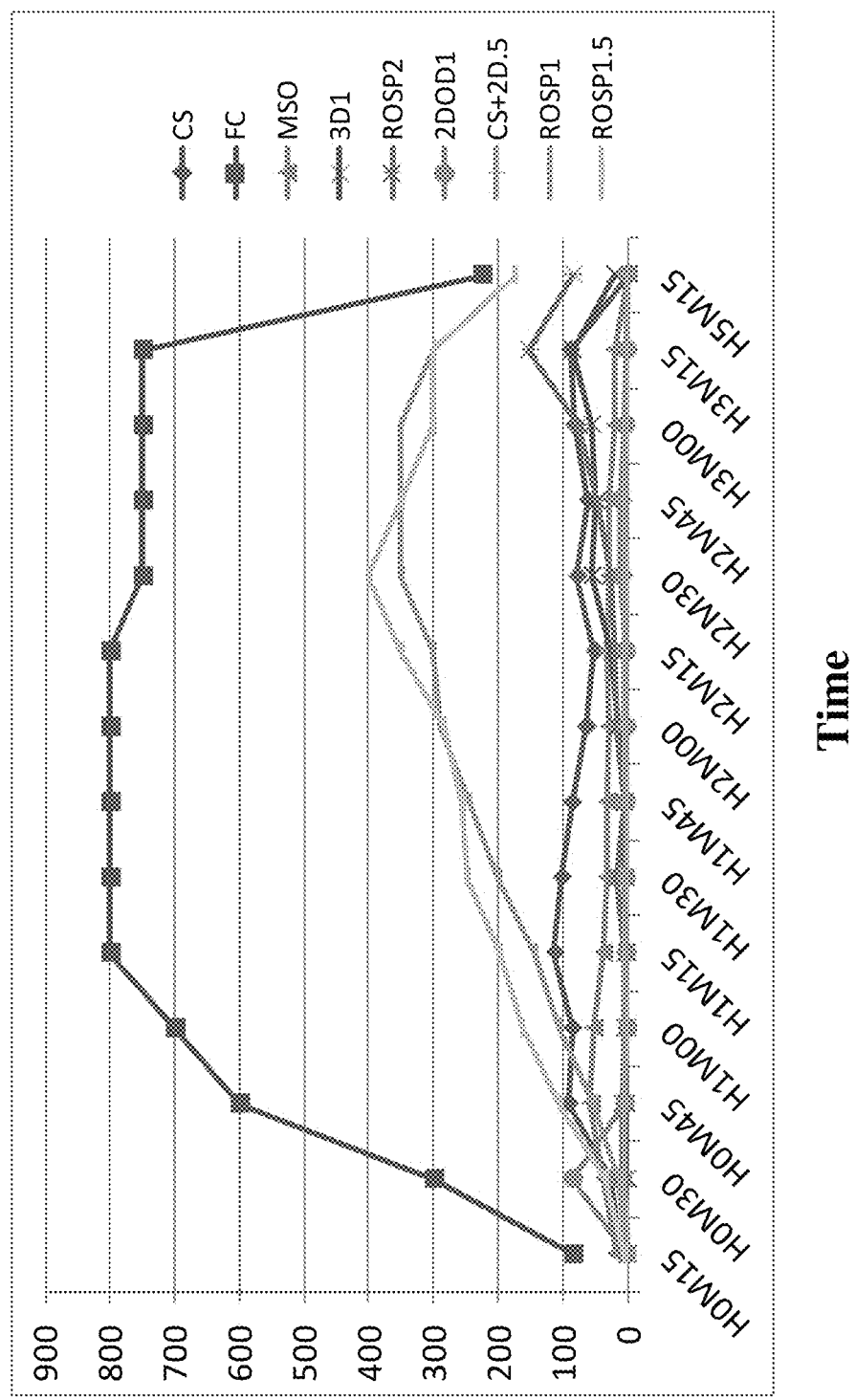
FIG. 40 describes the effectiveness of various active agents in repelling honeybees using a fondant base over specified time points.

In this example, feeder station platforms were established in front of honeybee hives. Honeybees were trained to a fondant base. The bees were subsequently trained to feeders for about 24 hours prior to conducting repellency testing. After 24 hours of training, untreated feeders were randomly replaced with assigned treated feeders. The repellency characteristics of active agents as described in Table 16 and FIG. 41 were evaluated. Pictures were taken at the respective time points and the number of bees were subsequently counted from the pictures. The number of honeybees were counted at the respective time points are represented in FIGS. 40-41.

Table 16 describes active agents evaluated for bee repulsion.

TABLE 16

| Position | Treatment | Description | Abbreviation |
|---|---|---|---|
| 1 | 3 | Corn seed (400 g) + fondant (500 g) | CS |
| 2 | 9 | Fondant (500 g) control | FC |
| 3 | 5 | 1-methylsulfinyl octane (0.5 wt %) + fondant (500 g) | MSO |
| 4 | 2 | 3-decanone (1% wt) + fondant (500 g) | 3D1 |
| 5 | 6 | Rosemary powder (2% wt) + fondant (500 g) | ROSP2 |
| 6 | 1 | 2-dodecanone (1% wt) + fondant (500 g) | 2DOD1 |
| 7 | 4 | Corn seeds (400 G) + fondant (500 g) + 2-decanone (0.5% wt) | CS + 2D.5 |
| 8 | 8 | Rosemary powder (1% wt) + fondant (500 g) | ROSP1 |
| 9 | 7 | Rosemary powder (1.5% wt) + fondant (500 g) | ROSP1.5 |

Example 12

Example 12 sets forth Poncho/VOTiVO Corn dust levels with polyethylene wax as a planter lubricant.

In Table 17, the total grams of dust per 100,000 kernels and grams of clothianidin in total dust per 100,000 kernels for seeds treated with Poncho/VOTiVO and fluency powder (polyethylene wax) as a planter lubricant were evaluated. As set forth in Table 16, a treatment combination of Poncho/VOTiVO and talc treatment was compared to a treatment combination of Poncho/VOTiVO and fluency powder (polyethylene wax) at 0.56 oz/cwt seed, 0.75 oz/cwt seed, 1.5 oz/cwt seed, and 3 oz/cwt seed. The dust and clothianidin exposure were measured with a Heubach Dustmeter. The data in Table 16 represents an average of two seed sources.

Figure 42:
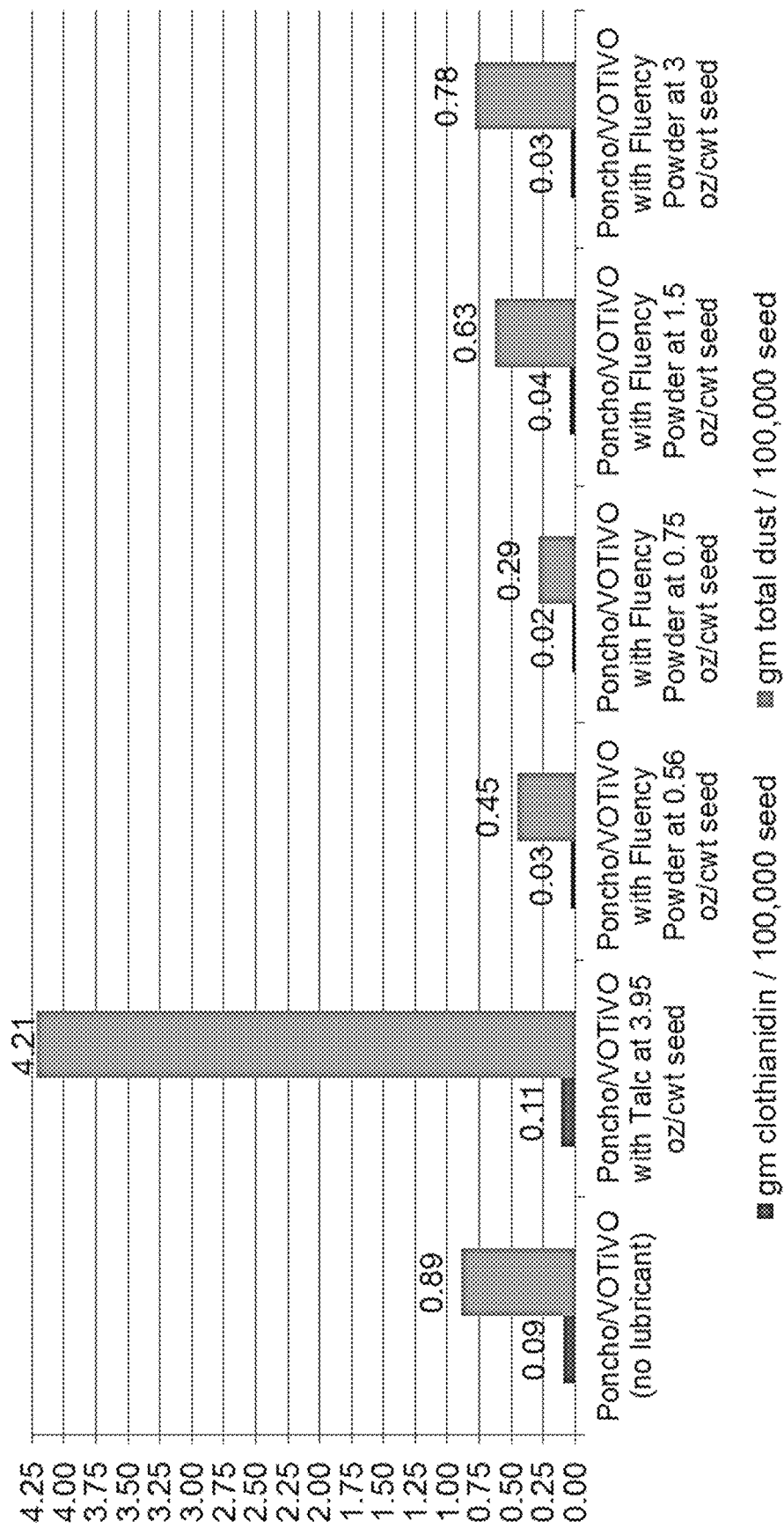
FIG. 42 sets forth the total grams of dust per 100,000 kernels and grams of clothianidin in total dust per 100,000 kernels for seeds treated with a Poncho/VOTiVO and talc treatment as compared to a treatment of Poncho/VOTiVO and polyethylene wax used as a lubricant at 0.56 oz/cwt seed, 0.75 oz/cwt seed, 1.5 oz/cwt seed, and 3 oz/cwt seed as measured by a John Deere Vacuum Meter.
Figure 43:
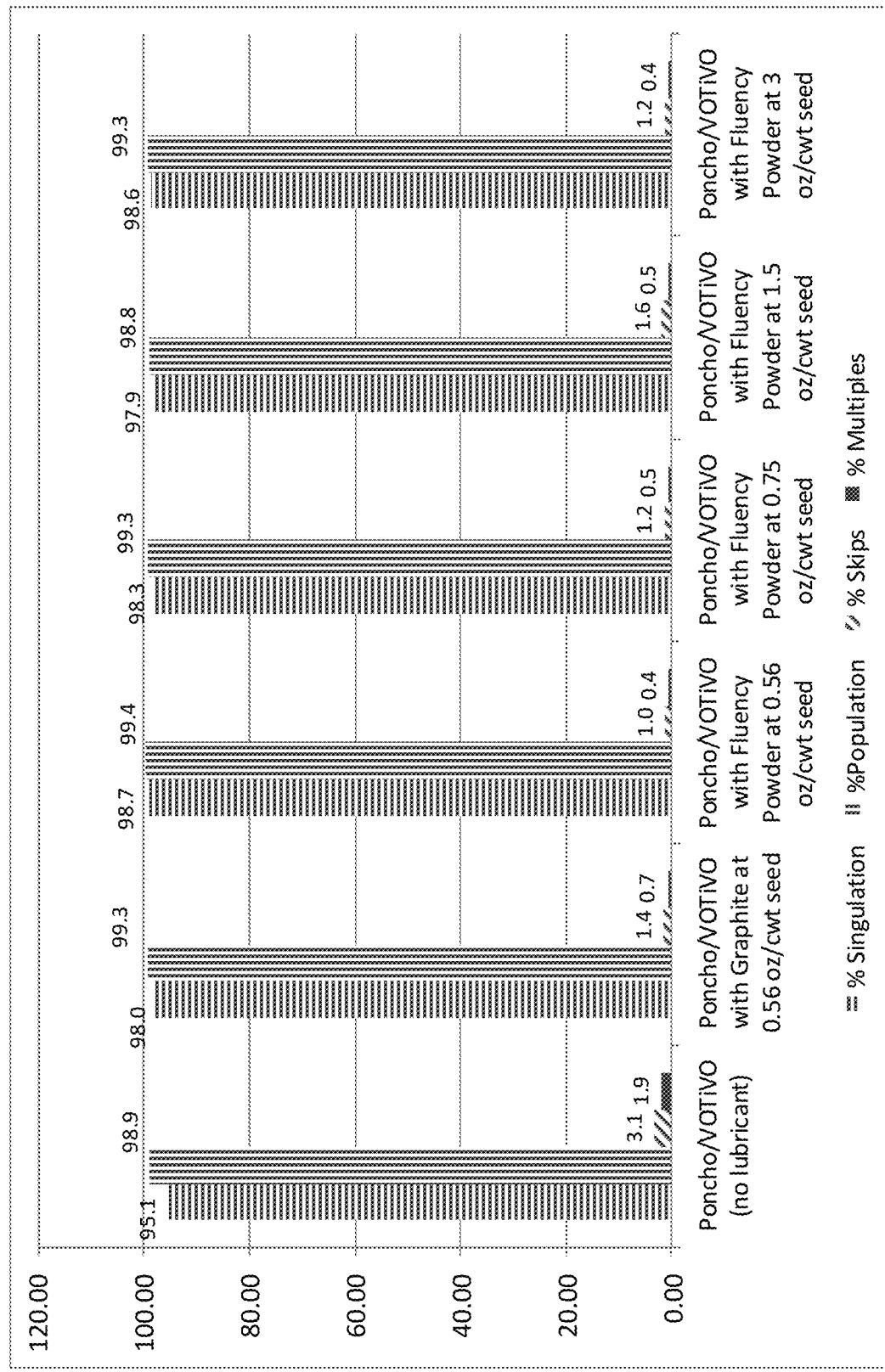
FIG. 43 sets forth corn dust levels for seeds treated with a Poncho/VOTiVO and talc treatment as compared to a treatment of Poncho/VOTiVO and oxidized polyethylene wax used as a lubricant at 0.56 oz/cwt seed, 0.75 oz/cwt seed, 1.5 oz/cwt seed, and 3 oz/cwt seed as measured by a John Deere Vacuum Meter.

In FIG. 42, the % Singulation, % Population, % Skips, and % Multiples were evaluated on a treatment combination of Poncho/VOTiVO and talc treatment as compared to a treatment combination of Poncho/VOTiVO and fluency powder (polyethylene wax) at 0.56 oz/cwt seed, 0.75 oz/cwt seed, 1.5 oz/cwt seed, and 3 oz/cwt seed. As set forth in FIG. 2, the % Singulation (the percentage of single distributed seeds spaced and planted in a manner that is consistent with the planter specification) and % Population (the number, in percent, of desired seeds that were planted in a manner that is consistent with the planter specification) of seeds coated with polyethylene wax as a lubricant were in line with those with as compared to talc. Additionally, as set forth in FIG. 42, the % Skips (the percentage of seeds that were not planted in a manner that is consistent with the planter specification) and the % Multiples (the percentage of multiple planted seeds) of seeds coated with an oxidized polyethylene wax as a lubricant were also in line with those with as compared to talc.

TABLE 17

| Treatment & Planter Lubricant | Total Grams dust per 100,000 kernels | Grams clothianidin in total dust per 100,000 kernels (HPLC analysis of filters) | % decrease of clothianidin in dust versus Talc |
|---|---|---|---|
| Poncho/VOTiVO (no lubricant) | 0.21 | 0.04 | −76% |
| Poncho/VOTiVO with Talc at 3.95 oz/cwt seed | 5.21 | 0.16 | Control |
| Poncho/VOTiVO with Fluency Powder at 0.56 oz/cwt seed | 0.20 | 0.03 | −84% |
| Poncho/VOTiVO with Fluency Powder at 0.75 oz/cwt seed | 0.10 | 0.02 | −88% |
| Poncho/VOTiVO with Fluency Powder at 1.5 oz/cwt seed | 0.17 | 0.02 | −89% |
| Poncho/VOTiVO with Fluency Powder at 3 oz/cwt seed | 0.41 | 0.02 | −86% |

In Table 18, the total grams of dust per 100,000 kernels and grams of clothianidin in total dust per 100,000 kernels for seeds treated with Poncho/VOTiVO and fluency powder (polyethylene wax) as a planter lubricant were evaluated. As set forth in Table 17, a treatment combination of Poncho/VOTiVO and talc treatment was compared to a treatment combination of Poncho/VOTiVO and fluency powder (oxidized polyethylene wax) at 0.56 oz/cwt seed, 0.75 oz/cwt seed, 1.5 oz/cwt seed, and 3 oz/cwt seed. The dust and clothianidin exposure were measured with a John Deere Vacuum Meter. The data in Table 18 represents an average of two seed sources. The data was measured by dust captured in the vacuum air stream coming out of the meter on the test stand.

In an aspect, a repelling, controlling, or directing compound or composition described herein is added to a planter lubricant, for example, in the methods and compositions described in Tables 17 and 18. Such a composition has the ability to reduce dust emission while repelling, controlling, or directing insects.

TABLE 18

| Treatment & Planter Lubricant | Total Grams dust per 100,000 kernels | Grams clothianidin in total dust per 100,000 kernels (HPLC analysis of filters) | % decrease of clothianidin in dust versus Talc |
|---|---|---|---|
| Poncho/VOTiVO (no lubricant) | 0.89 | 0.09 | −19% |
| Poncho/VOTiVO with Talc at 3.95 oz/cwt seed | 4.21 | 0.11 | Control |
| Poncho/VOTiVO with Fluency Powder at 0.56 oz/cwt seed | 0.45 | 0.03 | −69% |
| Poncho/VOTiVO with Fluency Powder at 0.75 oz/cwt seed | 0.29 | 0.02 | −78% |
| Poncho/VOTiVO with Fluency Powder at 1.5 oz/cwt seed | 0.63 | 0.04 | −64% |
| Poncho/VOTiVO with Fluency Powder at 3 oz/cwt seed | 0.78 | 0.03 | −73% |

Example 13

Example 13 sets forth the Poncho 1250+VOTiVO Corn dust levels with polyethylene wax as a planter lubricant.

In Table 19, the total grams of dust per 100,000 kernels and grams of clothianidin in total dust per 100,000 kernels for seeds treated with Poncho 1250+VOTiVO and fluency powder (polyethylene wax) as a planter lubricant were evaluated. As set forth in Table 19, a treatment combination of Poncho 1250+VOTiVO and talc treatment was compared to a treatment combination of Poncho 1250+VOTiVO and fluency powder (polyethylene wax) at 0.56 oz/cwt seed, 0.75 oz/cwt seed, 1.5 oz/cwt seed, and 3 oz/cwt seed. The dust and clothianidin exposure were measured with a Heubach Dustmeter. The data in Table 19 represents an average of two seed sources.

Figure 44:
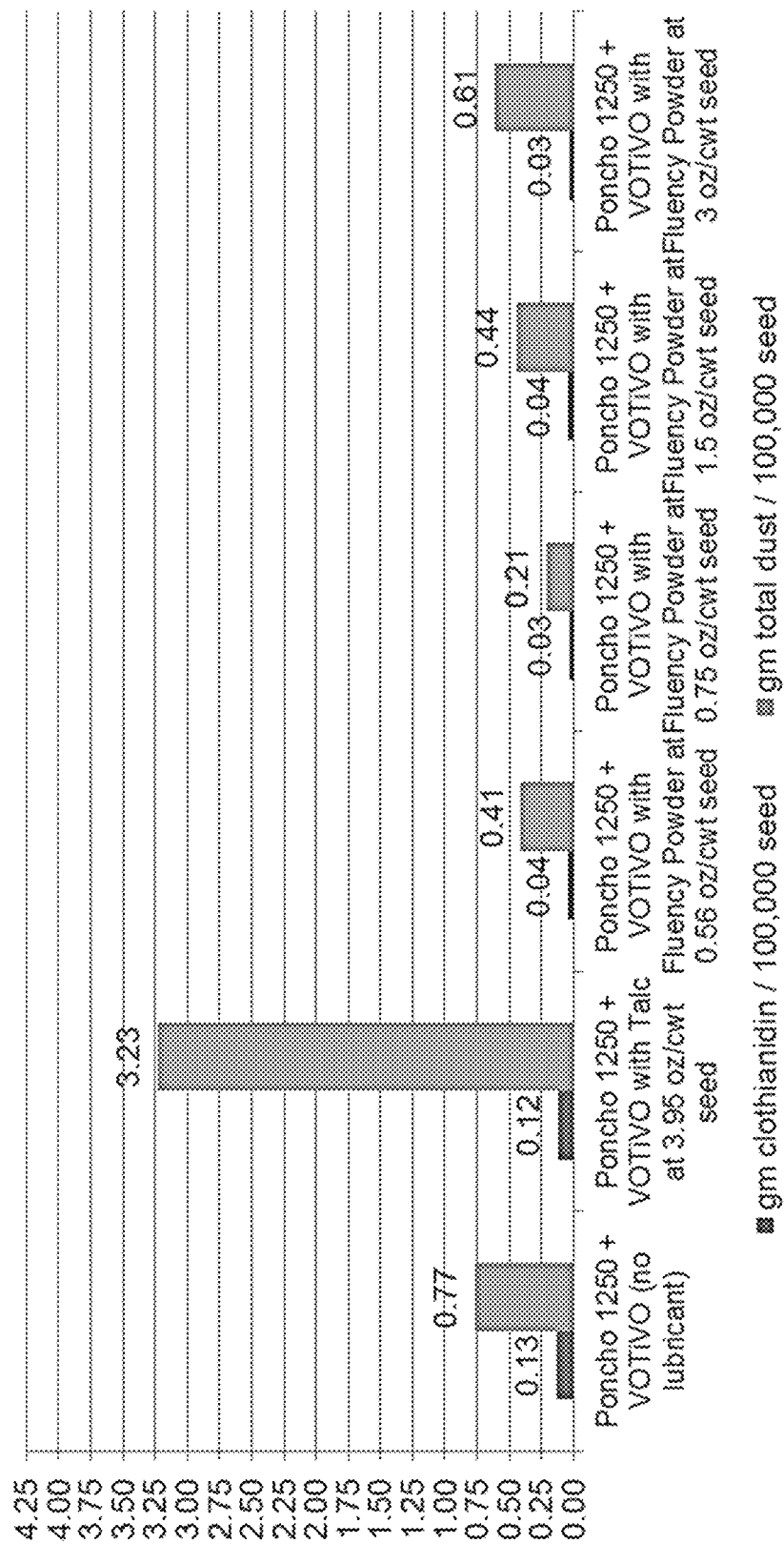
FIG. 44 sets forth the total grams of dust per 100,000 kernels and grams of clothianidin in total dust per 100,000 kernels for seeds treated with a Poncho 1250+VOTiVO and talc treatment as compared to a treatment of Poncho 1250+VOTiVO and oxidized polyethylene wax used as a lubricant at 0.56 oz/cwt seed, 0.75 oz/cwt seed, 1.5 oz/cwt seed, and 3 oz/cwt seed as measured by a John Deere Vacuum Meter.
Figure 45:
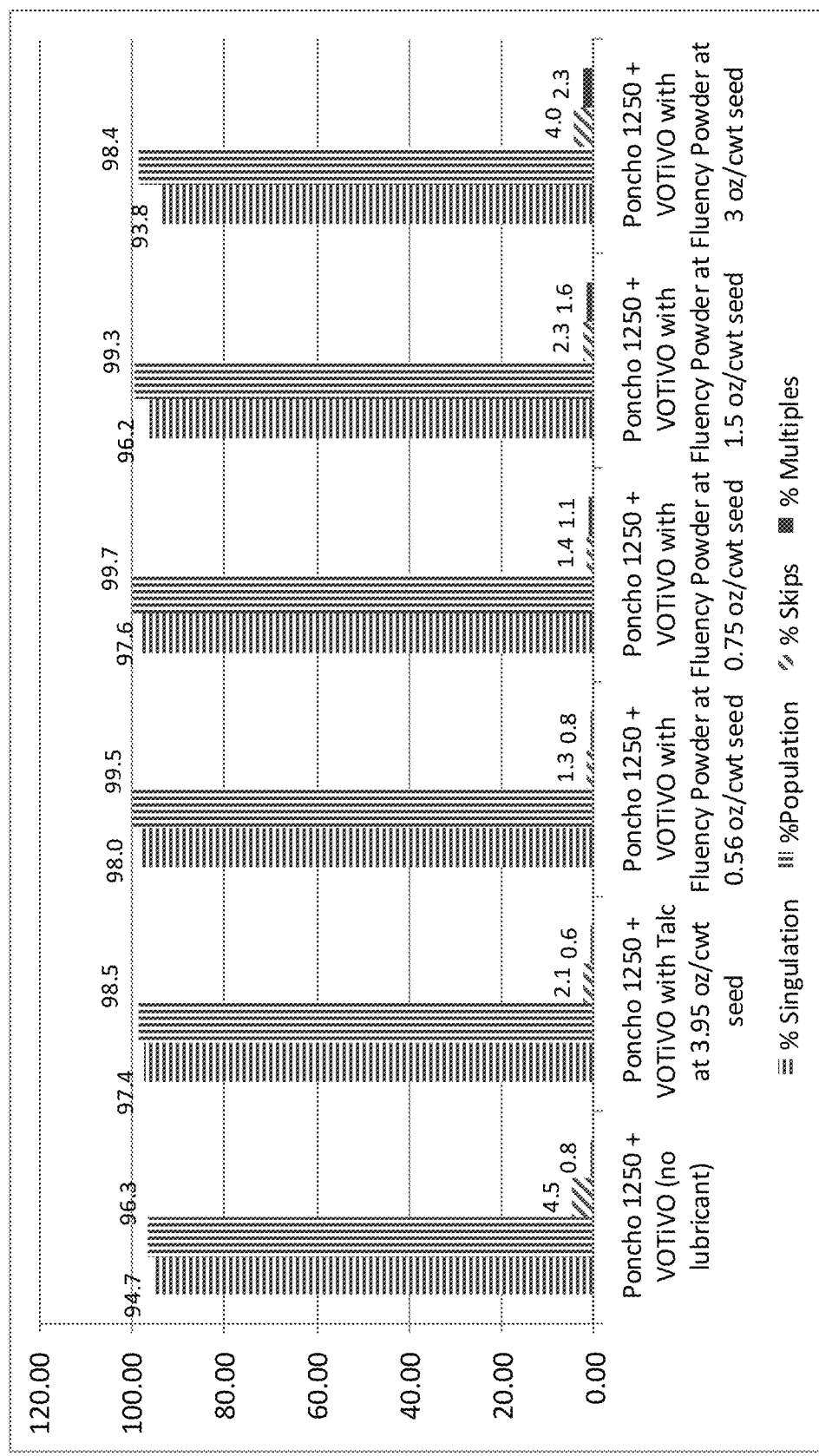
FIG. 45 sets forth measures corn dust levels for seeds treated with a Poncho 1250+VOTiVO and talc treatment as compared to a treatment of Poncho 1250+VOTiVO and polyethylene wax used as a lubricant at 0.56 oz/cwt seed, 0.75 oz/cwt seed, 1.5 oz/cwt seed, and 3 oz/cwt seed as measured by a John Deere Vacuum Meter.

In FIG. 44, the % Singulation, % Population, % Skips, and % Multiples were evaluated on a treatment combination of Poncho 1250+VOTiVO and talc treatment was compared to a treatment combination of Poncho 1250+VOTiVO and fluency powder (polyethylene wax) at 0.56 oz/cwt seed, 0.75 oz/cwt seed, 1.5 oz/cwt seed, and 3 oz/cwt seed. As set forth in FIG. 45, the % Singulation, % Population, % Skips, and % Multiples of seeds coated with polyethylene wax as a lubricant were in line with those with as compared to talc.

TABLE 19

| Treatment & Planter Lubricant | Total Grams dust per 100,000 kernels | Grams clothianidin in total dust per 100,000 kernels (HPLC analysis of filters) | % decrease of clothianidin in dust versus Talc |
|---|---|---|---|
| Poncho 1250 + VOTiVO (no lubricant) | 0.18 | 0.03 | −85% |
| Poncho 1250 + VOTiVO with Talc at 3.95 oz/cwt seed | 5.23 | 0.18 | Control |
| Poncho 1250 + VOTiVO with Fluency Powder at 0.56 oz/cwt seed | 0.06 | 0.01 | −95% |
| Poncho 1250 + VOTiVO with Fluency Powder at 0.75 oz/cwt seed | 0.07 | 0.01 | −96% |
| Poncho 1250 + VOTiVO with Fluency Powder at 1.5 oz/cwt seed | 0.10 | 0.01 | −94% |
| Poncho 1250 + VOTiVO with Fluency Powder at 3 oz/cwt seed | 0.09 | 0.01 | −93% |

In Table 20, the total grams of dust per 100,000 kernels and grams of clothianidin in total dust per 100,000 kernels for seeds treated with Poncho 1250+VOTiVO and fluency powder (oxidized polyethylene wax) as a planter lubricant were evaluated. As set forth in Table 20, a treatment combination of Poncho 1250+VOTiVO and talc treatment was compared to a treatment combination of Poncho 1250+VOTiVO and fluency powder (oxidized polyethylene wax) at 0.56 oz/cwt seed, 0.75 oz/cwt seed, 1.5 oz/cwt seed, and 3 oz/cwt seed. The dust and clothianidin exposure were measured with a John Deere Vacuum Meter. The data in Table 20 represents an average of two seed sources.

In an aspect, a repelling, controlling, or directing compound or composition described herein is added to a planter lubricant, for example, in the methods and compositions described in Tables 19 and 20. Such a composition has the ability to reduce dust emission while repelling, controlling, or directing insects.

TABLE 20

| Treatment & Planter Lubricant | Total Grams dust per 100,000 kernels | Grams clothianidin in total dust per 100,000 kernels (HPLC analysis of filters) | % decrease or increase of clothianidin in dust versus Talc |
|---|---|---|---|
| Poncho 1250 + VOTiVO (no lubricant) | 0.77 | 0.13 | +7% |
| Poncho 1250 + VOTiVO with Talc at 3.95 oz/cwt seed | 3.23 | 0.12 | Control |
| Poncho 1250 + VOTiVO with Fluency Powder at 0.56 oz/cwt seed | 0.41 | 0.04 | −63% |
| Poncho 1250 + VOTiVO with Fluency Powder at 0.75 oz/cwt seed | 0.21 | 0.03 | −78% |
| Poncho 1250 + VOTiVO with Fluency | 0.44 | 0.04 | −70% |

TABLE 20-continued

| Treatment & Planter Lubricant | Total Grams dust per 100,000 kernels | Grams clothianidin in total dust per 100,000 kernels (HPLC analysis of filters) | % decrease or increase of clothianidin in dust versus Talc |
|---|---|---|---|
| Powder at 1.5 oz/cwt seed | | | |
| Poncho 1250 + VOTiVO with Fluency Powder at 3 oz/cwt seed | 0.61 | 0.03 | −73% |

Example 14

Example 14 sets forth the Poncho/VOTiVO Corn dust levels with polyethylene wax as a planter lubricant.

In Table 21, the total grams of dust per 100,000 kernels and grams of clothianidin in total dust per 100,000 kernels for seeds treated with Poncho/VOTiVO and fluency powder (polyethylene wax) as a planter lubricant were evaluated. As set forth in Table 21, a treatment combination of Poncho/VOTiVO and graphite treatment was compared to a treatment combination of Poncho/VOTiVO and fluency powder (oxidized polyethylene wax) at 0.56 oz/cwt seed, 0.75 oz/cwt seed, 1.5 oz/cwt seed, and 3 oz/cwt seed. The dust and clothianidin exposure were measured with a Heubach Dustmeter. The data in Table 21 represents an average of two seed sources.

Figure 46:
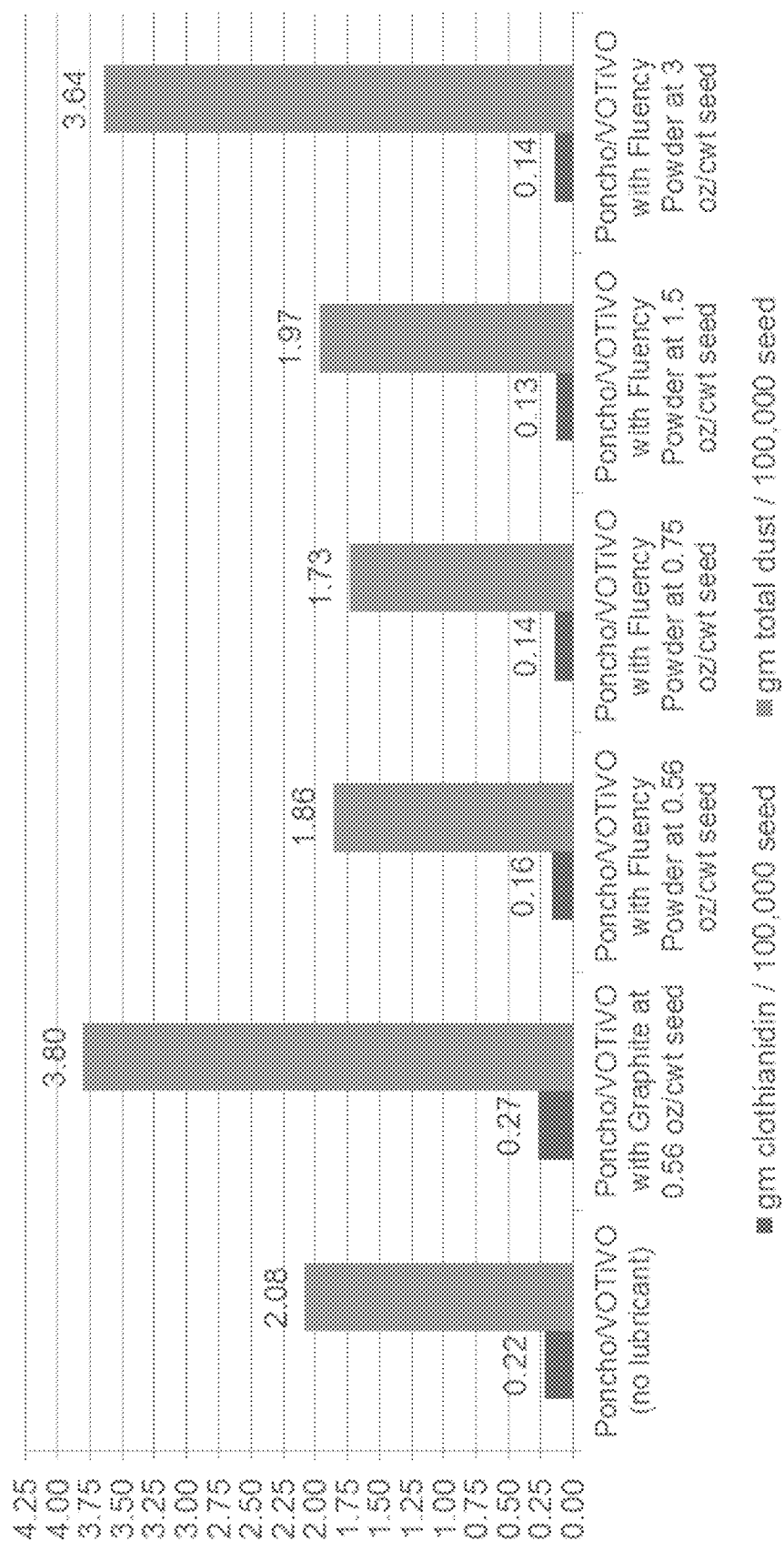
FIG. 46 sets forth the total grams of dust per 100,000 kernels and grams of clothianidin in total dust per 100,000 kernels for seeds treated with a Poncho/VOTiVO and graphite treatment as compared to a treatment of Poncho/VOTiVO and an oxidized polyethylene wax used as a lubricant at 0.56 oz/cwt seed, 0.75 oz/cwt seed, 1.5 oz/cwt seed, and 3 oz/cwt seed as measured by a Case IH Vacuum Meter.

In FIG. 46, the % Singulation, % Population, % Skips, and % Multiples were evaluated on a treatment combination of Poncho/VOTiVO and graphite treatment as compared to a treatment combination of Poncho/VOTiVO and fluency powder (oxidized polyethylene wax) at 0.56 oz/cwt seed, 0.75 oz/cwt seed, 1.5 oz/cwt seed, and 3 oz/cwt seed. As set forth in FIG. 46, the % Singulation, % Population, % Skips, and % Multiples of seeds coated with powdered oxidized polyethylene wax as a lubricant were in line with those with as compared to graphite.

TABLE 21

| Treatment & Planter Lubricant | Total Grams dust per 100,000 kernels | Grams clothianidin in total dust per 100,000 kernels (HPLC analysis of filters) | % decrease of clothianidin in dust versus Graphite |
|---|---|---|---|
| Poncho/VOTiVO (no lubricant) | 0.21 | 0.04 | −68% |
| Poncho/VOTiVO with Graphite at 0.56 oz/cwt seed | 0.92 | 0.12 | Control |
| Poncho/VOTiVO with Fluency Powder at 0.56 oz/cwt seed | 0.20 | 0.03 | −79% |
| Poncho/VOTiVO with Fluency Powder at 0.75 oz/cwt seed | 0.10 | 0.02 | −84% |
| Poncho/VOTiVO with Fluency Powder at 1.5 oz/cwt seed | 0.17 | 0.02 | −85% |
| Poncho/VOTiVO with Fluency Powder at 3 oz/cwt seed | 0.41 | 0.02 | −81% |

In Table 22, the total grams of dust per 100,000 kernels and grams of clothianidin in total dust per 100,000 kernels for seeds treated with Poncho/VOTiVO and fluency powder (polyethylene wax) as a planter lubricant were evaluated. As set forth in Table 22, a treatment combination of Poncho/VOTiVO and graphite treatment was compared to a treatment combination of Poncho/VOTiVO and fluency powder (oxidized polyethylene wax) at 0.56 oz/cwt seed, 0.75 oz/cwt seed, 1.5 oz/cwt seed, and 3 oz/cwt seed. The dust and clothianidin exposure were measured with a Case IH Vacuum Meter. The data in Table 22 represents an average of two seed sources.

In an aspect, a repelling, controlling, or directing compound or composition described herein is added to a planter lubricant, for example, in the methods and compositions described in Tables 21 and 22. Such a composition has the ability to reduce dust emission while repelling, controlling, or directing insects.

TABLE 22

| Treatment & Planter Lubricant | Total Grams dust per 100,000 kernels | Grams clothianidin in total dust per 100,000 kernels (HPLC analysis of filters) | % decrease of clothianidin in dust versus Graphite |
|---|---|---|---|
| Poncho/VOTiVO (no lubricant) | 2.08 | 0.22 | −21% |
| Poncho/VOTiVO with Graphite at 0.56 oz/cwt seed | 3.80 | 0.27 | Control |
| Poncho/VOTiVO with Fluency Powder at 0.56 oz/cwt seed | 1.86 | 0.16 | −41% |
| Poncho/VOTiVO with Fluency Powder at 0.75 oz/cwt seed | 1.73 | 0.14 | −48% |
| Poncho/VOTiVO with Fluency Powder at 1.5 oz/cwt seed | 1.97 | 0.13 | −53% |
| Poncho/VOTiVO with Fluency Powder at 3 oz/cwt seed | 3.64 | 0.14 | −51% |

Example 15

Example 15 sets forth the Poncho 1250+VOTiVO Corn dust levels with polyethylene wax as a planter lubricant.

In Table 23, the total grams of dust per 100,000 kernels and grams of clothianidin in total dust per 100,000 kernels for seeds treated with Poncho 1250+VOTiVO and fluency powder (polyethylene wax) as a planter lubricant were evaluated. As set forth in Table 20, a treatment combination of Poncho 1250+VOTiVO and graphite treatment was compared to a treatment combination of Poncho 1250+VOTiVO and fluency powder (oxidized polyethylene wax) at 0.56 oz/cwt seed, 0.75 oz/cwt seed, 1.5 oz/cwt seed, and 3 oz/cwt seed. The dust and clothianidin exposure were measured with a Heubach Dustmeter. The data in Table 23 represents an average of two seed sources.

Figure 47:
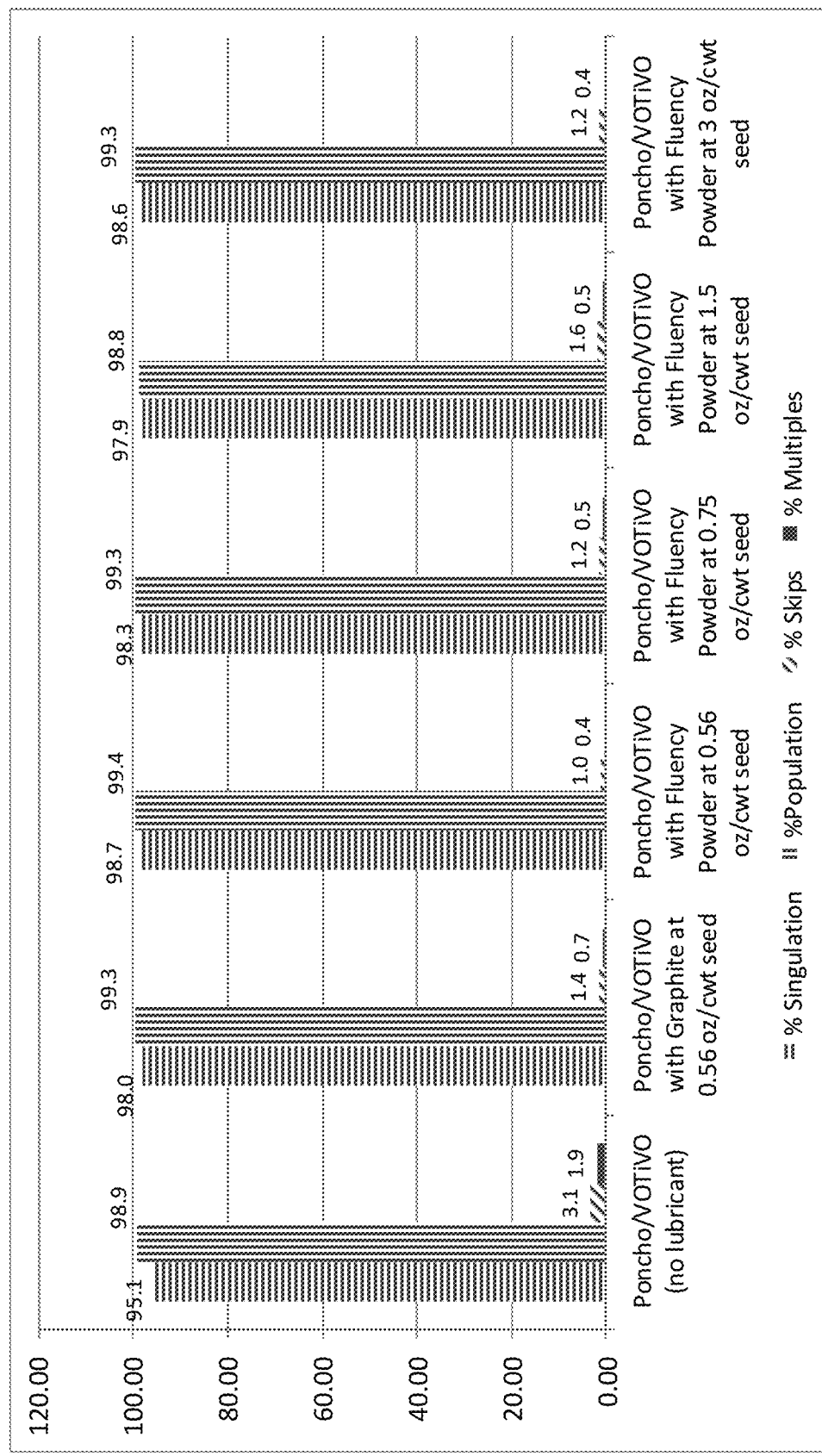
FIG. 47 sets forth measures corn dust levels for seeds treated with a Poncho/VOTiVO and graphite treatment as compared to a treatment of Poncho/VOTiVO and polyethylene wax used as a lubricant at 0.56 oz/cwt seed, 0.75 oz/cwt seed, 1.5 oz/cwt seed, and 3 oz/cwt seed as measured by a Case IH Vacuum Meter.
Figure 48:
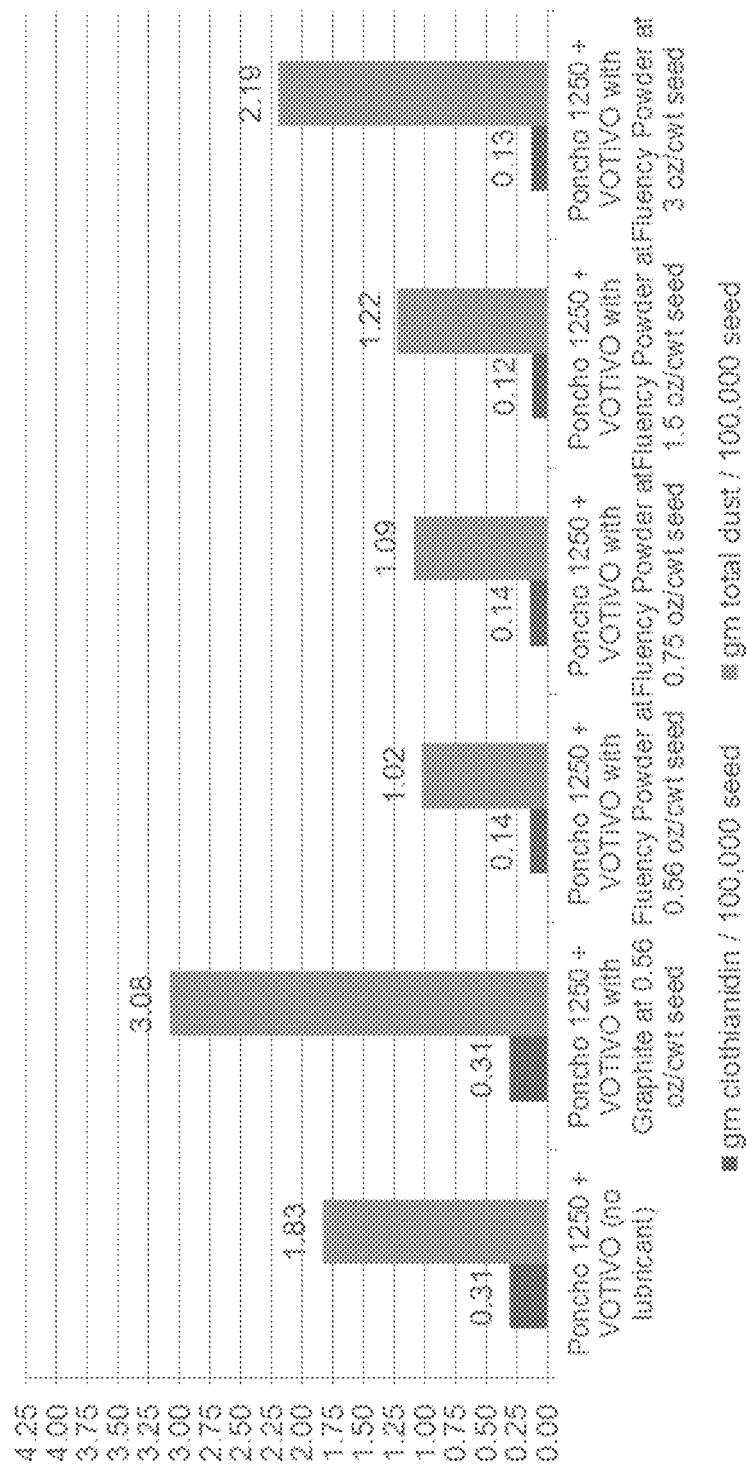
FIG. 48 sets forth the total grams of dust per 100,000 kernels and grams of clothianidin in total dust per 100,000 kernels for seeds treated with a Poncho 1250+VOTiVO and graphite treatment as compared to a treatment of Poncho 1250+VOTiVO and an oxidized polyethylene wax used as a lubricant at 0.56 oz/cwt seed, 0.75 oz/cwt seed, 1.5 oz/cwt seed, and 3 oz/cwt seed as measured by a Case IH Vacuum Meter.
Figure 49:
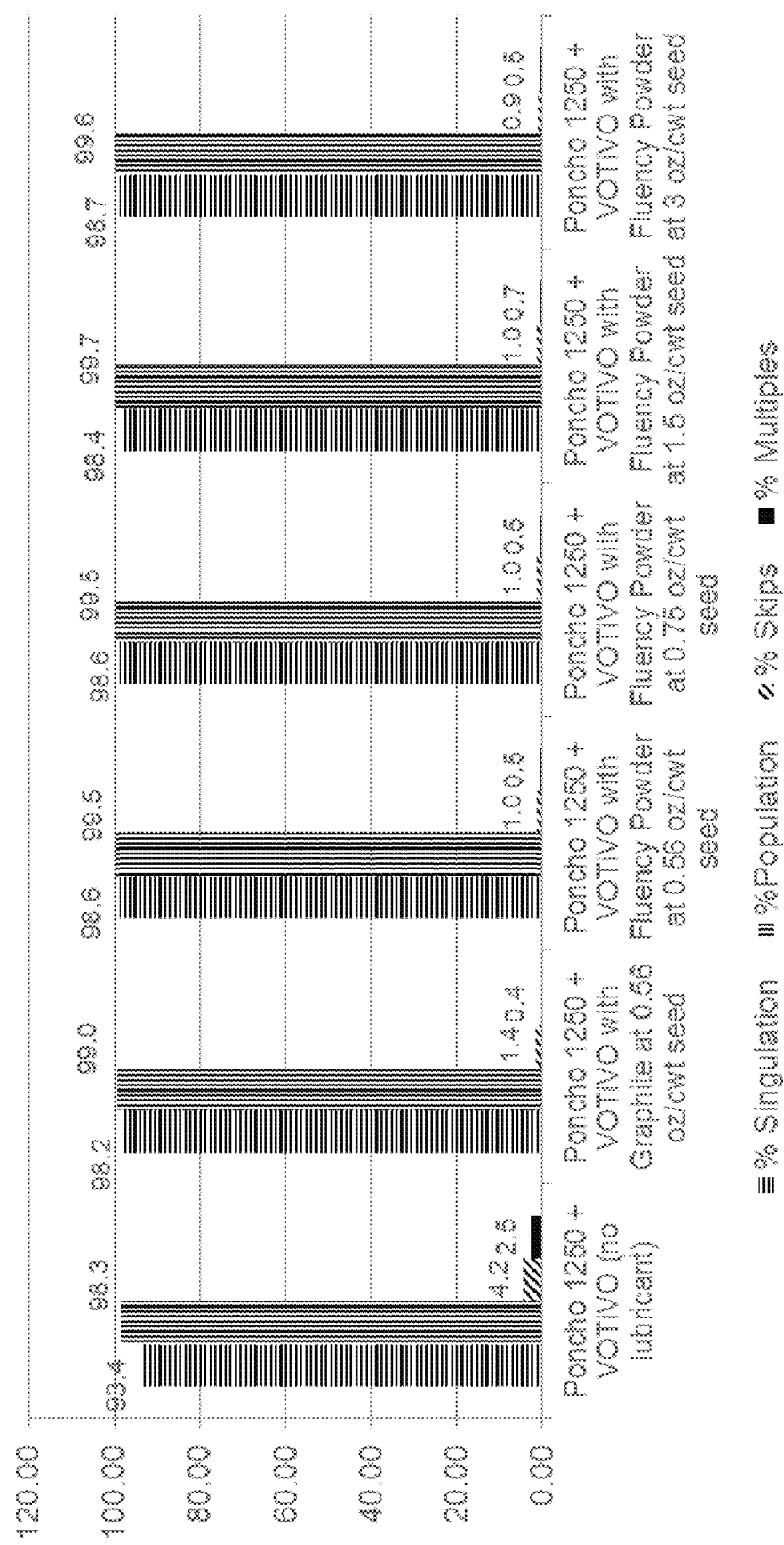
FIG. 49 sets forth measures corn dust levels for seeds treated with a Poncho 1250+VOTiVO and talc treatment as compared to a treatment of Poncho 1250+VOTiVO and an oxidized polyethylene wax used as a lubricant at 0.56 oz/cwt seed, 0.75 oz/cwt seed, 1.5 oz/cwt seed, and 3 oz/cwt seed as measured by a Case IH Vacuum Meter.

In FIG. 47, the % Singulation, % Population, % Skips, and % Multiples were evaluated on a treatment combination of Poncho 1250+VOTiVO and graphite treatment as compared to a treatment combination of Poncho 1250+VOTiVO and fluency powder (oxidized polyethylene wax) at 0.56 oz/cwt seed, 0.75 oz/cwt seed, 1.5 oz/cwt seed, and 3 oz/cwt seed. As set forth in FIG. 47, the % Singulation, % Population, % Skips, and % Multiples of seeds coated with powdered oxidized polyethylene wax as a lubricant were in line with those with as compared to graphite.

In an aspect, a repelling, controlling, or directing compound or composition described herein is added to a planter lubricant, for example, in the methods and compositions described in Tables 23 and 24. Such a composition has the ability to reduce dust emission while repelling, controlling, or directing insects.

TABLE 23

| Treatment & Planter Lubricant | Total Grams dust per 100,000 kernels | Grams clothianidin in total dust per 100,000 kernels (HPLC analysis of filters) | % decrease of clothianidin in dust versus Graphite |
|---|---|---|---|
| Poncho 1250 + VOTiVO (no lubricant) | 0.18 | 0.03 | −69% |
| Poncho 1250 + VOTiVO with Graphite at 0.56 oz/cwt seed | 0.63 | 0.09 | Control |
| Poncho 1250 + VOTiVO with Fluency Powder at 0.56 oz/cwt seed | 0.06 | 0.01 | −89% |
| Poncho 1250 + VOTiVO with Fluency Powder at 0.75 oz/cwt seed | 0.17 | 0.01 | −91% |
| Poncho 1250 + VOTiVO with Fluency Powder at 1.5 oz/cwt seed | 0.10 | 0.01 | −88% |
| Poncho 1250 + VOTiVO with Fluency Powder at 3 oz/cwt seed | 0.09 | 0.01 | −86% |

In Table 24, the total grams of dust per 100,000 kernels and grams of clothianidin in total dust per 100,000 kernels for seeds treated with Poncho 1250+VOTiVO and fluency powder (polyethylene wax) as a planter lubricant were evaluated. As set forth in Table 24, a treatment combination of Poncho 1250+VOTiVO and graphite treatment was compared to a treatment combination of Poncho 1250+VOTiVO and fluency powder (oxidized polyethylene wax) at 0.56 oz/cwt seed, 0.75 oz/cwt seed, 1.5 oz/cwt seed, and 3 oz/cwt seed. The dust and clothianidin exposure were measured with a Case IH Vacuum Meter. The data in Table 24 represents an average of two seed sources.

TABLE 24

| Treatment & Planter Lubricant | Total Grams dust per 100,000 kernels | Grams clothianidin in total dust per 100,000 kernels (HPLC analysis of filters) | % decrease of clothianidin in dust versus Graphite |
|---|---|---|---|
| Poncho 1250 + VOTiVO (no lubricant) | 1.83 | 0.31 | −1% |
| Poncho 1250 + VOTiVO with Graphite at 0.56 oz/cwt seed | 3.08 | 0.31 | Control |
| Poncho 1250 + VOTiVO with Fluency Powder at 0.56 oz/cwt seed | 1.02 | 0.14 | −55% |
| Poncho 1250 + VOTiVO with Fluency Powder at 0.75 oz/cwt seed | 1.09 | 0.14 | −55% |
| Poncho 1250 + VOTiVO with Fluency Powder at 1.5 oz/cwt seed | 1.22 | 0.12 | −63% |
| Poncho 1250 + VOTiVO with Fluency Powder at 3 oz/cwt seed | 2.19 | 0.13 | −57% |

The invention claimed is:

1. A method of repelling, controlling, and/or directing a pollinating insect from a seed, plant part, or plant comprising treating a seed, plant part, or plant with a composition comprising from 1 to about 2.5 weight percent of 2-decanone, wherein the method repels more pollinating insects compared to treating with a composition comprising 0.1 weight percent of 2-decanone within 2 hours of treatment and a composition comprising 0.5 weight percent of 2-decanone at 3.5 hours of treatment.

2. The method according to claim 1, wherein said pollinating insect is a honeybee and/or a wasp.

3. The method according to claim 1, wherein said composition further comprises camphor, camphor oil, camphor powder, tea tree oil, pine oil, rosemary powder, rosemary oil, and combinations thereof.

4. The method according to claim 1, wherein said composition repels at least 90% of the pollinating insects for at least 8 hours.

5. The method of claim 1, wherein said composition further comprises clothianidin or imidacloprid.

6. The method of claim 1, wherein said composition further comprises a *Bacillus* bacteria.

7. The method according to claim 1, wherein said composition further comprises a miticide.

8. The method according to claim 1, wherein the treating the seed, plant part, or plant is in a first area or first location and a second seed, second plant part, or second plant is treated with one or more repellant or attractant compositions at a second area or second location which is a predetermined distance away from said first area or said first location.

9. The method according to claim 8, wherein said first area or first location is a field, location, structure, dwelling, or portion thereof.

10. The method according to claim 1, wherein said treating a seed occurs prior to application of seed to said field, at the time of seed planting, after seed planting, or a combination thereof.

11. The method according to claim 10, further comprising clearing said field by application of an herbicide prior to seed planting.

12. The method according to claim 8, wherein said predetermined distance is selected from the group consisting of about 0.1 meter, about 0.5 meter, about 1 meter, about 3 meters, about 5 meters, about 10 meters, about 25 meters, about 50 meters, about 100 meters, about 200 meters, and about 200 meters.

13. The method of claim 1, wherein the composition comprises at least 1% to about 2% by weight of the 2-decanone.

* * * * *